United States Patent
Russell-Clarke et al.

(10) Patent No.: US 10,914,329 B2
(45) Date of Patent: Feb. 9, 2021

(54) ATTACHMENT APPARATUSES AND ASSOCIATED METHODS OF USE AND MANUFACTURE

(71) Applicant: Apple Inc., Cupertino, CA (US)

(72) Inventors: Peter N. Russell-Clarke, Cupertino, CA (US); M. Evans Hankey, Cupertino, CA (US); Julian Hoenig, Cupertino, CA (US); Matthew D. Rohrbach, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/771,642

(22) PCT Filed: Mar. 14, 2014

(86) PCT No.: PCT/US2014/028180
§ 371 (c)(1),
(2) Date: Aug. 31, 2015

(87) PCT Pub. No.: WO2014/143972
PCT Pub. Date: Sep. 18, 2014

(65) Prior Publication Data
US 2016/0025119 A1    Jan. 28, 2016

Related U.S. Application Data

(60) Provisional application No. 61/801,915, filed on Mar. 15, 2013.

(51) Int. Cl.
*F16B 1/00* (2006.01)
*A44B 11/00* (2006.01)
(Continued)

(52) U.S. Cl.
CPC ............... *F16B 1/00* (2013.01); *A41F 1/002* (2013.01); *A43B 1/0054* (2013.01);
(Continued)

(58) Field of Classification Search
CPC . A41F 1/002; A43C 11/1493; A44D 2203/00; A45C 13/1069; A45C 13/30;
(Continued)

(56) References Cited

U.S. PATENT DOCUMENTS 2,126,263 A    8/1938   Kestenman
2,346,887 A    4/1944   Winkler
(Continued)

FOREIGN PATENT DOCUMENTS

CN    2052214        2/1990
CN    1077362 A      10/1993
(Continued)

OTHER PUBLICATIONS

Author Unknown, "Ikepod Wristwatches by Mark Newson," http://www.dezeen.com/2007/12/10/ikepod-wristwatches-by-marc-newson/, 32 pages, Dec. 10, 2007.
(Continued)

*Primary Examiner* — Robert Sandy
*Assistant Examiner* — David M Upchurch
(74) *Attorney, Agent, or Firm* — Morgan, Lewis & Bockius LLP

(57) ABSTRACT

A system for carrying or using a device includes the device and at least one attachment apparatus. The device may include at least one attachment element. The attachment apparatus may include a length of material and at least one attachment point arranged on an end of the length of material. The at least one attachment point may include at least one magnetic feature configured to attach and detach the device and the length of material. The material can include but is not limited to cloth, metallic (magnetic and non-magnetic), fibrous material, and so forth.

23 Claims, 40 Drawing Sheets

(51) Int. Cl.

| | | |
|---|---|---|
| *A44B 13/00* | (2006.01) | |
| *A44B 17/00* | (2006.01) | |
| *A41F 1/00* | (2006.01) | |
| *A43B 1/00* | (2006.01) | |
| *A45C 13/10* | (2006.01) | |
| *A43C 11/14* | (2006.01) | |
| *A45F 5/00* | (2006.01) | |
| *A45C 13/30* | (2006.01) | |
| *A44B 99/00* | (2010.01) | |
| *F16B 2/08* | (2006.01) | |
| *H05K 5/02* | (2006.01) | |

(52) U.S. Cl.
CPC .......... *A43C 11/1493* (2013.01); *A44B 11/00* (2013.01); *A44B 11/008* (2013.01); *A44B 13/00* (2013.01); *A44B 13/0029* (2013.01); *A44B 17/0005* (2013.01); *A44B 17/0023* (2013.01); *A44B 17/0041* (2013.01); *A44B 99/00* (2013.01); *A45C 13/1069* (2013.01); *A45C 13/30* (2013.01); *A45F 5/00* (2013.01); *F16B 2/08* (2013.01); *H05K 5/02* (2013.01); *A44D 2203/00* (2013.01); *A45C 2013/306* (2013.01); *A45F 2005/008* (2013.01); *F16B 2001/0035* (2013.01)

(58) Field of Classification Search
CPC ......... A45C 2013/306; A45F 2005/008; A45F 5/00; H05K 5/02; A43B 1/0054; A44B 11/00; A44B 11/008; A44B 13/00; A44B 13/0029; A44B 17/0005; A44B 17/0023; A44B 17/0041; A44B 99/00; F16B 1/00; F16B 2001/0035; F16B 2/08
See application file for complete search history.

(56) References Cited

U.S. PATENT DOCUMENTS

| | | | |
|---|---|---|---|
| 2,408,279 A | 9/1946 | Valcourt | |
| 2,505,044 A | 4/1950 | Heinrich | |
| 2,518,551 A | 8/1950 | Jaccarino | |
| 3,293,714 A * | 12/1966 | Shafer | A44B 11/2596 24/303 |
| 3,376,616 A | 4/1968 | Kaczorowski | |
| 3,589,341 A * | 6/1971 | Krebs | A01K 27/005 119/865 |
| 3,675,284 A | 7/1972 | Rieth | |
| 3,740,804 A | 6/1973 | Levinger | |
| 3,747,171 A | 7/1973 | Montague, Jr. | |
| 4,136,805 A | 1/1979 | Storms | |
| 4,178,751 A | 12/1979 | Liautaud | |
| 4,249,267 A * | 2/1981 | Voss | A41F 1/002 2/121 |
| 4,414,714 A | 11/1983 | Kostanecki et al. | |
| 4,447,238 A * | 5/1984 | Eldridge, Jr. | A61M 25/02 128/DIG. 26 |
| 4,615,185 A | 10/1986 | Bollinger | |
| 4,941,236 A * | 7/1990 | Sherman | A44C 5/2071 24/265 WS |
| 5,130,899 A * | 7/1992 | Larkin | B25B 23/00 224/183 |
| 5,146,437 A | 9/1992 | Boucheron | |
| 5,244,134 A | 9/1993 | Riley | |
| 5,305,503 A | 4/1994 | Yamagata | |
| 5,307,582 A * | 5/1994 | Quintel | A01K 27/001 224/183 |
| 5,668,784 A | 9/1997 | Iguchi | |
| 5,889,737 A | 3/1999 | Alameh et al. | |
| 5,914,913 A | 6/1999 | Shriqui | |
| 6,067,692 A * | 5/2000 | Chang | A44B 11/008 24/303 |
| 6,163,938 A * | 12/2000 | Weber-Unger | A41F 1/002 24/303 |
| 6,170,131 B1 * | 1/2001 | Shin | A41F 1/002 24/303 |
| 6,179,025 B1 * | 1/2001 | Sutton | A45C 3/08 150/105 |
| 6,292,985 B1 * | 9/2001 | Grunberger | A44B 11/2592 24/303 |
| 6,311,373 B1 | 11/2001 | Hashimoto | |
| 6,505,385 B2 | 1/2003 | Grunberger | |
| 6,588,069 B2 | 7/2003 | Deriaz et al. | |
| 6,598,271 B2 | 7/2003 | Nire | |
| 6,606,767 B2 | 8/2003 | Wong | |
| 6,619,836 B1 | 9/2003 | Silvant et al. | |
| 6,647,597 B2 | 11/2003 | Reiter | |
| 6,678,898 B2 | 1/2004 | Jones et al. | |
| 6,701,580 B1 | 3/2004 | Bandyopadhyay | |
| 6,726,070 B2 | 4/2004 | Lautner | |
| 6,746,058 B2 | 6/2004 | Kienzler | |
| 7,243,824 B2 | 7/2007 | Tabata | |
| 7,249,398 B2 | 7/2007 | Roy | |
| 7,296,752 B2 | 11/2007 | Carnevali | |
| 7,363,687 B2 * | 4/2008 | Kraus | A44C 5/14 24/303 |
| 7,373,696 B2 * | 5/2008 | Schoening | A41D 25/003 24/303 |
| 7,451,528 B2 | 11/2008 | Sima | |
| 7,618,260 B2 | 11/2009 | Daniel et al. | |
| 7,640,632 B2 * | 1/2010 | Lazarus | A45C 1/02 150/143 |
| 7,806,309 B2 | 10/2010 | Korchmar | |
| 7,810,683 B2 | 10/2010 | Chan | |
| 7,905,039 B2 | 3/2011 | Karovic | |
| 8,088,043 B2 | 1/2012 | Andren et al. | |
| 8,091,261 B2 | 1/2012 | Chadwick | |
| 8,261,416 B2 * | 9/2012 | Rothbaum | F16G 11/00 206/320 |
| 8,316,515 B2 | 11/2012 | Slank | |
| 8,328,055 B1 | 12/2012 | Snyder | |
| 8,471,658 B2 | 6/2013 | Fullerton et al. | |
| 8,474,669 B2 | 7/2013 | Rohrbach et al. | |
| 8,486,481 B2 | 7/2013 | Giuseppin et al. | |
| 8,541,745 B2 | 9/2013 | Dickinson et al. | |
| 8,573,458 B1 * | 11/2013 | Hamilton | A45F 5/021 224/250 |
| 8,578,569 B1 * | 11/2013 | Karnoski | B63B 22/14 24/303 |
| 8,615,849 B2 | 12/2013 | Rothbaum et al. | |
| 8,662,362 B1 | 3/2014 | Bastian et al. | |
| 8,787,006 B2 | 7/2014 | Golko et al. | |
| 8,789,246 B2 | 7/2014 | Yliluoma et al. | |
| 8,857,683 B2 | 10/2014 | Cameron et al. | |
| 8,967,437 B2 | 3/2015 | Wilson | |
| 9,003,611 B2 | 4/2015 | Catanese | |
| 9,049,894 B2 | 6/2015 | Wong | |
| 9,098,069 B2 | 8/2015 | Dickinson et al. | |
| 9,101,184 B2 | 8/2015 | Wilson | |
| 9,245,678 B2 | 1/2016 | Fiedler | |
| 9,258,670 B2 | 2/2016 | Goyal et al. | |
| 9,314,092 B2 | 4/2016 | Wang et al. | |
| 9,318,907 B2 | 4/2016 | Huang et al. | |
| 9,351,551 B2 | 5/2016 | Morgan et al. | |
| 9,357,817 B2 | 6/2016 | Lee et al. | |
| 9,392,829 B2 | 7/2016 | Manuello | |
| 9,523,965 B2 | 12/2016 | Liao | |
| 9,668,367 B2 | 5/2017 | Fleck et al. | |
| 2002/0000024 A1 * | 1/2002 | Grunberger | A44B 11/2592 24/303 |
| 2002/0035746 A1 * | 3/2002 | Jones | A41F 9/00 2/321 |
| 2002/0095751 A1 | 7/2002 | Reiter | |
| 2002/0112323 A1 * | 8/2002 | Nire | A41F 1/002 24/303 |
| 2003/0005558 A1 * | 1/2003 | Wong | A41F 1/006 24/303 |
| 2003/0213822 A1 | 11/2003 | Lautner | |
| 2003/0222109 A1 | 12/2003 | Weiss | |

(56) References Cited

U.S. PATENT DOCUMENTS

| | | | |
|---|---|---|---|
| 2005/0102802 A1* | 5/2005 | Sitbon | A44C 5/2071 24/303 |
| 2005/0265132 A1 | 12/2005 | Ho | |
| 2006/0156520 A1* | 7/2006 | Meranto | A41F 1/002 24/303 |
| 2006/0186150 A1 | 8/2006 | Willows et al. | |
| 2006/0254105 A1 | 11/2006 | Chang | |
| 2007/0028429 A1* | 2/2007 | Ishida | A45C 13/1069 24/303 |
| 2007/0070823 A1 | 3/2007 | Sima | |
| 2007/0199966 A1* | 8/2007 | Korchmar | A45C 3/06 224/578 |
| 2007/0279852 A1 | 12/2007 | Daniel et al. | |
| 2009/0020570 A1 | 1/2009 | Chan | |
| 2009/0133438 A1 | 5/2009 | Stampfli et al. | |
| 2009/0163322 A1 | 6/2009 | Andren et al. | |
| 2009/0173760 A1 | 7/2009 | Good | |
| 2009/0265832 A1* | 10/2009 | Clement | A41F 1/002 2/107 |
| 2010/0032462 A1 | 2/2010 | Cameron et al. | |
| 2010/0072794 A1* | 3/2010 | Karovic | A47C 7/62 297/188.2 |
| 2010/0200627 A1 | 8/2010 | Shen | |
| 2010/0258601 A1 | 10/2010 | Thrope | |
| 2010/0327030 A1 | 12/2010 | Yang | |
| 2011/0083254 A1* | 4/2011 | Trutna | A41F 1/002 2/326 |
| 2011/0179605 A1* | 7/2011 | Slank | H01F 7/0221 24/306 |
| 2011/0252609 A1* | 10/2011 | Rothbaum | H04R 1/1033 24/306 |
| 2011/0309121 A1* | 12/2011 | Dooley | A45C 7/0086 224/576 |
| 2012/0092822 A1 | 4/2012 | Mooring et al. | |
| 2012/0117764 A1* | 5/2012 | Wong | A41F 1/002 24/302 |
| 2012/0152990 A1 | 6/2012 | Kulas | |
| 2012/0168471 A1 | 7/2012 | Wilson | |
| 2012/0194976 A1 | 8/2012 | Golko et al. | |
| 2012/0216373 A1 | 8/2012 | Fiedler | |
| 2012/0216374 A1* | 8/2012 | Manuello | A41F 1/002 24/303 |
| 2013/0001263 A1 | 1/2013 | Kai | |
| 2013/0086774 A1* | 4/2013 | Krasinski | A45C 13/001 24/16 R |
| 2013/0205476 A1* | 8/2013 | Gentile | A41F 1/08 2/311 |
| 2013/0326790 A1* | 12/2013 | Cauwels | A61B 5/02233 2/170 |
| 2015/0072731 A1 | 3/2015 | Salmon | |
| 2016/0003269 A1 | 1/2016 | Russell-Clarke et al. | |
| 2016/0010673 A1 | 1/2016 | Russell-Clarke et al. | |
| 2016/0026215 A1 | 1/2016 | Armstrong | |
| 2016/0037878 A1 | 2/2016 | Yabe et al. | |
| 2016/0058375 A1 | 3/2016 | Rothkopf | |
| 2016/0069371 A1 | 3/2016 | Chen et al. | |
| 2016/0128209 A1 | 5/2016 | Yoon et al. | |
| 2016/0154425 A1 | 6/2016 | Yang et al. | |
| 2016/0192526 A1 | 6/2016 | Gao et al. | |
| 2016/0215799 A1 | 8/2016 | Ely et al. | |
| 2016/0261037 A1 | 9/2016 | Chen et al. | |
| 2016/0278203 A1 | 9/2016 | Nakayama | |
| 2017/0086538 A1 | 3/2017 | Siahaan | |

FOREIGN PATENT DOCUMENTS

| | | |
|---|---|---|
| CN | 1147358 | 4/1997 |
| CN | 2575724 | 9/2003 |
| CN | 2726232 Y | 9/2005 |
| CN | 1747668 A | 3/2006 |
| CN | 101031215 A | 9/2007 |
| CN | 200976094 Y | 11/2007 |
| CN | 101082810 A | 12/2007 |
| CN | 200983868 | 12/2007 |
| CN | 201638027 U | 11/2010 |
| CN | 201709560 | 1/2011 |
| CN | 201780466 U | 3/2011 |
| CN | 201846934 U | 6/2011 |
| CN | 102202533 | 9/2011 |
| CN | 202026953 | 11/2011 |
| CN | 102283475 A | 12/2011 |
| CN | 202067085 U | 12/2011 |
| CN | 202334628 U | 7/2012 |
| CN | 202587325 | 12/2012 |
| CN | 202664274 | 1/2013 |
| CN | 202704189 | 1/2013 |
| CN | 103051992 A | 4/2013 |
| CN | 103488076 | 1/2014 |
| EP | 2098131 | 3/2009 |
| EP | 2633776 | 9/2013 |
| FR | 1291875 | 4/1962 |
| FR | 2492238 | 4/1982 |
| FR | 2532239 | 3/1984 |
| FR | 2735665 A1 | 12/1996 |
| GB | 464417 | 4/1937 |
| GB | 1491532 | 11/1977 |
| GB | 2113975 | 8/1983 |
| GB | 2355281 | 4/2001 |
| JP | S 53-10452 | 7/1968 |
| JP | H 01-206606 A | 8/1989 |
| JP | H06189814 | 7/1994 |
| JP | 2001060997 | 3/2001 |
| JP | 2003-219904 A | 8/2003 |
| JP | 2005143988 | 6/2005 |
| JP | 2005318247 | 11/2005 |
| JP | 2006102026 | 4/2006 |
| JP | 3134581 | 8/2007 |
| JP | 2009124652 | 6/2009 |
| JP | 2012248580 | 12/2012 |
| KR | 200320475 | 7/2003 |
| KR | 200396918 | 9/2005 |
| KR | 10-2012-0038929 | 4/2012 |
| WO | WO2010/036090 | 4/2010 |
| WO | WO2011/048344 | 4/2011 |
| WO | WO-2011/109665 A2 | 9/2011 |
| WO | WO2012/160195 | 11/2012 |

OTHER PUBLICATIONS

Author Unknown, "Tajan," http://www.tajan.com/pdf/7812.pdf, 2 pages, Dec. 10, 2007.

Author Unknown, v2.0 Ikepod Has Landed . . . again . . . , http://qp.granularit.com/media/38876/QP24_Ikepod.pdf, 3 pages, at least as early as Apr. 25, 2015.

International Search Report and Written Opinion, PCT/US2014/028180, 14 pages, dated Jun. 30, 2014.

International Preliminary Report on Patentability, PCT/US2014/028180, 16 pages, dated Jun. 16, 2015.

International Search Report and Written Opinion from PCT/US/2014/027971, 14 pages, dated Sep. 1, 2014.

International Search Report and Written Opinion from PCT/US/2014/028410, 12 pages, dated Aug. 27, 2014.

Korean Office Action from Korean Application No. 10-2015-7023583, dated Apr. 24, 2017.

European Office Action from European Application No. 14725281.1, dated Apr. 18, 2017.

Australian Office Action from Australian Application No. 2014228140, dated Jun. 7, 2017.

Chinese Office Action from Chinese Patent Application No. 201480010769.X, dated Sep. 29, 2017, 13 pages.

European Office Action from European Patent Application No. 14721646.9, dated Jun. 28, 2017.

Korean Office Action from Korean Patent Application No. 2017-7008821, dated Jul. 3, 2017.

Japanese Office Action dated Jan. 9, 2018, from Japanese Patent Application No. 2016-502725, 11 pages.

European Office Action from European Patent Application No. 14725281.1, dated Feb. 27, 2018, 4 pages.

(56) References Cited

OTHER PUBLICATIONS

Australian Examination Report No. 3 from Australian Patent Application No. 2017201586, dated Feb. 20, 2019, 3 pages.
European Office Action from European Patent Application No. 14727098.7, dated Mar. 6, 2020, 9 pages.
Extended European Search Report from European Patent Application No. 19206972.2, dated Jan. 29, 2020, 10 pages.
Australian Examination Report from Australian Patent Application No. 2019201452, dated Sep. 28, 2019, 3 pages.
Summons to Attend Oral Proceedings from European Patent Application No. 14725281.1, dated Oct. 23, 2018, 7 pages.
Australian Office Action from Australian Patent Application No. 2019201452 dated Sep. 7, 2020, 3 pages.
Australian Office Action from Australian Patent Application No. 2019201452 dated Sep. 25, 2020, 4 pages.

\* cited by examiner

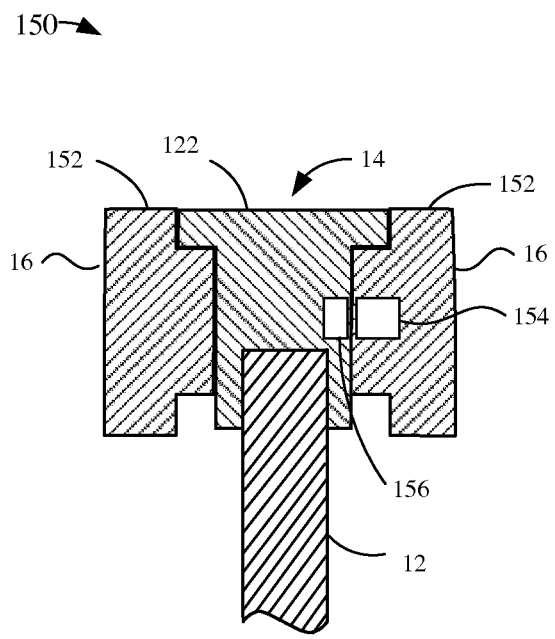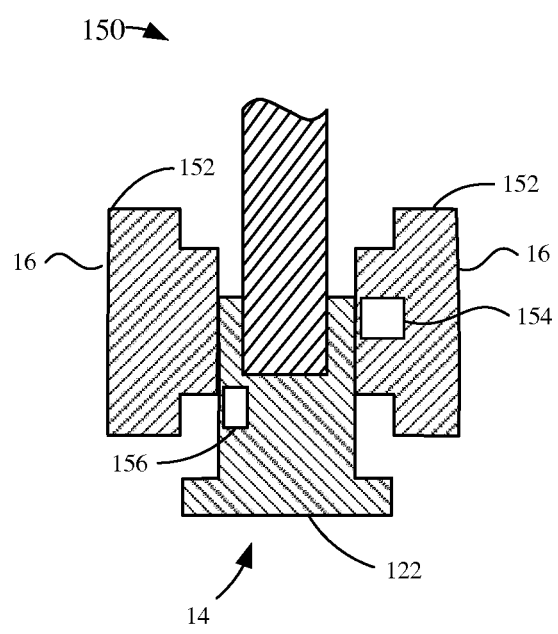
*FIG. 15A*  *FIG. 15B*

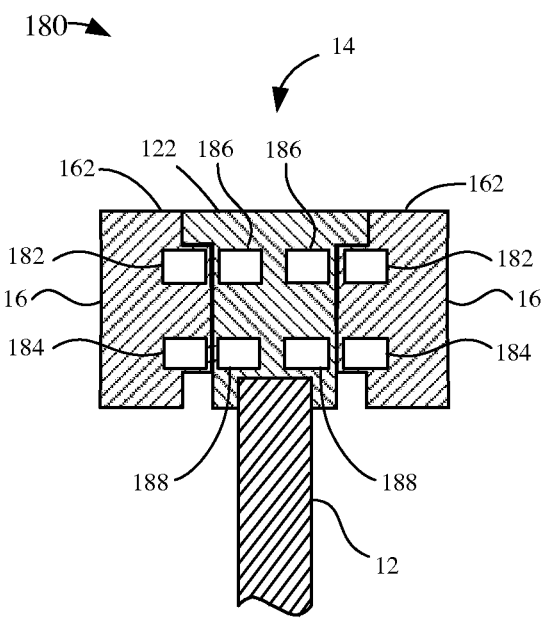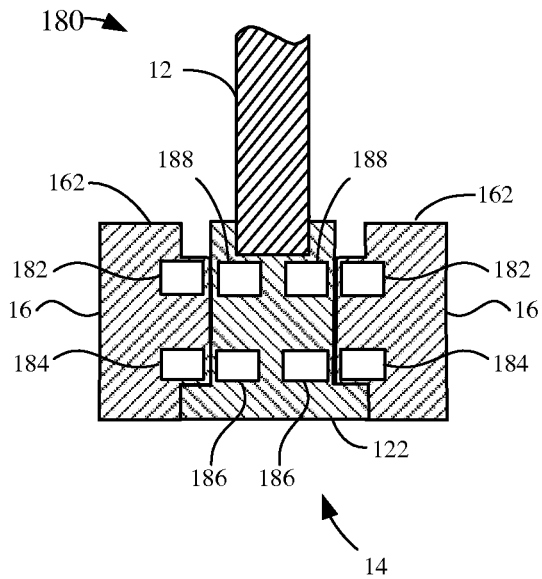
*FIG. 18A*  *FIG. 18B*
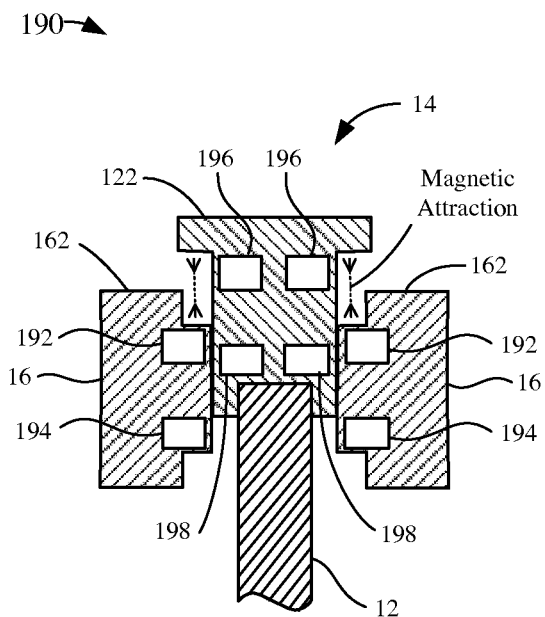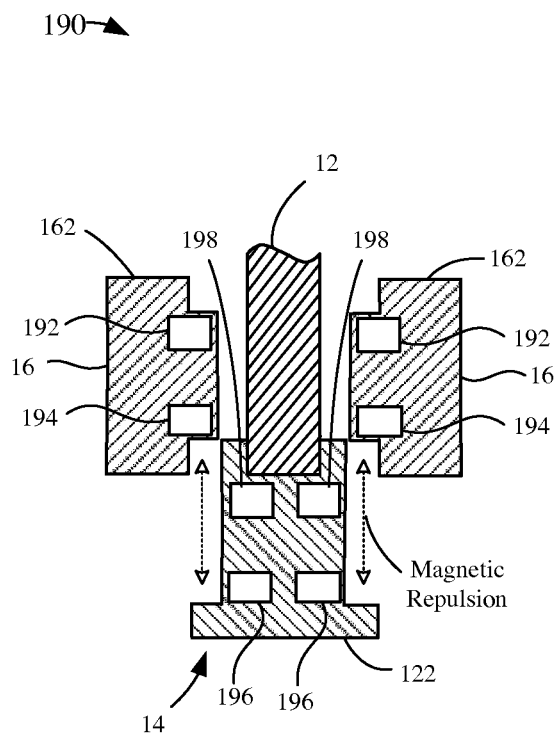
*FIG. 19A*  *FIG. 19B*

D-D

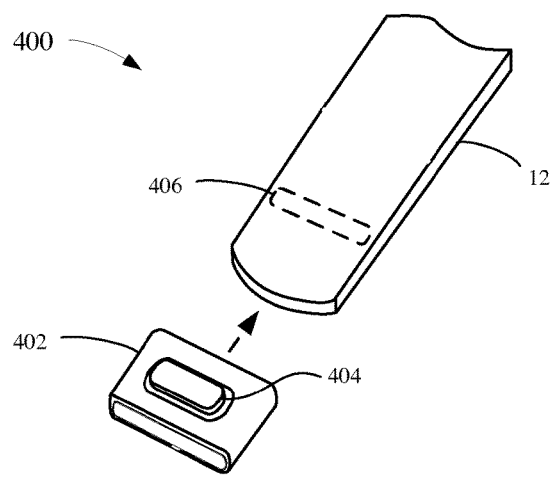
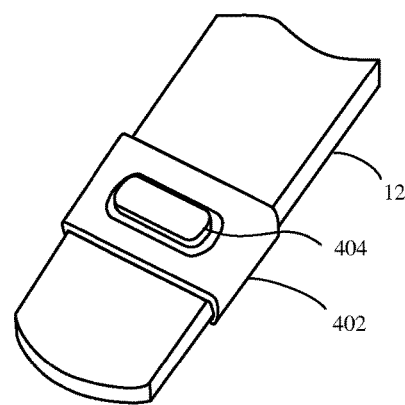
FIG. 40A　　　　　　　　FIG. 40B
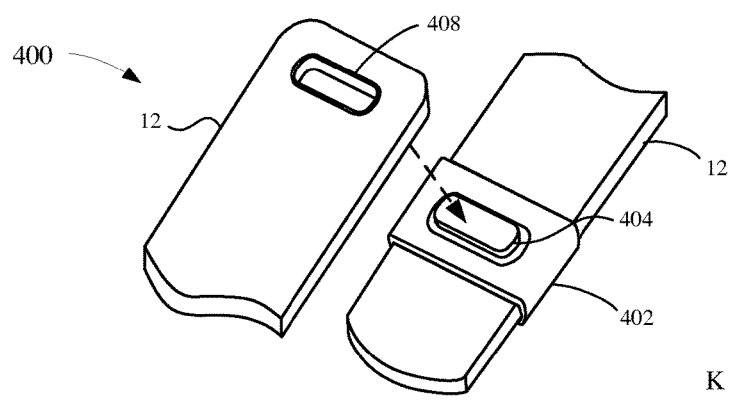
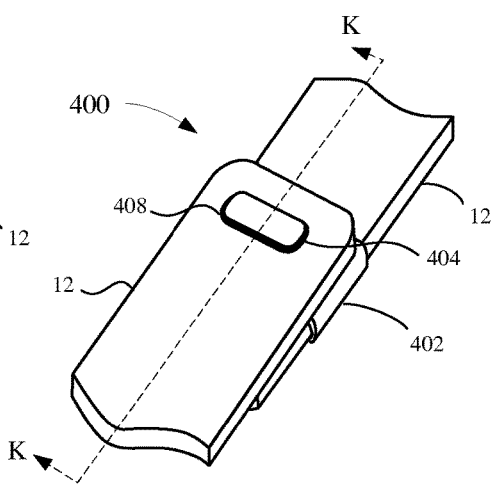
FIG. 40C　　　　　　　　FIG. 40D
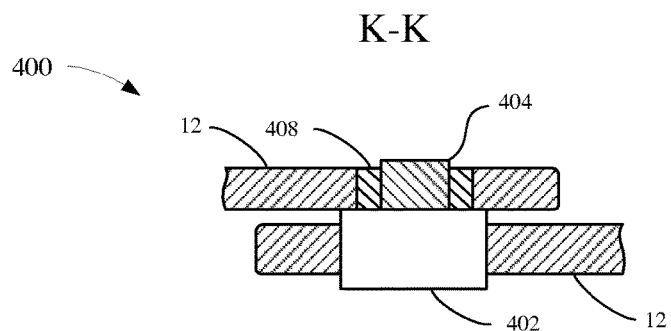
FIG. 40E

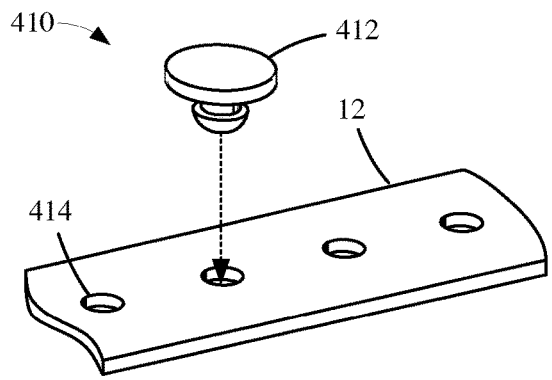
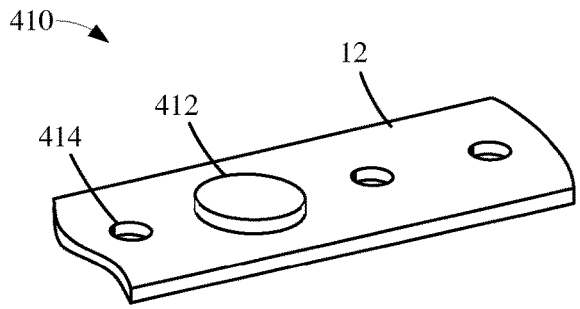
*FIG. 41A*  *FIG. 41B*
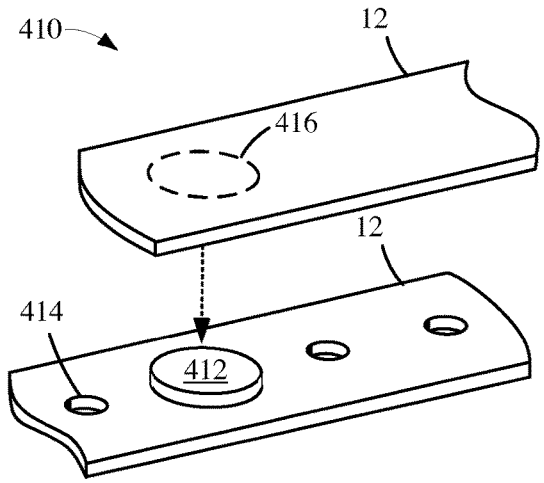
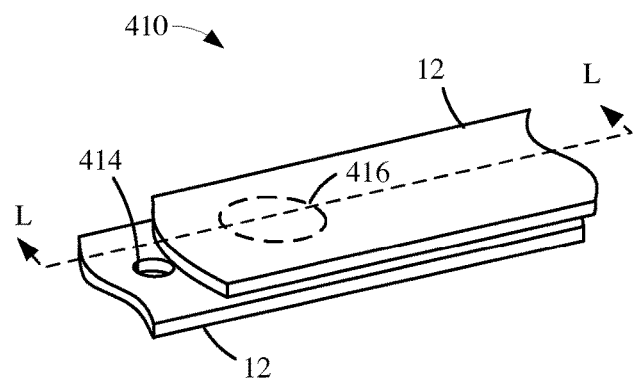
*FIG. 41C*  *FIG. 41D*
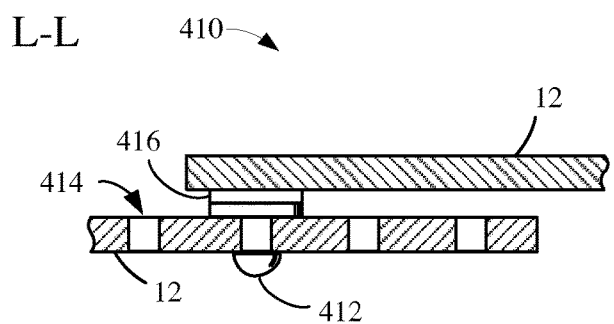
*FIG. 41E*

ATTACHMENT APPARATUSES AND ASSOCIATED METHODS OF USE AND MANUFACTURE

CROSS-REFERENCE TO RELATED APPLICATIONS

This application is a 35 U.S.C. § 371 application of PCT/US2014/028180, filed Mar. 10, 2014 and titled "Attachment Apparatuses and Associated Methods of Use and Manufacture," which claims priority to U.S. Provisional Patent Application No. 61/801,915, filed Mar. 15, 2013 and titled "Attachment Apparatuses and Associated Methods of Use and Manufacture," the disclosures of which are hereby incorporated by reference herein in their entireties.

FIELD OF THE DESCRIBED EMBODIMENTS

The described embodiments relate generally to attachment apparatuses, and more particularly, to attachment apparatuses including straps or bands with at least one point of attachment.

BACKGROUND

Generally, straps or bands may be attached to a variety of items for use in carrying the items (e.g., hand strap or luggage strap), strapping them to another item or a person's body (e.g., arm band), or a plurality of other uses. However, conventional straps may require a mechanical connection to fixedly attach the strap to an item, and may not offer easy personal adjustments to length and other attributes. Furthermore, the mechanical connections may be difficult to use making it difficult to remove or replace the strap

SUMMARY OF THE DESCRIBED EMBODIMENTS

This paper describes various embodiments that relate to attachment apparatuses.

According to an embodiment of the disclosure, a system for carrying or using a device may include the device and at least one attachment apparatus. The device may include at least one attachment element. The at least one attachment apparatus may include a length of material and at least one attachment point arranged on an end of the length of material. The at least one attachment point may include at least one magnetic feature configured to attach and detach the device and the length of material. The material can include but is not limited to cloth, metallic (magnetic and non-magnetic), fibrous material, and so forth.

According to an additional embodiment of the disclosure, a method of carrying or using a device may include at least one attachment element. The method may further include engaging at least one attachment apparatus with the at least one attachment element. The at least one attachment apparatus may include a length of material and at least one attachment point arranged on an attachment point of the length of material, and a magnetic element corresponding to the attachment point and configured to couple to the at least one attachment element. The at least one attachment point may be formed of a material configured to cosmetically match a cosmetic appearance of the device.

An attachment system may include a first strap unit having at least one strap with a first strap characteristic and a first strap attachment coupling, the first strap characteristic possibly including a magnetic field having a polarity and a second strap unit having at least one strap with a second strap characteristic and a second attachment coupling that is configured to securely engage to the first attachment coupling of the first strap unit and releasably engage from the first attachment coupling of the first strap unit. The second attachment coupling may cooperate with the first attachment coupling of the first strap unit, the first strap unit possibly including a first magnetically attractable element. A cooperating strap assembly may be formed by the first strap unit and the second strap unit magnetically attaching to each other.

A strapping assembly may include a first flexible member having a first attachment element and a second flexible member having a second attachment element, the second attachment element possibly being configured to couple to the first attachment element so as to secure the first and second flexible members together, the first and second attachment elements possibly including at least a magnetic element that provides at least a portion of the coupling force of the first attachment element relative to the second attachment elements.

A strapping assembly may include a carrier module including at least one functional element and a first attachment element; a flexible member that includes a length of material and having a second attachment element disposed proximate one end of the length of material, the second attachment element possibly being configured to couple to the first attachment element so as to secure the flexible member to the base unit, the first and second attachment elements possibly including at least a magnetic element that provides at least a portion of the coupling force of the first attachment element relative to the second attachment elements.

A strapping assembly may include a carrier module including at least one functional element and a pair of first module attachment elements; a first flexible member having a second module attachment element that is configured to couple to one of the first module attachment elements, the first flexible member possibly including a first strap attachment element; and a second flexible member possibly having a second module attachment element that is configured to couple to the other one of the first module attachment elements, the second flexible member possibly including a second strap attachment element, the second strap attachment element possibly being configured to couple to the first strap attachment element so as to secure the first and second flexible members together, wherein the first and second strap attachment elements may include at least a magnetic element that provides at least a portion of the coupling force of the first strap attachment element relative to the second strap attachment elements, wherein the first and second module attachment elements may include at least a magnetic element that provides at least a portion of the coupling force of the first module attachment element relative to the second module attachment elements.

According to an embodiment of the disclosure, a modular assembly for electronic devices is described. A modular assembly for electronic devices may include a base unit having at least a first functional system and a first enclosure with a first characteristic, the first base unit possibly having a first attachment coupling and a second attachment coupling, a first strap unit having at least one strap with a first strap characteristic and a first strap attachment coupling that is configured to securely engage to the first attachment coupling of the base unit and releasably engage from the first attachment coupling of the base unit, the first strap characteristic may include a magnetic field having a polarity and a second strap unit having at least one strap with a second strap characteristic and a second attachment coupling that is configured to securely engage to the second attachment coupling of the base unit and releasably engage from the second attachment coupling of the base unit, the second attachment coupling possibly being the same as the second attachment coupling of the first strap unit, wherein the second strap characteristic is different than the first strap characteristic, the second strap unit possibly including a first magnetically attractable element, wherein a cooperating strap assembly may be formed by the first strap unit and the second strap unit magnetically attached to each other.

Other aspects and advantages of the disclosure will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which:

FIG. 15A is a cross-sectional view of a strap system with magnetic features;
FIG. 15B is a cross-sectional view of a reversed strap system with magnetic features;
FIG. 18A is a cross-sectional view of a strap system with magnetic features;
FIG. 18B is a cross-sectional view of a reversed strap system with magnetic features;
FIG. 19A is a cross-sectional view of a strap system with magnetic features;
FIG. 19B is a cross-sectional view of a reversed strap system with magnetic features.

FIG. 40A shows a perspective view of a process for fastening a strap;

FIG. 40B shows a perspective view of a process for fastening a strap;

FIG. 40C shows a perspective view of a process for fastening a strap;

FIG. 40D shows a perspective view of a process for fastening a strap;

FIG. 40E shows a cross-sectional view of a process for fastening a strap;

FIG. 41A shows a perspective view of a strap system utilizing a magnetic plug;

FIG. 41B shows a perspective view of a strap system utilizing a magnetic plug;

FIG. 41C shows a perspective view of a strap system utilizing a magnetic plug;

FIG. 41D shows a perspective view of a strap system utilizing a magnetic plug;

FIG. 41E shows a cross-sectional view of a strap system utilizing a magnetic plug;

DETAILED DESCRIPTION OF SELECTED EMBODIMENTS

Figure 1:
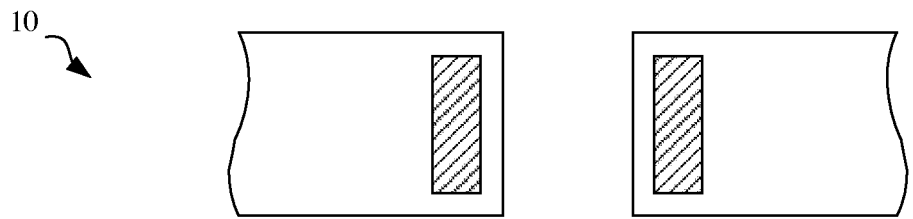
FIG. 1 is a plan view of a strap system.
Figure 2:
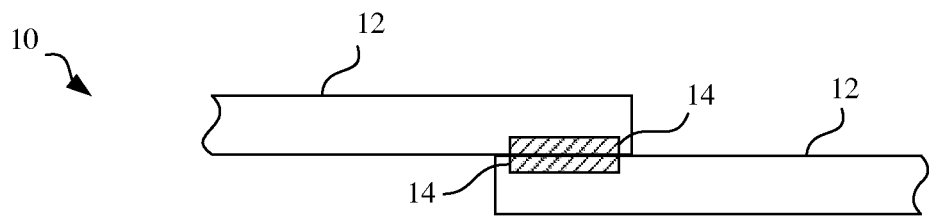
FIG. 2 is a cross-sectional view of a strap system.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This paper describes attachment apparatuses that provide easy and fast attachment to or detachment from a device. According to the described embodiments, an attachment apparatus can include a length of material and at least one attachment point at which an attachment element(s) is located. The attachment point can be arranged at a position of the length of material and the associated attachment element can be configured to attach to a separate device or apparatus or in some cases, attach to another attachment element at another attachment point on the length of material. The separate device can take many forms. The separate device can include personal devices, such as a cellular telephone, luggage, personal electronic device, or any other suitable separate device. The attachment element can use any of a number of attachment protocols to secure the attachment point to the separate device. The attachment protocols can include methods and mechanisms such as, for example, a magnetic attraction between a magnetic or ferrous element disposed at the attachment point and a corresponding magnetic element on the separate device. The attachment protocols can include a magnetic element in combination with a mechanical element such as a fastener, and so on. The magnetic element can take the form of a permanent magnet, a magnetized metallic object (formed of ferrous material), magnetically attractable metal and so forth.

The attachment apparatus can form an attachment between at least two objects. The attachment can be symmetric, or reversible, by which it is meant that the attachment between the at least two objects can be independent of the relative positions of the two objects. In other words, the attachment can remain the same regardless of the relative orientation of the objects with respect to each other. For example, in accordance with a symmetric attachment between two objects, the positioning of the objects can be reversed with respect to each other without affecting the manner in which the two objects attach. A representative symmetric attachment element can include a magnetic element. The magnetic element has an intrinsic polarity (N, S) and can magnetically attract a ferrous object with either magnetic pole equally. Accordingly, the magnetic attachment between the ferrous object and the magnet is inherently symmetric (i.e., reversing the magnetic polarity as observed by the ferrous object has no effect on the attachment between the magnetic element and the ferrous object). However, if the second object also possesses intrinsic polarity, then the attachment between the two objects becomes asymmetric since the attachment will depend upon the relative positions of the two objects. As above, if the two objects are positioned such that opposite magnetic poles interact, then the objects are magnetically attracted to each other. On the other hand, if the two objects are positioned in a reverse order such the like magnetic poles interact, and then the two objects will magnetically repel each other. In this way, the attachment element can be arranged to exhibit either symmetric attachment or asymmetric attachment properties.

In some cases, the attachment element can be configured to exhibit both symmetric and asymmetric attachment elements depending upon a particular use. Symmetric and asymmetric attachment can be very advantageous. An asymmetric attachment apparatus can provide for preferred attachment. By preferred attachment, an attachment system that exhibits asymmetric attachment can allow only for a selected attachment configuration and any other attachment configurations are rejected. For example, if a user is left handed, a preferred attachment configuration is one that affords the left handed user a comfortable grasp of an object, such as a purse. In this regard, an asymmetric attachment system can be used to attach a handle to the purse that suits the left handedness of the user and rejects any other configuration (such as would be the case if an attempt to attach the handle in a right handed manner). Accordingly, the magnetic elements can be arranged in such a way that the strap system will attach to a flexible member or an object in only a pre-selected and preferred orientation and location. In this regard, the attachment can be described as asymmetric. An asymmetric attachment system can use magnets that create an attractive force in only a preferred orientation and creates a repulsive force otherwise. In this way, the asymmetric attachment system can actively reject an undesired arrangement when magnetic elements are juxtaposed in such a way that a magnetic repulsive force is created. The magnetic repulsive force can be used to eject or otherwise prevent an object from being attached to a flexible member, for example, in any but the preferred arrangement.

In other embodiments, the attachment apparatus can take on additional forms. For example, the attachment apparatus can include both mechanical attachment elements and magnetic attachment elements. In some embodiments, the magnetic attachment element can include magnetic elements. The magnetic elements can be arranged in a continuous manner or in a discrete manner. The magnetic elements can be arranged in patterns. The magnetic patterns can be linear in nature (one dimensional), planar in nature (two dimensional), or occupy a volume of space in accordance with a three dimensional pattern. By utilizing magnetic patterns, the attachment element can provide additional service beyond those associated with a simple attachment. For example, a discrete linear pattern can provide for discrete adjustment of a magnetically active band such as an arm band. The placement of magnetic elements in the magnetic pattern can take many forms. The placement can be striped, checkerboard, circular, rectangular, and the like. The magnetic elements can be arranged in a symmetric arrangement that can provide a reversible attachment between objects. The magnetic pattern can be used to attach a flexible member to an object (or another flexible member) in a pre-defined orientation in a repeatable manner. Therefore, a magnetic attachment element that includes magnetic elements arranged in a magnetic pattern can be well suited for applications that require repeated attachments. Such applications can include flexible members such as arm bands, bracelets and such.

The use of magnetic elements affords a user of the strap system with the ability to easily interchange selected elements of the attachment system. For example, a magnetic element can form a symmetric attachment with a ferrous material since the magnetic attraction induced will always be attractive in nature (presuming the ferrous material has no extrinsic magnetic field). Accordingly, magnetic elements can be interchanged with other magnetic elements without altering the basic magnetic attachment with the ferrous object. This ability to easily swap elements of the strap system affords a user with a wide variety of options with respect to attaching objects and flexible members. For example, a symmetric strap system can provide a user with the ability to easily transition from a left handed arrangement to a right handed arrangement. This can be very useful for situations where handedness can be important, such as carrying a purse.

Accordingly, a magnetic attachment mechanism as described herein can include a magnet that can magnetically attract a corresponding attachment element such as a snap or lock. In some embodiments, the magnet can be disposed within a recess or embedded with a member. In this way, the magnetic attraction can be personalized for a particular user. For example, by providing magnets embedded within.

Hereinafter, detailed discussion of a plurality of embodiments of the disclosure is presented. Each embodiment presented may be configurable to function with additional embodiments in a coordinated manner, may function entirely individually, or may be altered from the particular forms illustrated.

FIG. 1 is a simplified diagram of an attachment or strap system 10, in accordance with one embodiment of the disclosure. Strap system 10 can generally be configured to bind one object or to hold a number of objects together. The objects can be aesthetic elements, mechanical elements, electrical elements and/or the like. Strap system 10 can be, for example, configured to encircle a portion of a body to secure an article or loads to the body. For example, strap system 10 can be secured to a waist, arms, legs, neck, and the like.

Moreover, strap system 10 can be configured to help attach two portions of an object together. For example, strap system 10 can be used in soft goods such as purses, garments, accessories, or other clothing. By way of example, strap system 10 can be used to connect a flap to the pouch of a purse or first and second flaps of a shoe or a cover to a case. These and other embodiments will be discussed in great detail below.

In a particular embodiment, strap system 10 can include at least flexible member 12 and attachment element 14. Attachment element 14 can releasably connect/secure flexible member 12 to itself, to another flexible member 12, or to an object (e.g., strap on strap, strap to strap, or strap on/to object). Attachment element 14 can work alone or in conjunction with another attachment element located on the flexible member itself, on another flexible member, or on an object. Attachment element 14 can take many forms such as mechanical, magnetic, magnetic/mechanical and so forth. In this regard, attachment element 14 can be a fastener, clasp, clinch, snap, clamp, cinch, buckle, and/or the like. Flexible member 12 can be a strap, strip, cord, band, belt, ribbon, flap, girth, shackle, thong, and/or the like. In essence, flexible member 12 can be any length of material. Attachment element 14 can be fixed relative to the flexible member 12. In some cases, attachment element 14 can be removable. In one embodiment, attachment element(s) 14 can be disposed on or within flexible member(s)/object(s) 12. By way of example, attachment element 14 can be embedded within flexible member 12 such that it is not visible or otherwise hidden from view and provides flexible member 12 with a continuous or unbroken surface. Alternatively or additionally, attachment element 14 can be mounted or integrated on the surface of flexible member 12. Alternatively or additionally, attachment element 14 can be a separate discrete component that is carried by flexible member 12. The manner in which flexible member 12 interfaces with itself, to another flexible member, or to an object via the attachment element(s) 14 can be widely varied. In one embodiment, flexible member 12 interfaces with itself, to another flexible member, or to an object in a layered fashion (FIG.

Figure 3:
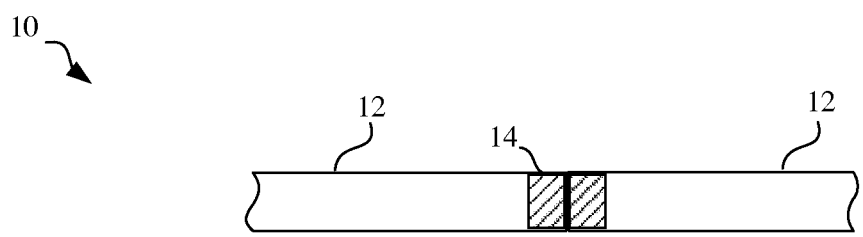
FIG. 3 is a cross-sectional view of a strap system.
Figure 4:
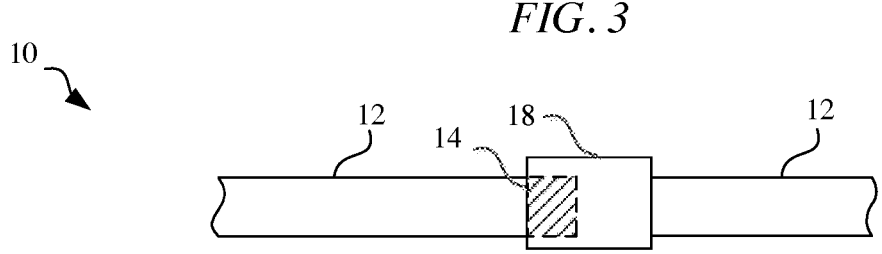
FIG. 4 is a cross-sectional view of a strap system.
Figure 5:
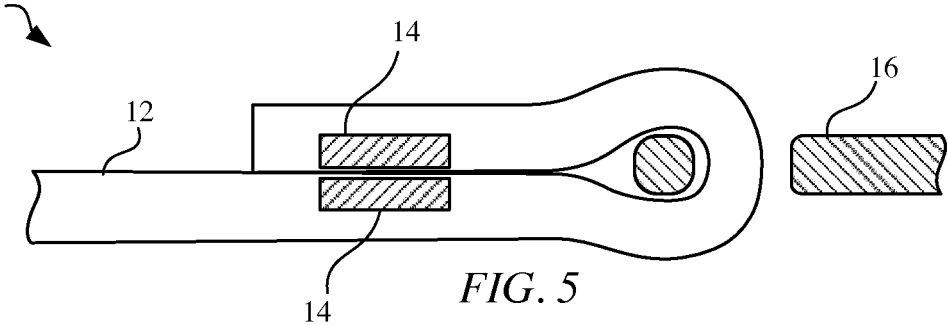
FIG. 5 is a cross-sectional view of a strap system.

2). That is, the attachment elements can be placed adjacent or overlaid relative to one another along their respective lengths. In another embodiment, flexible member 12 can interface with itself, to another flexible member, or to an object at its end or ends (FIG. 3). In yet another embodiment, flexible member 12 can interface with itself, to another flexible member, or to object via a clasp or buckle 18 (FIG. 4). In this regard, clasp or buckle 18 can be a separate part or it can be integrated with or carried by flexible member 12. In yet another embodiment, flexible member 12 can interface with itself, to another flexible member, or to object 16 via a loop (FIG. 5). It should be appreciated that any combination of the above can be used.

Figure 6A:
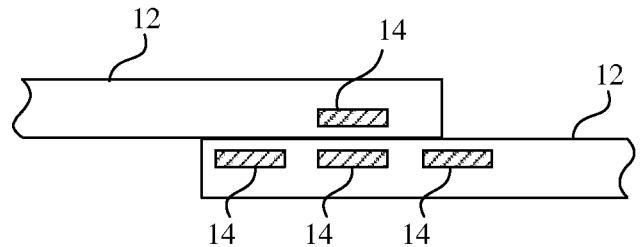
FIG. 6A is a cross-sectional view of a strap system.
Figure 6B:
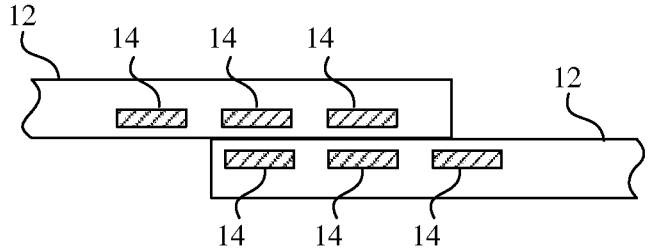
FIG. 6B is a cross-sectional view of a strap system.

FIGS. 6A-6B show embodiments of attachment system 14 having discrete arrangements of magnetic elements. In one embodiment, one or more of the attachment system(s) 14 can be configured with a magnetic feature. The magnetic feature can provide a magnetic force (attraction or repulsion) that helps secure the flexible member 12 to itself, to another flexible member 12, or to an object. The magnetic element can also be used to properly align flexible member to an object. The magnetic element can be configured in such a way that attachment system 14 secures flexible member 12 in a specific orientation or arrangement. For example, the magnetic element can cause flexible member 12 to take on a specific length along the lines of an arm band sized to fit a particular user's arm without further user adjustments. The magnetic element can be widely varied. In this regard, attachment system 14 can include a magnet or a plurality of magnets. The plurality of magnets can be arranged pattern that can be discrete or continuous or a combination of both. In another embodiment, attachment system 14 can include a ferrous material that interfaces with a magnet. In yet another embodiment, the attachment element can includes a mechanical interlock such as a fixed button/snap or mechanism with moving parts (hook/catch) that cooperates with a magnet and/or ferrous material.

Figure 7A:
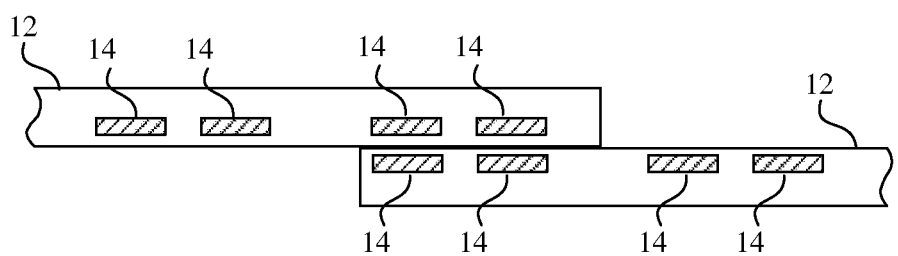
FIG. 7A is a cross-sectional view of a strap system.
Figure 7B:
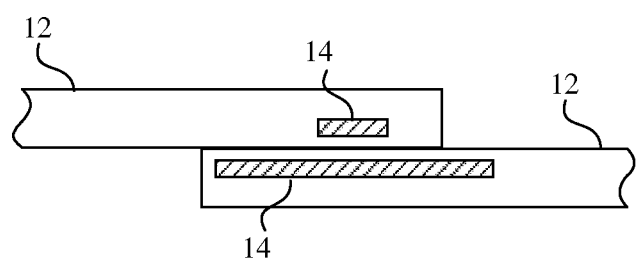
FIG. 7B is a cross-sectional view of a strap system.

In a strap on strap configuration, the position of flexible member 12 relative to itself, another flexible member or an object is adjustable via attachment element(s) 14. That is, attachment system 14 can be configured with multiple locking positions. It can be that only the flexible member adjusts or it can be that they both adjust. This can be accomplished through indexed or continuous attachment. Using the magnetic embodiments mentioned above, in one implementation, flexible member 12 can include single magnetic feature 14 that interfaces with multiple magnetic features 14 of flexible member 12 or object (FIG. 6A). It should be noted that flexible member 12 can be a continuous loop having a first and second ends that can wrap around and meet each other. The first and second ends can each have associated attachment features. In other embodiments, at least two flexible members can be joined by attachment feature 14 creating in essence a single joined entity. In any case, multiple magnetic features 14 can be positioned one after another along a length of flexible member 12 (FIG. 6B). FIGS. 7A and 7B show a more continuous distribution of magnetic elements. In one example, multiple magnetic features 14 can be spaced apart to provide distinct separate positions (FIG. 7A). In yet another implementation, flexible member 12 can include single magnetic feature 14 that can interface with elongated magnetic feature 14 having a length that can be greater than that of the single magnetic feature (FIG. 7B). Accordingly, the relative lengths of magnetic element 14 can be widely varied. In this way, magnetic attachment afforded by magnetic element 14 can be varied in accordance with a particular application.

Figure 8A:
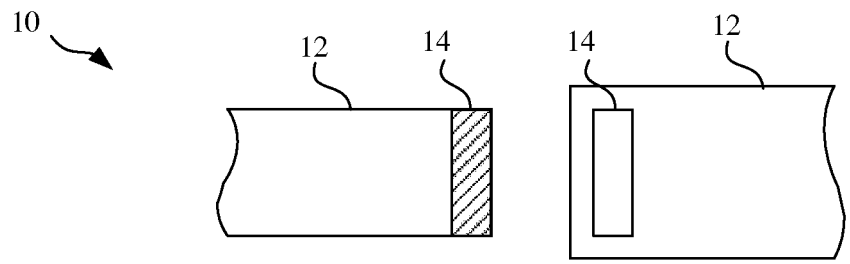
FIG. 8A is a plan view of a strap system prior to insertion.
Figure 8B:
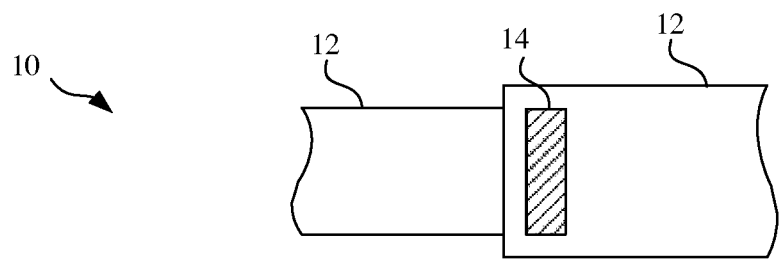
FIG. 8B is a plan view of a strap system after insertion.
Figure 9A:
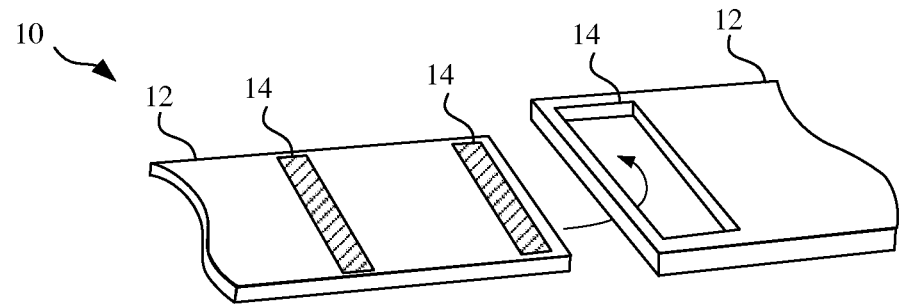
FIG. 9A is a perspective view of a strap system prior to insertion.
Figure 9B:
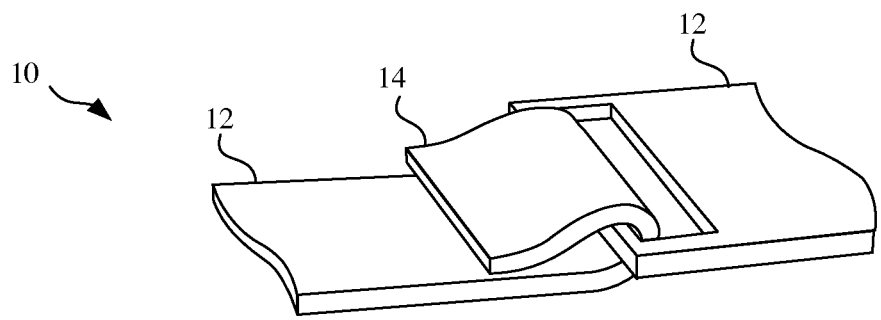
FIG. 9B is a perspective view of a strap system after insertion.
Figure 10A:
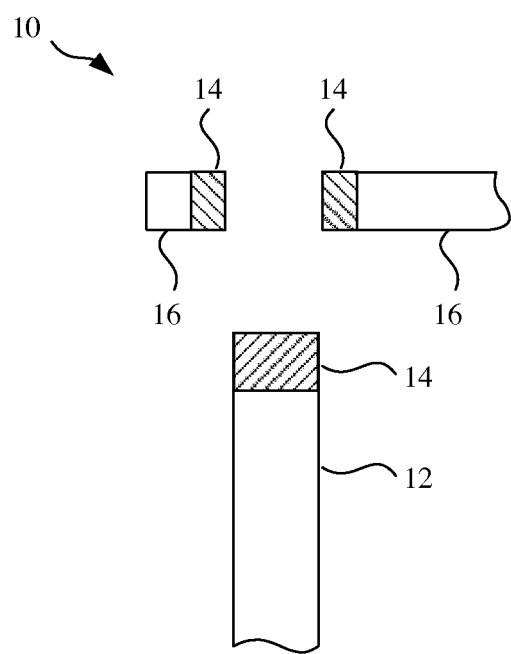
FIG. 10A is a cross-sectional view of a strap system prior to insertion.
Figure 10B:
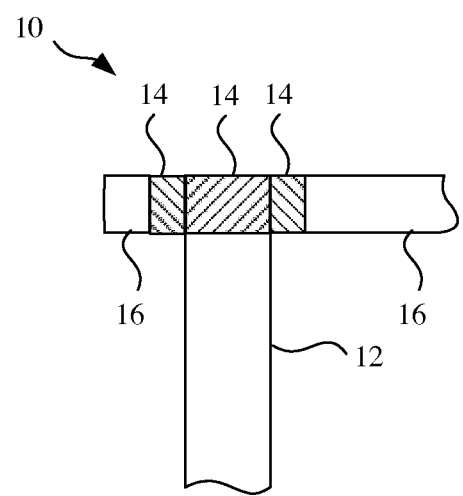
FIG. 10B is a cross-sectional view of a strap system after insertion.

FIGS. 8A-8B shows representative strap system 10 in accordance with a described embodiment. Strap system 10 can include flexible member(s) 12 and attachment feature 14. In this embodiment, attachment feature 14 can take the form of a buckle that accommodates and secures snap. In some embodiments, attachment feature 14 can use mechanical features to secure buckle and snap whereas in other embodiments, attachment feature 14 can use magnetic elements, or a combination of magnetic and ferrous elements for securing buckle and snap. Moreover, FIGS. 9A-9B shows a loop attachment system 10 in which flexible member 12 include attachment feature 14 that includes attachment elements that are spaced apart and are arranged to engage with each other so as to afford flexible member 12 the ability to form loop 26 that can engage an object. Loop attachment system 10 can be used to form an arm or leg band that can be used to releasably secure an electronic device to a user. FIGS. 10A and 10B illustrate a capture type strap system 10. In particular, capture strap system 10 can include member 12 and distributed attachment feature 14. Distributed attachment feature 14 can include attachment elements that are distributed in such a way that by cooperation, member 12 is attached to object 16. Distributed attachment system 14 can utilize magnetic elements, mechanical elements, or a combination of magnetic and mechanical elements. The attachment can be symmetric or asymmetric.

Figure 11A:
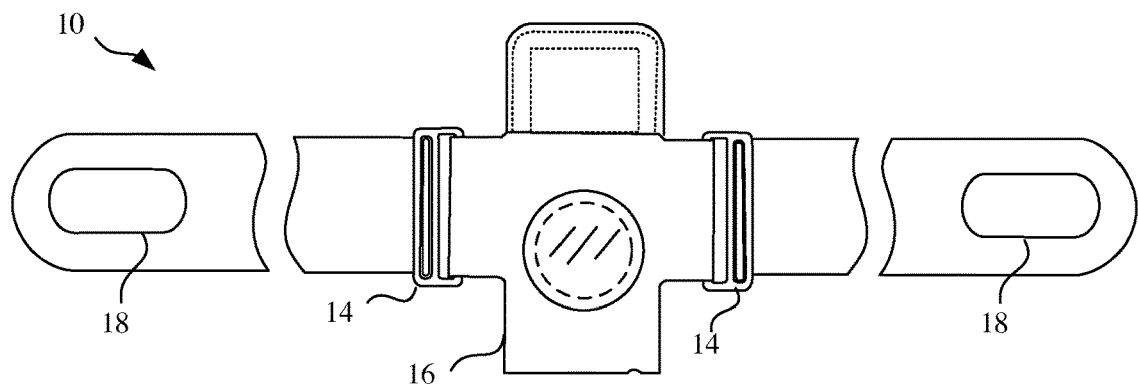
FIG. 11A is a perspective view of an attachment system.

FIG. 11A is a diagram of a strap system 10 in accordance with one embodiment. The strap system 10 is generally configured to bind one object or to hold a number of objects together. The objects may be aesthetic elements, mechanical elements, electrical elements and/or the like. The strap system 10 may for example be configured to encircle a portion of an object and/or to secure loads to the object. For example, the strap system may be used to secure an article to a body part. By way of example, the strap system may be used to secure a device to an arm or arm. The strap system may also be configured to help attach two portions of an object together. For example, the strap system may be used in soft goods such as purses, garments, accessories, or other clothing. By way of example, the strap system may be used to connect a flap to the pouch of a purse or first and second flaps of a shoe or a cover to a case. These and other embodiments will be discussed in greater detail below. The strap system can include attachment elements that are mechanical, magnetic, or a combination of mechanical and magnetic elements. Magnetic attachment elements can rely upon magnetic polarity between cooperating magnetic elements. In some cases, the magnetic polarity can provide a symmetric attachment. For example, a magnetic element regardless of magnetic polarity can form a symmetric magnetic attachment with a ferrous attachment element having no intrinsic magnetic polarity. In this way, the orientation of the magnetic element with respect to the ferrous attachment element will have no effect on the attachment. On the other hand, if both attachment elements possess an intrinsic magnetic polarity, then the attachment can be asymmetric since the attachment depends upon the spatial relationship between the magnetic elements and in particular whether a magnetic attraction or repulsion force is generated. In any case, strap system 10 includes one or more flexible members 12, attachment system 14, and carrier module 16 from which flexible members 12 extend. The carrier module 16 may be widely varied. In the illustrated example, the carrier module 16 is a pouch configured for receiving an electronic device. The pouch may receive for example any number of electronic devices including, for example, media players, communication devices, and so on. It can also receive other devices whether mechanical, electrical, and/or the like. The pouch may include a window for allowing access to the electronic device contained within the pouch. While a pouch is shown, it should be appreciated that this is not a limitation and that the carrier module 16 can take a variety of forms including soft and hard cases or skins. In addition, it may even be a device itself such as a media player, communication device or any of the others mentioned above. The flexible members 12 may also be widely varied. The flexible members 12 may be a strap, strip, cord, band, belt, ribbon, flap, girth, shackle, thong, and/or the like. In essence, it can be any length of material. In the illustrated embodiment, the flexible members 12 are straps or bands that extend along a length such that they can be wrapped around another object in order to secure the carrier module to the other object. By way of example, the straps may be used to secure the carrier module 16 to a portion of a body or an article of clothing. In cases such as this, the user does not have to hold the strap system or any load that is being carried by the strap system.

The strap system 10 includes a releasable set of one or more flexible members proximate the end that couple to the carrier module. By releasable it is meant that the flexible members can be secured to the carrier module 16 such that they cooperate as a single unit or they can be removed from the carrier module 16 such that they are discrete parts. In this manner, different flexible members can be added/removed to/from the carrier module. In order to help enable this function, the strap system 10 may include a first attachment system 14 (or a carrier attachment system) proximate the interface between the flexible member 12 and the carrier module 16. In one embodiment, the first attachment system 14 includes a carrier side attachment feature and a flexible member side attachment features. These attachment features work together to releasably hold the flexible members 12 to the carrier module 16. These features can be widely varied. In the illustrated embodiment, the flexible member side attachment feature includes an end member that engages a buckle located on the carrier member. The end member is located at the end of the flexible member and includes a mechanical structure that is received by the buckle. For example the buckle may include an opening that receives the end member therein. That is, the end member is sized and dimensioned for insertion and retention within the opening in the buckle. It should be appreciated that this particular implementation is not a limitation and that other configurations may be used. For example, instead of an end member the flexible member itself may pass through the opening and connect to another portion of the flexible member such that a loop is formed around the buckle. These and other embodiments will be described in greater detail below.

In some cases, the carrier module 16 and flexible member 12 or some combination of the two includes an additional retention feature to help hold the flexible member 12 relative to the carrier module 16. For example, with respect to the embodiment mentioned above, the buckle and/or the end member may include a retention feature to help keep the end member within the opening of the buckle. The retention member may be widely varied and may include detents, snaps, latches, catches, hooks, magnets and/or the like. The retention mechanism can take many forms. For example, the retention member can take the form of a magnet or magnetic elements arranged in such a way to provide either symmetric or asymmetric attachment. The retention mechanism can include mechanical or a combination of mechanical and magnetic aspects.

In accordance with one embodiment, the strap system 10 includes a detachable set of one or more flexible members along its length and/or proximate the end opposite the carrier module. By detachable it is meant that the flexible members can be attached to themselves and/or another flexible member. When attached, they cooperate as a single unit to form a closed loop. The closed loop can be positioned around an object as mentioned above.

When detached, they are separate parts thereby freeing the object. In this manner, the flexible members can be open and closed to secure and free the strap system to/from the object. In order to help enable this function, the strap system 10 may include a second attachment system 18 (or strap attachment system) proximate the flexible member(s). The second attachment system 18 may be widely varied. The attachment system may include one or more attachment elements such as fastener, clasp, clinch, snap, clamp, cinch, buckle, magnets and/or the like. The attachment elements can be fixed, removable or adjustable relative to the flexible member. In one embodiment, the attachment element(s) are disposed on or within the flexible member(s). By way of example, the attachment element may be embedded within the flexible member 12 such that it is not visible, hidden from view and/or provides a continuous or unbroken surface. Alternatively or additionally, the attachment element(s) may be mounted or integrated on the surface of the flexible member. Alternatively or additionally, the attachment element(s) may be a separate discrete component that is carried by the flexible member.

Strap system 10 can generally be configured to bind one object or to hold a number of objects together. The objects can be aesthetic elements, mechanical elements, electrical elements and/or the like. Strap system 10 can be, for example, configured to encircle a portion of a body to secure other objects or loads to the body. For example, strap system 10 can be secured to a waist, arms, legs, arms, neck, and the like. Moreover, strap system 10 can be configured to help attach two portions of an object together. For example, strap system 10 can be used in soft goods such as purses, garments, accessories, or other clothing. By way of example, strap system 10 can be used to connect a flap to the pouch of a purse or first and second flaps of a shoe or a cover to a case. These and other embodiments will be discussed in greater detail below.

Figure 11B:
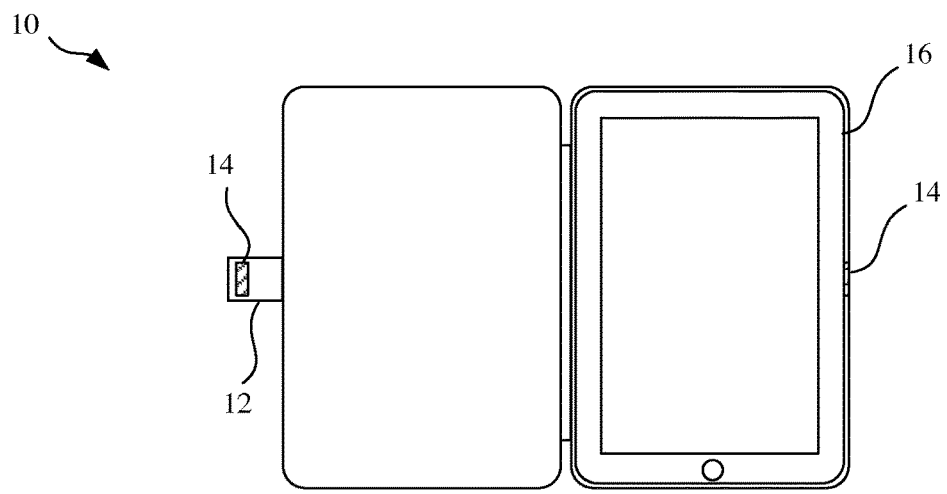
FIG. 11B is a plan view of a strap system adapted for a tablet computer.
Figure 11C:
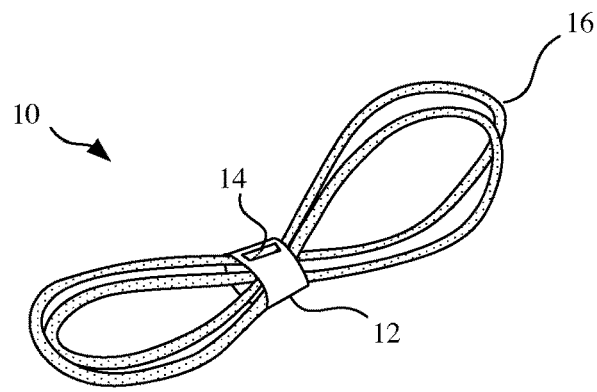
FIG. 11C is a perspective view of a strap adapted to secure a bundle of wire.
Figure 11D:
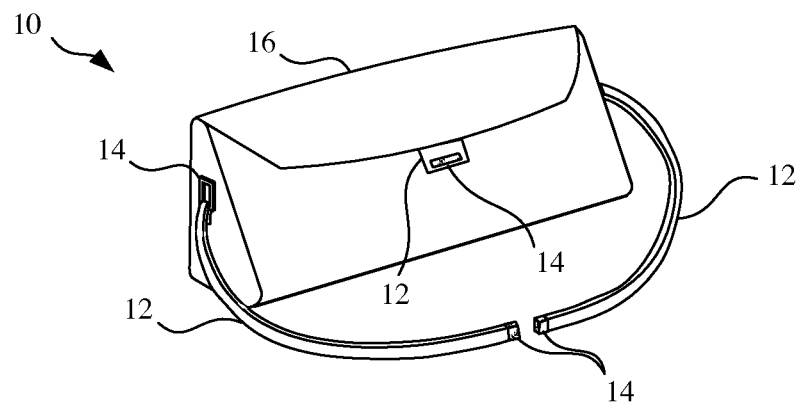
FIG. 11D is a perspective view of a strap adapted to secure a purse strap.
Figure 11E:
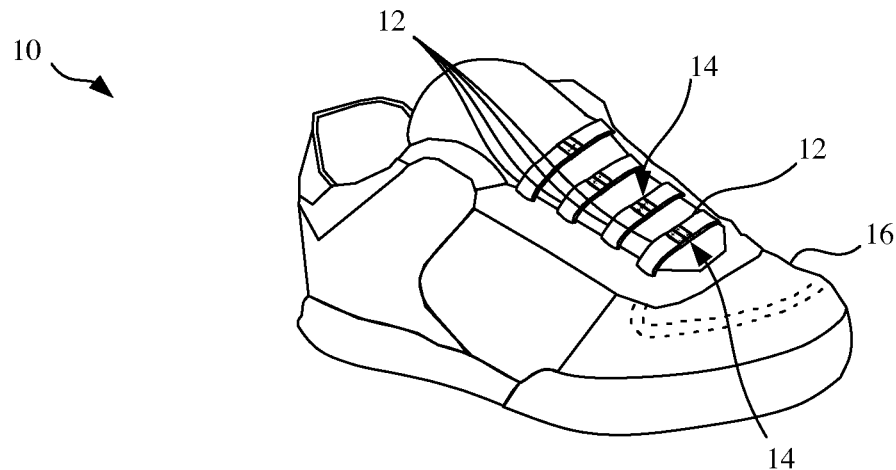
FIG. 11E is a perspective view of a strap adapted for use in shoe laces.
Figure 11F:
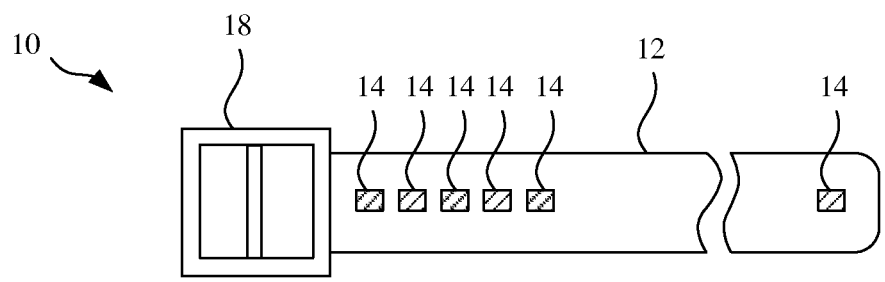
FIG. 11F is a plan view of a capture type strap.

Attachment system 14 can be magnetic, mechanical or a combination of both. FIG. 11B shows an accessory system for portable electronic device 20. The accessory system can include a flap pivotally attached to a cover suitable for supporting electronic device 20. In this regard, the flap can be open or closed with respect portable electronic device 20. When closed, the flap can be secured to the cover using strap system 10. In particular, flexible member 12 and can engage attachment feature 14. FIG. 11C shows a cable system that is secured by strap system 10. FIG. 11D shows a purse system that can be secured using strap system 10 that utilizes two separate flexible members. In one embodiment, a first flexible member can be used to help secure a flap to the pouch whereas a second flexible member can be used to form a continuous strap that can be placed around a shoulder. FIG. 11E shows a shoe system that includes strap system 10 incorporating multiple straps and associated flexible members to help secure shoe flaps in position for holding the shoe on a foot. FIG. 11F shows a belt that includes strap system. It should be noted that there and other figures are only exemplary and it should be appreciated that strap system 10 can be extended to other products/articles.

Figure 12A:
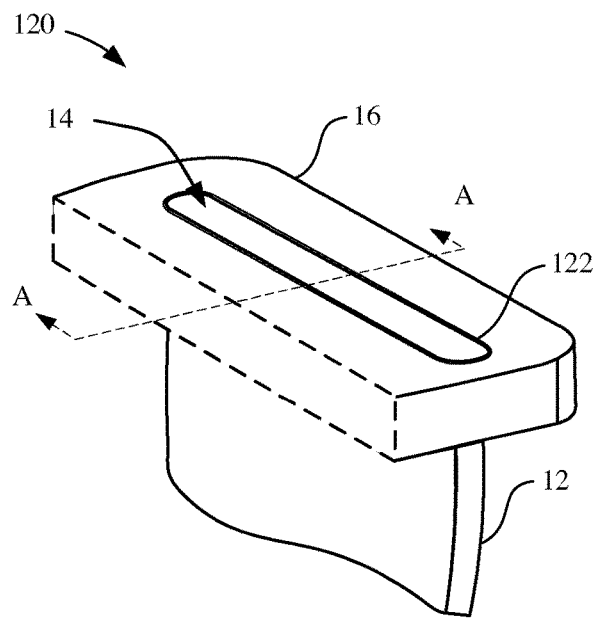
FIG. 12A is a perspective view of a strap system.
Figure 12B:
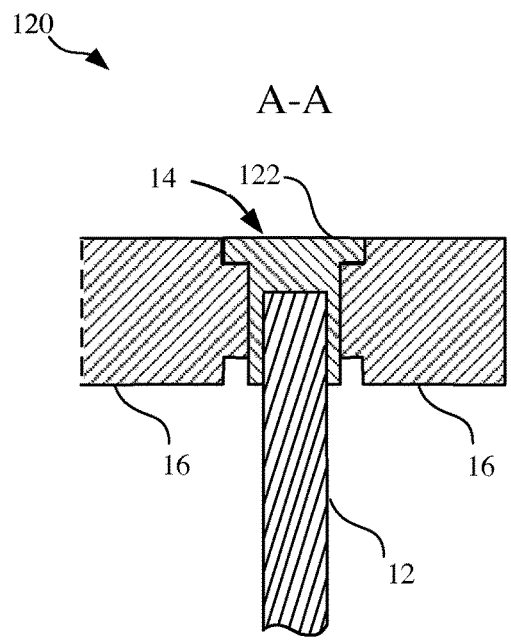
FIG. 12B is a cross-sectional view of a strap system.
Figure 12C:
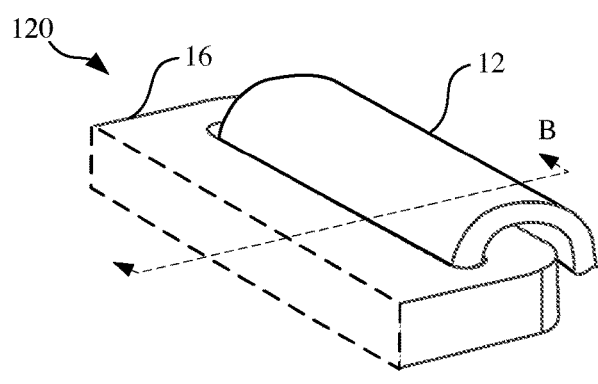
FIG. 12C is a perspective view of a reversed strap system.
Figure 12D:
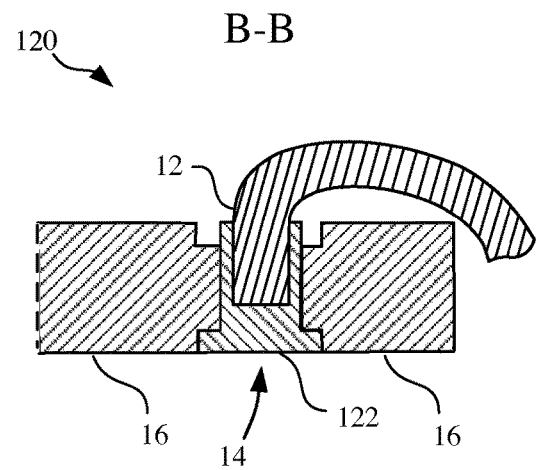
FIG. 12D is a cross-sectional view of a reversed strap system.

FIGS. 12A-12D show strap system 120, in accordance with one embodiment of the disclosure. FIG. 12A illustrates how attachment system 14 couples flexible member 12 to object 16. Object 16 can represent an entire object or a portion of an object to which flexible member 12 can be attached using, for example, magnets embedded with flexible member 12. In this way, the magnets cannot be seen and the magnetic attraction can be personalized in such a way that the magnetic attachment can be "softened". By softened it is meant that although a secure magnetic attachment is created, the manner that the attachment is formed is smooth and does not possess (if desired) a hard mechanical sound when attachment is made. Therefore, by embedding or otherwise overlaying the magnetic elements, a user can experience, again if desired, a "snap-less" magnetic attachment. On the other hand, if the use desires the sound and feel of a secure "snap" then by simply exposing or otherwise reducing the interfacing layers of member 12, the desired degree of "snap" can be provided. In one embodiment, object 16 can represent an edge of an electronic device and flexible member 12 can represent a strap configured to secure the electronic device. It should be noted that FIG. 12B shows cross-sectional view A-A of strap system 120. As depicted, an opening can be provided in object 16 and flexible member 12 can be inserted through the opening in object 16. Flexible member 12 can include end cap 122 located at a free end of flexible member 12. End cap 122 can be mechanically coupled to flexible member 12 using adhesives, threading, crimping, or any other feasible means of providing a robust connection. In some embodiments, end cap 122 can include one or more flanges along a surface facing away from flexible member 12. Furthermore, the opening in object 16 can include a recess configured to interlock with the flanges on end cap 122 and prevent flexible member 12 from passing through the opening in object 16. In other embodiments, the flanges on end cap 122 and recess in object 16 can be replaced by any interlocking structure capable of preventing flexible member 12 from passing through object 16. For example, interlocking angled surface can be included in both end cap 122 and object 16. In still other embodiments, a second recess can be provided at an opposite end of the opening in object 16, allowing flexible member 12 to be inserted from the opposite direction. FIGS. 12C and 12D show isometric and cross-sectional views respectively of such a configuration. As depicted, flexible member 12 can be inserted through a bottom surface of object 16 and end cap 122 can interlock with the corresponding recess located at the bottom surface of object 16. In one embodiment, the surface of the end cap 122 can be flush with the surface of the object 16 when inserted into the opening. In one embodiment, the object 16 includes a protruding member that includes an opening. In this way, the protruding member creates a surrounding wall or loop around the opening. The opening can include, for example, a flange portion.

Figure 13A:
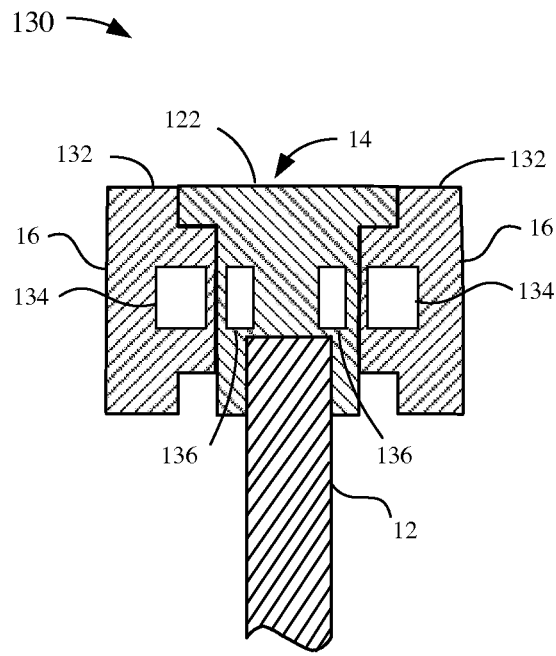
FIG. 13A is a cross-sectional view of a strap system with magnetic features.
Figure 13B:
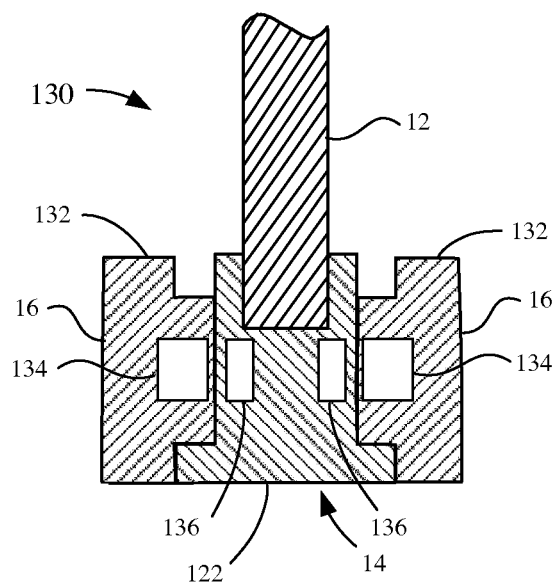
FIG. 13B is a cross-sectional view of a reversed strap system with magnetic features.

FIGS. 13A and 13B depict strap system 130, in accordance with another embodiment of the disclosure. Strap system 130 operates similarly to strap system 120 but employs magnets or other attachment means to secure end cap 122 within the opening in object 16. FIG. 13A shows a cross-sectional view of attachment system 14 of strap system 130. As shown above, flexible member 12 can include end cap 122 and flanges on end cap 122 can interlock with a recess provided in object 16. In addition, magnetic features 134 can be located within object 16 and magnetic features 136 can be located within end cap 122. It should be noted that while two magnetic features are depicted in each of object 16 and end cap 122, any number of individual magnetic features can be used. Moreover, magnetic features 134 and 136 can represent magnets, ferrous materials, or any combination thereof. In one embodiment, magnetic features 134 and 136 can be oriented to allow flexible member 12 to be inserted from either end of object 16. For example, both magnetic features 134 can have a polarity P1 and both magnetic features 136 can have a polarity P2. The attractive forces between opposing poles of magnetic features 134 and 136 can cause end cap 122 to remain securely within the opening in object 16 once placed in position. Moreover, as shown in FIG. 13B, flexible member 12 can be inserted through a lower surface of object 16 and the above mentioned polarities of magnetic features 134 and 136 can still operate to retain flexible member 12 within object 16.

Figure 14A:
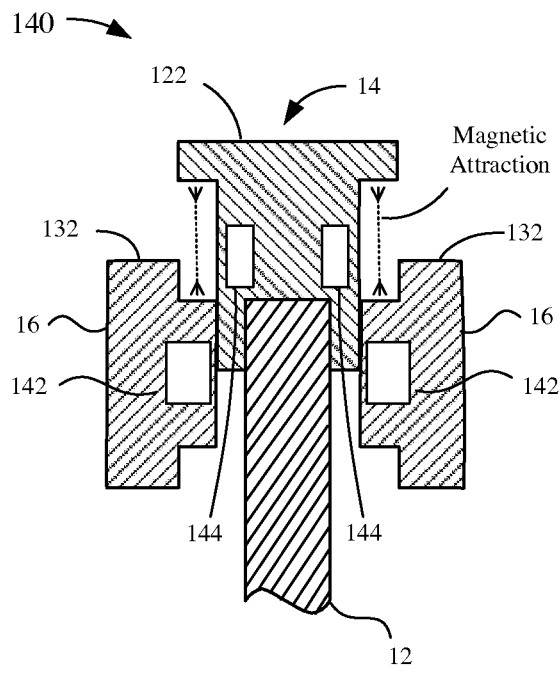
FIG. 14A is a cross-sectional view of a strap system with magnetic features.
Figure 14B:
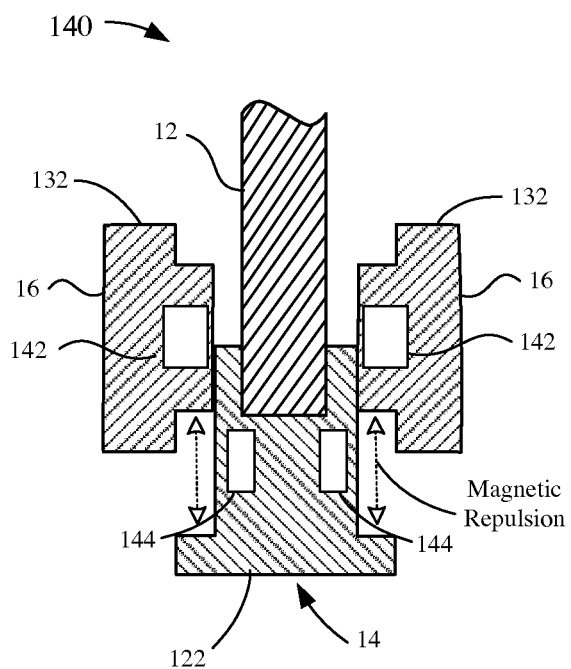
FIG. 14B is a cross-sectional view of a reversed strap system with magnetic features.

FIGS. 14A and 14B show strap system 140, demonstrating another embodiment of the disclosure. Strap system 140 can be arranged similarly to strap system 130. However, the polarities of magnetic features in strap system 140 can be configured to allow flexible member 12 to enter object 16 in only one direction. FIG. 14A shows a cross-sectional view of strap system 140. Magnetic features 142 can be provided in object 16 and magnetic features 144 can be provided in end cap 122. Furthermore, the polarities of magnetic features 142 and 144 can be reversed. For example, the left instance of magnetic feature 142 can have a polarity P1 while the right instance of magnetic feature 142 can have a polarity P2. Similarly, the left instance of magnetic feature 144 can have a polarity P2 while the right instance of magnetic feature 144 can have a polarity P1. As depicted in FIG. 14A, opposing poles are aligned with one another so an attractive force can secure end cap 122 within the opening in object 16. However, when flexible member 12 is inserted through the lower surface of object 16, as is depicted in FIG. 14B, like poles are aligned with one another and a repulsive force can prevent a user from inserting flexible member 12 incorrectly. Thus, the arrangement of magnetic features 142 and 144 in strap system 140 can restrict users to inserting flexible member 12 in only one direction.

FIGS. 15A and 15B show strap system 150, according to another embodiment of the disclosure. Unlike previous embodiments, strap system 150 can include only one magnetic feature in each of end cap 122 and object 16. FIG. 15A shows a cross-sectional view of strap system 150 with flexible member 12 inserted from an upper side of object 16. Magnetic feature 154 can be included in object 16 and magnetic feature 156 can be included in end cap 122. The locations of magnetic features 154 and 156 can be configured such that opposing poles of magnetic features 154 and 156 are aligned with one another when flexible member 12 is inserted as shown in FIG. 15A. However, when flexible member 12 is inserted from a lower side of object 16, as is shown in FIG. 15B, magnetic features 154 and 156 can be unable to attract one another. Thus, strap system 150 can provide a firm attachment between end cap 122 and the opening in object 16 only when flexible member 12 is inserted in a desired direction.

Figure 16A:
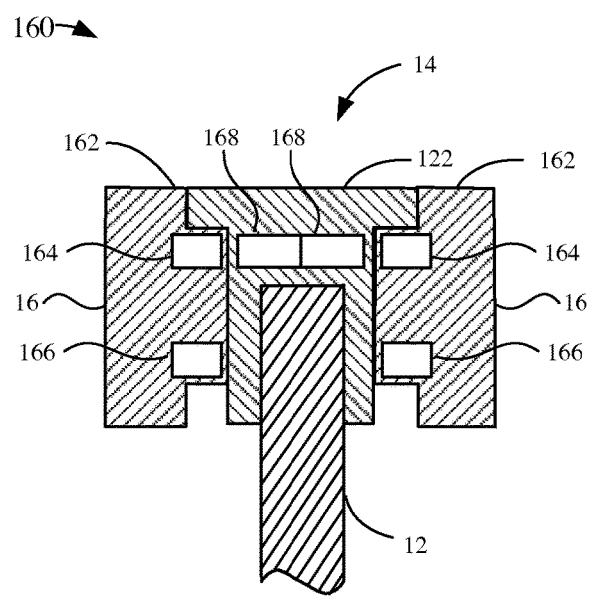
FIG. 16A is a cross-sectional view of a strap system with magnetic features.
Figure 16B:
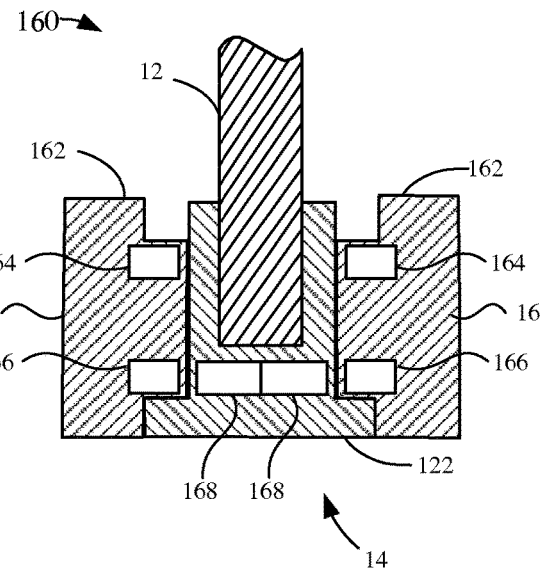
FIG. 16B is a cross-sectional view of a reversed strap system with magnetic features.

FIGS. 16A and 16B show strap system 160, according to another embodiment of the disclosure. Strap system 160 can retain end cap 122 and flexible member 12 within object 16 using a variety of magnetic features. FIG. 16A shows a cross-sectional view of strap system 160. Magnetic features 164 can be located near an upper surface of object 16 and magnetic features 166 can be located near a lower surface of object 16. In addition, magnetic features 168 can be located within end cap 122 and configured to align with either magnetic feature 164 or magnetic features 166 depending on the direction in which flexible member 12 is inserted through object 16. Furthermore, the polarities of magnetic features 164, 166, and 168 can be configured to retain end cap 122 within object 16 regardless of the direction in which flexible member 12 is inserted. For example, magnetic features 164 and magnetic features 166 can both have a polarity P1 while magnetic features 168 have a polarity P2. In this configuration, opposite poles of the magnetic features attract one another and retain end cap 122 within object 16 both when flexible member 12 is inserted from an upper side of object 16 (FIG. 16A) and when flexible member 12 is inserted from a lower side of object 16 (FIG. 16B). Therefore, flexible member 12 can be inserted from either direction and strap system 160 can still function to retain end cap 122 within object 16.

Figure 17A:
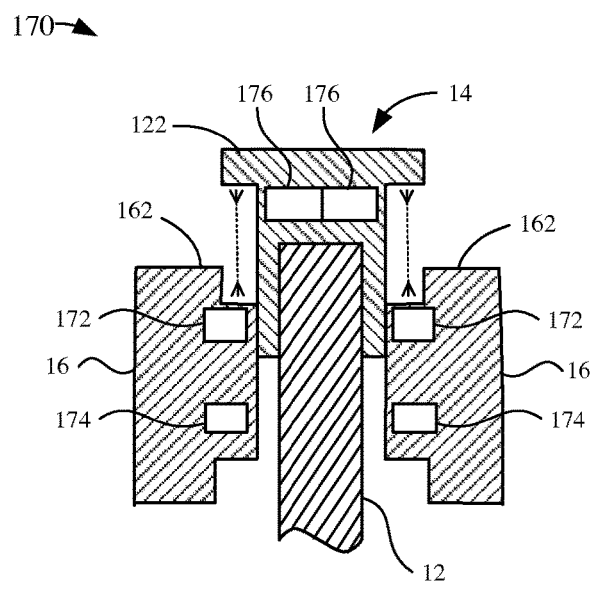
FIG. 17A is a cross-sectional view of a strap system with magnetic features.
Figure 17B:
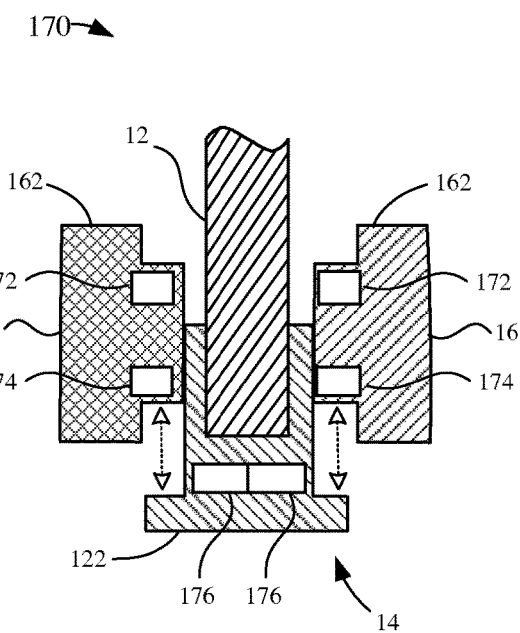
FIG. 17B is a cross-sectional view of a reversed strap system with magnetic features.

FIGS. 17A and 17B show strap system 170, according to another embodiment of the disclosure. Strap system 170 can be arranged similar to strap system 160. However, the polarities of magnetic features can be re-configured to allow insertion of flexible member 12 into object 16 in one direction only. FIG. 17A shows a cross-sectional view of strap system 170. Magnetic features 172 can be located near an upper surface of object 16 and magnetic features 174 can be located near a lower surface of object 16. In addition, magnetic features 176 can be located within end cap 122 and configured to align with either magnetic feature 164 or magnetic features 166 depending on the direction in which flexible member 12 is inserted through object 16. Furthermore, the polarities of magnetic features 164, 166, and 168 can be configured to retain end cap 122 within object 16 when flexible member 12 is inserted from a first direction and repel end cap 122 from object 16 when flexible member 12 is inserted from a second direction. For example, the left instances of magnetic features 172 and 174 can have a polarity P1 while the right instances of magnetic features 172 and 174 can have a polarity P2. Furthermore, the left instance of magnetic feature 176 can have a polarity P2 while the right instance of magnetic feature 176 can have a polarity P1. In this configuration, opposite poles of magnetic features 172 and 176 attract one another when flexible member 12 is inserted from a first direction as is shown in FIG. 17A. However, as is shown in FIG. 17B, when flexible member 12 is inserted from the second direction, like poles of magnetic features 174 and 176 repel one another and prevent the user from inserting end cap 122 into object 16.

FIGS. 18A and 18B show strap system 180, according to another embodiment of the disclosure. Strap system 180 can include at least four magnetic features in both object 16 and end cap 122. FIG. 18A shows a cross-sectional view of strap system 180. Magnetic features 182 can be located near an upper surface of object 16 and magnetic features 184 can be located near a lower surface of object 16. In addition, magnetic features 186 can be located near an upper surface of end cap 122 and magnetic features 188 can be located near a lower surface of end cap 122. Magnetic features 186 and 188 can be configured to align with either magnetic feature 182 or magnetic features 184 depending on the direction in which flexible member 12 is inserted through object 16. Furthermore, the polarities of magnetic features 182, 184, 186, and 188 can be configured to retain end cap 122 within object 16 regardless of the direction in which flexible member 12 is inserted. For example, magnetic features 182 and magnetic features 184 can both have a polarity P1 while magnetic features 186 and magnetic features 188 both have a polarity P2. In this configuration, opposite poles of the magnetic features attract one another and retain end cap 122 within object 16 both when flexible member 12 is inserted from an upper side of object 16 (FIG. 18A) and when flexible member 12 is inserted from a lower side of object 16 (FIG. 18B). Therefore, flexible member 12 can be inserted from either direction and strap system 180 can still function to retain end cap 122 within object 16.

FIGS. 19A and 19B show strap system 190, according to another embodiment of the disclosure. Strap system 190 can be arranged similar to strap system 180. However, the polarities of magnetic features can be re-configured to allow insertion of flexible member 12 into object 16 in one direction only. FIG. 19A shows a cross-sectional view of strap system 190. Magnetic features 192 can be located near an upper surface of object 16 and magnetic features 194 can be located near a lower surface of object 16. In addition, magnetic features 196 can be located near an upper surface of end cap 122 and magnetic features 198 can be located near a lower surface of end cap 122. Magnetic features 196 and 198 can be configured to align with either magnetic feature 192 or magnetic features 194 depending on the direction in which flexible member 12 is inserted through object 16. Furthermore, the polarities of magnetic features 192, 194, 196, and 198 can be configured to retain end cap 122 within object 16 when flexible member 12 is inserted from a first direction and repel end cap 122 from object 16 when flexible member 12 is inserted from a second direction. For example, the left instances of magnetic features 192 and 194 can have a polarity P1 while the right instances of magnetic features 192 and 194 can have a polarity P2. Furthermore, the left instances of magnetic features 196 and 198 can have a polarity P2 while the right instances of magnetic features 196 and 198 can have a polarity P1. In this configuration, opposite poles of magnetic features 192, 194, 196, and 198 attract one another when flexible member 12 is inserted from a first direction as is shown in FIG. 19A. However, as is shown in FIG. 19B, when flexible member 12 is inserted from the second direction, like poles of magnetic features 192, 194, 196, and 198 repel one another and prevent the user from inserting end cap 122 into object 16.

Figure 20A:
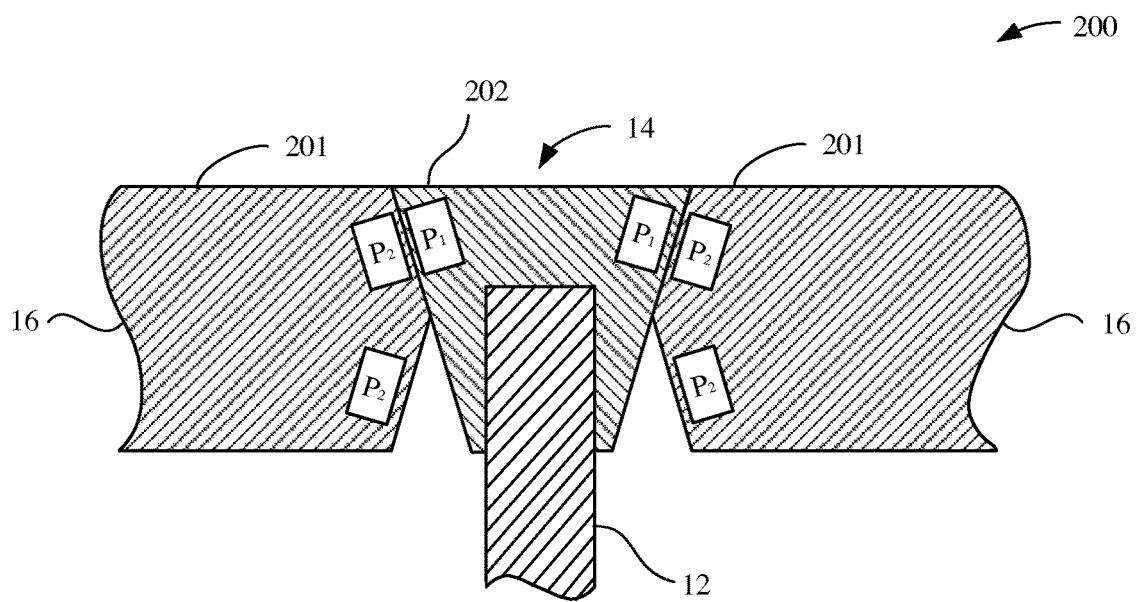
FIG. 20A is a cross-sectional view of a strap system with magnetic features.
Figure 20B:
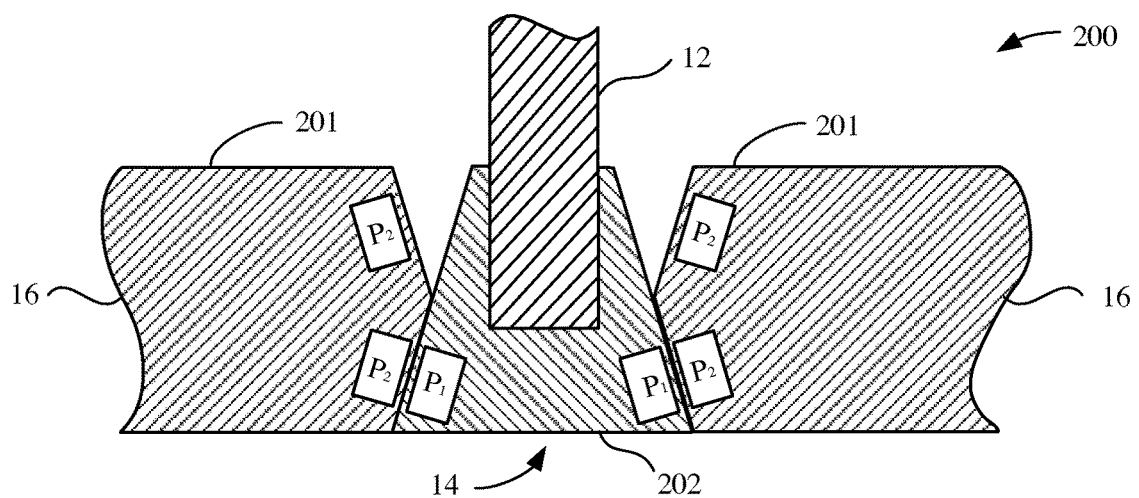
FIG. 20B is a cross-sectional view of a reversed strap system with magnetic features.

FIGS. 20A and 20B show strap system 200, demonstrating another embodiment of the disclosure. FIG. 20A shows a cross-sectional view of strap system 200. Flexible member 12 can include end cap 202 located at a free end of flexible member 12. End cap 122 can be mechanically coupled to flexible member 12 using adhesives, threading, crimping, or any other feasible means of providing a robust connection. In addition, end cap 202 can have angled sides such that end cap 202 becomes wider in a direction away from flexible member 12. Object 16 can include a non-uniform opening shaped to interlock with end cap 202. In some embodiments, the non-uniform opening in object 16 can have similar features on both sides of object 16 so that the opening can interlock with end cap 202 in multiple directions.

Furthermore, attachment system 14 can include one or more magnetic features included in end cap 202 and object 16. In one embodiment, magnetic features having a polarity P1 can be included in end cap 202 and magnetic features having a polarity P2 can be included in object 16. The magnetic features included in object 16 can be positioned to align with the magnetic features in end cap 202. Then, magnetic forces generated by the magnetic features can retain end cap 202 within the opening in object 16. In some embodiments, magnetic features can be positioned so that magnetic forces can retain end cap 202 regardless of the direction in which flexible member 12 is inserted into the opening in object 16. For example, FIG. 20A shows flexible member 12 inserted in a downward direction and FIG. 20B shows flexible member 12 inserted in an upward direction.

Figure 21A:
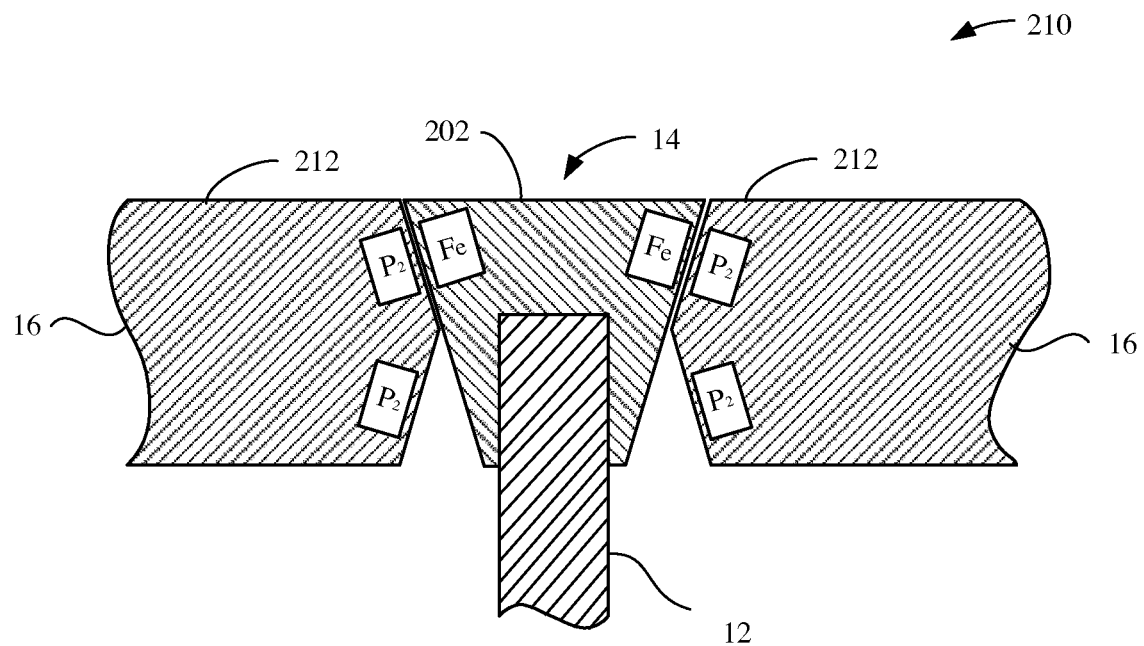
FIG. 21A is a cross-sectional view of a strap system using ferrous materials.
Figure 21B:
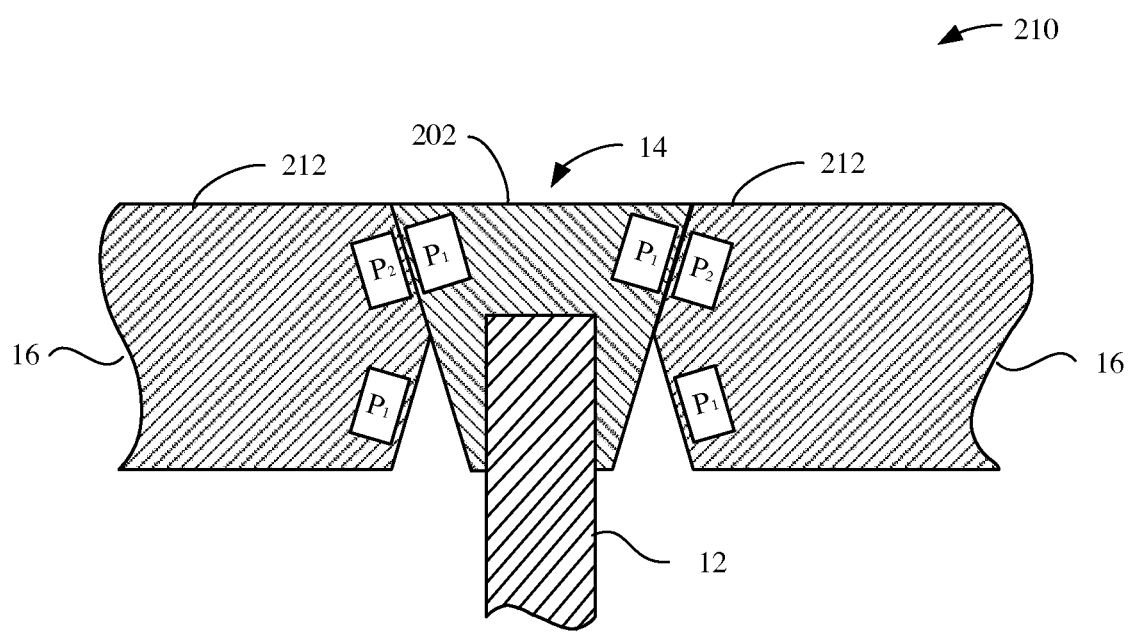
FIG. 21B is a cross-sectional view of a reversed strap system with magnetic features.

FIGS. 21A and 21B illustrate strap system 210, demonstrating alternative methods of configuring magnetic features within attachment system 14. Magnetic features can consist of magnets or ferrous materials. Any set of magnetic features configured to attract one another can consist of either two magnets with opposite poles oriented towards one another or a magnet and a ferrous material such as steel or iron. For example, FIG. 21A shows a cross-sectional view of strap system 210 and attachment system 14. Magnets having polarity P2 oriented inwards can be positioned within object 16 and corresponding ferrous materials can be included in end cap 202. An attractive force is then generated between the magnets and the ferrous material. In another embodiment, magnets can be included in end cap 202 and ferrous materials can be included in object 16. In still another embodiment, magnets can have polarity P1 facing towards the ferrous materials. FIG. 21B shows an alternative method of configuring magnets within strap system 210 to prevent flexible member 12 from being inserted through object 16 in one direction. As shown, magnets within end cap 202 can have a polarity P1 oriented outwards. Furthermore, magnets positioned near surface 212 of object 16 can have a polarity P2 oriented towards end cap 202 while magnets positioned away from surface 212 of object 16 can have polarity P1 oriented towards end cap 202. When flexible member 12 is inserted downwards as shown in FIG. 21B, opposite poles of magnets in end cap 202 and object 16 can attract one another and flexible member 12 is retained within object 16. However, if flexible member 12 is inserted upwards then like poles of magnets in end cap 202 and object 16 can repel one another and prevent flexible member 12 from being fully inserted into object 16.

Figure 22A:
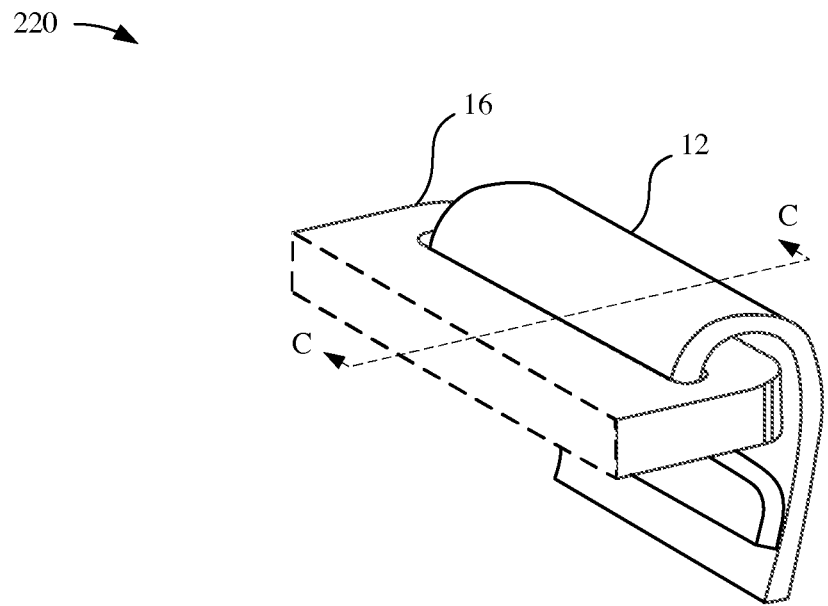
FIG. 22A shows a perspective view of a strap system.
Figure 22B:
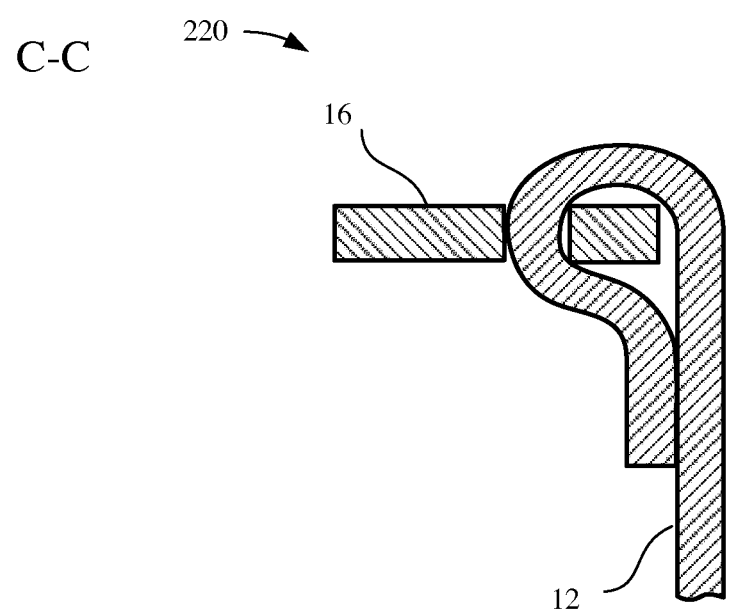
FIG. 22B shows a cross-sectional view of a strap system.

FIGS. 22A-22B show strap system 220, according to another embodiment of the disclosure. FIGS. 22A and 22B show isometric and cross-sectional views of a flexible member 12 engaging an opening disposed in object 16. By threading a first end of flexible member 12 through the opening in object 16, the first end of flexible member 12 can be folded back on a central portion of flexible member 12. Contact between the first end of flexible member 12 and the central portion of flexible member 12 can cause the two portions to be coupled to together. In this way flexible member 12 can be firmly attached to object 16. The coupling can be accomplished in any number of ways. For example, the two portions can be coupled together by adhesive, Velcro®, magnetic attraction, or any other way of providing a secure coupling. While only a portion of object 16 is depicted, the depicted portion can represent an end portion of almost any object. Being secured in this manner allows flexible member 12 to rotate with respect to object 16. In this way, flexible member can pivotally secure object 16 to any of a number of other objects. In a more specific embodiment, an object 16 can have two flexible members 12 that can be configured to cooperate to secure object 16 around another example, such as for example, a body or arm.

Figure 23A:
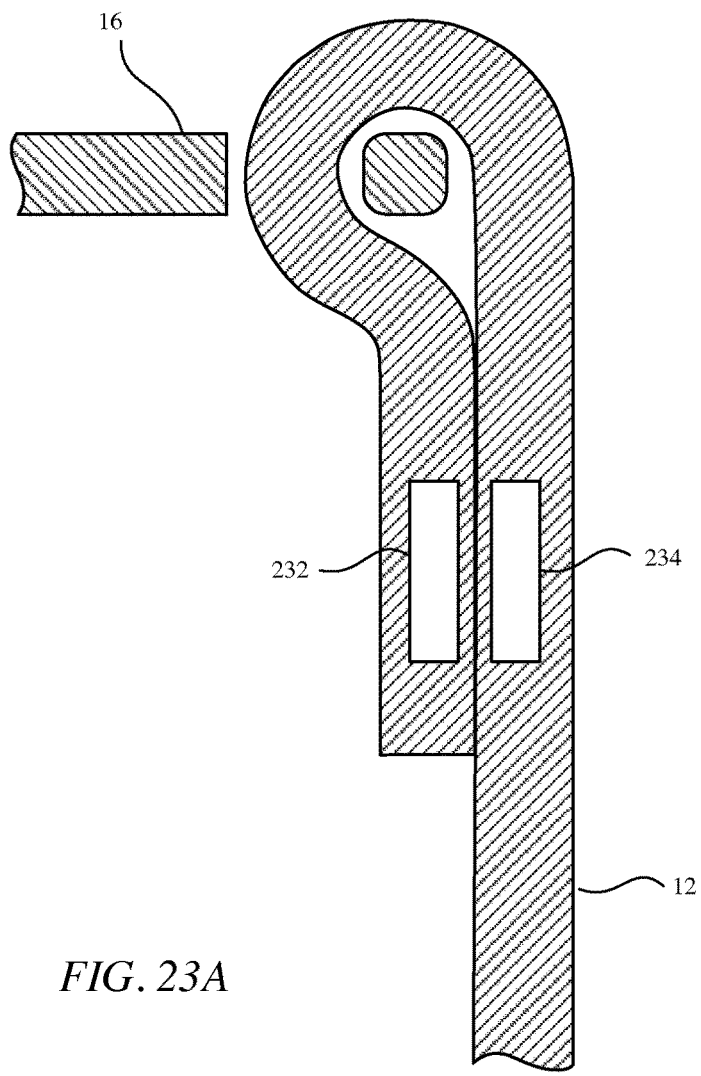
FIG. 23A shows a cross-sectional view of a strap system.
Figure 23B:
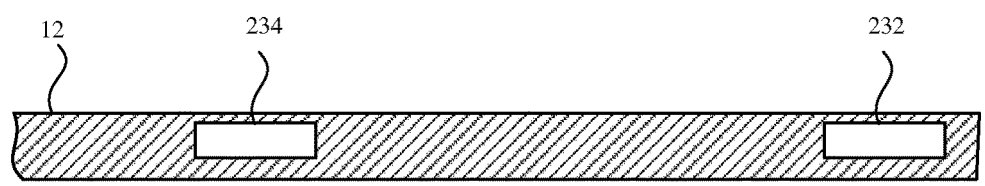
FIG. 23B shows a cross-sectional view of a strap system.

FIGS. 23A-23B show strap system 230, according to another embodiment of the disclosure. In this embodiment flexible member 12 is again threaded through an opening in object 16. An attachment feature 232 disposed in a first end of flexible member 12 couples the first end of flexible member 12 to a central portion of flexible member 12. This coupling can be accomplished by interaction between attachment feature 232 and attachment feature 234. Several methods of coupling can be used including bonding, threading, magnetic attraction, or any other feasible method of coupling attachment features 232 and 234. In some embodiments, attachment features 232 and 234 can represent magnets and the magnets can be oriented such that opposing poles are oriented towards one another when in position as depicted in FIG. 23A. By using magnets, flexible member 12 can be quickly and easily removed from object 16 when desired, as is shown in FIG. 23B.

Figure 24A:
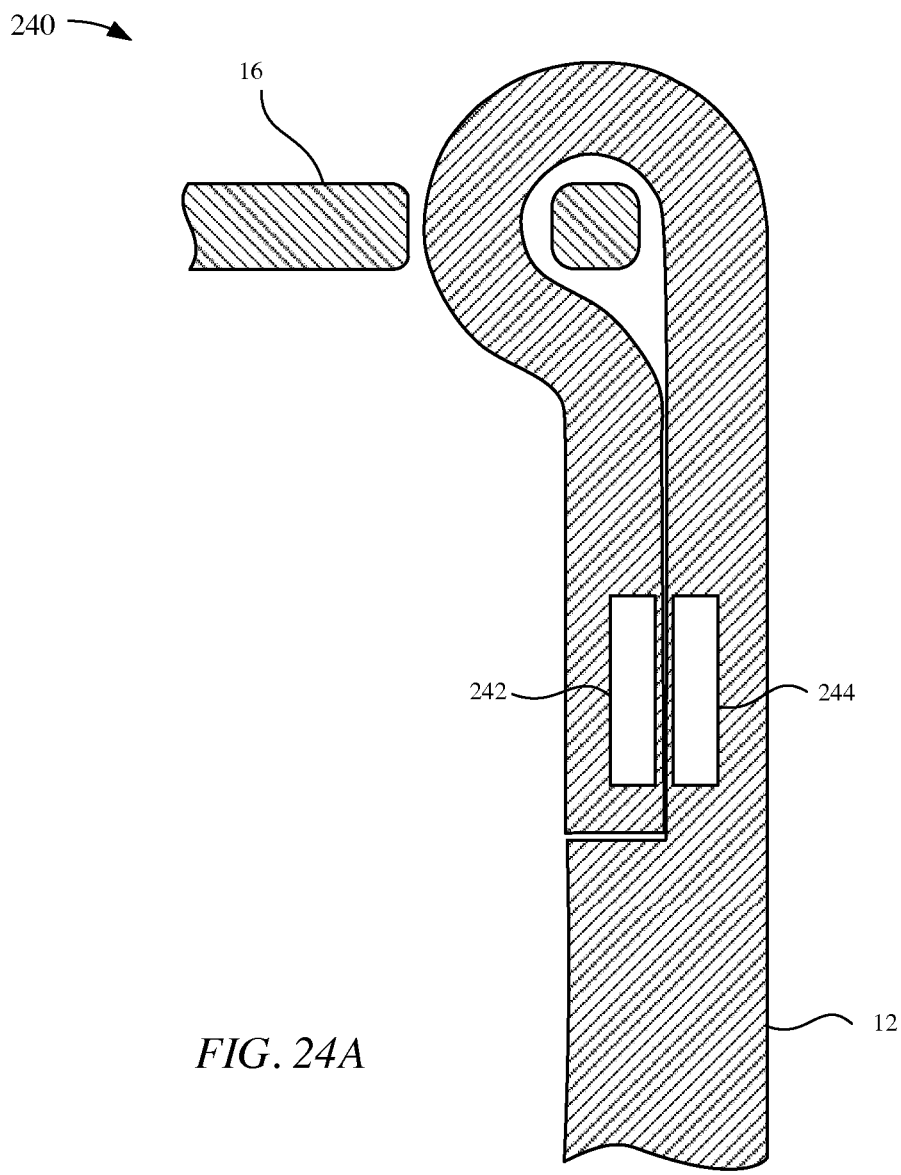
FIG. 24A shows a cross-sectional view of a strap system including a recessed area.
Figure 24B:
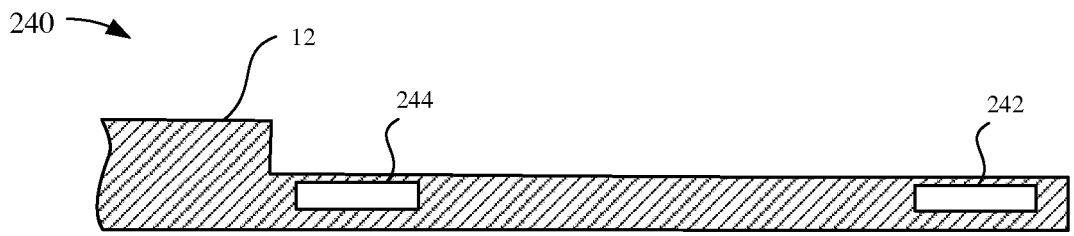
FIG. 24B shows a cross-sectional view of a strap system including a recessed area.
Figure 25A:
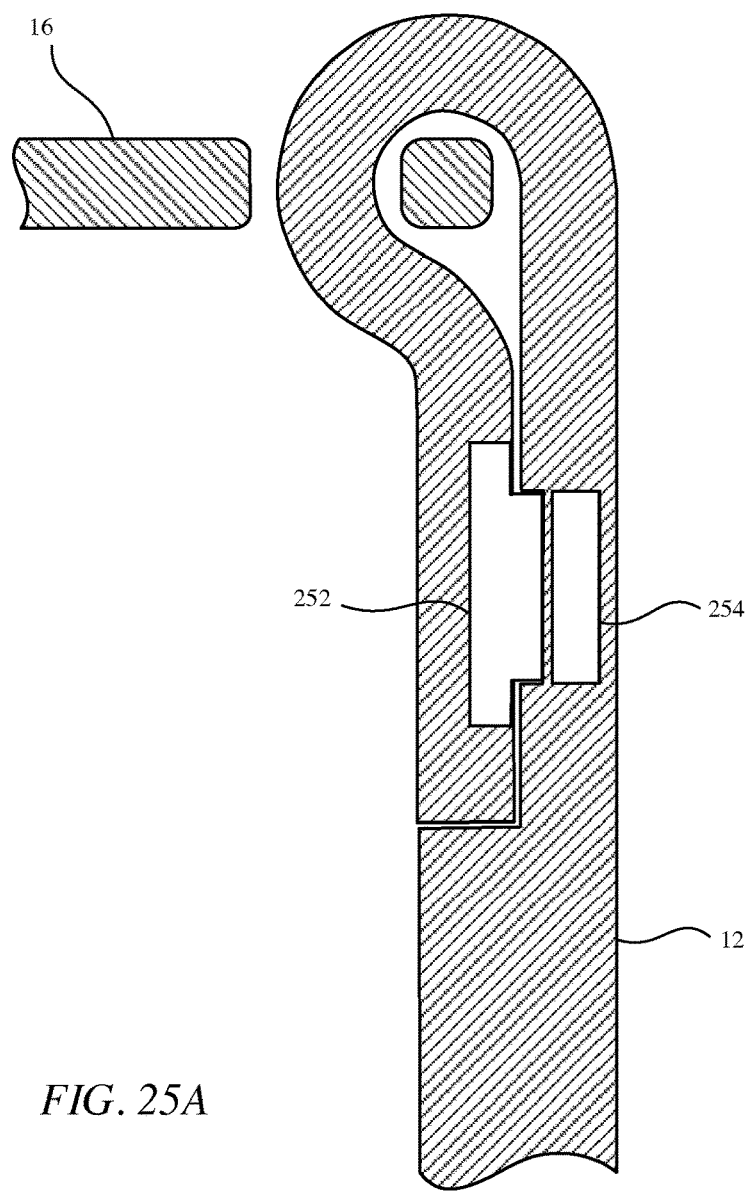
FIG. 25A shows a cross-sectional view of a strap system including a recessed area and a magnetic feature.
Figure 25B:
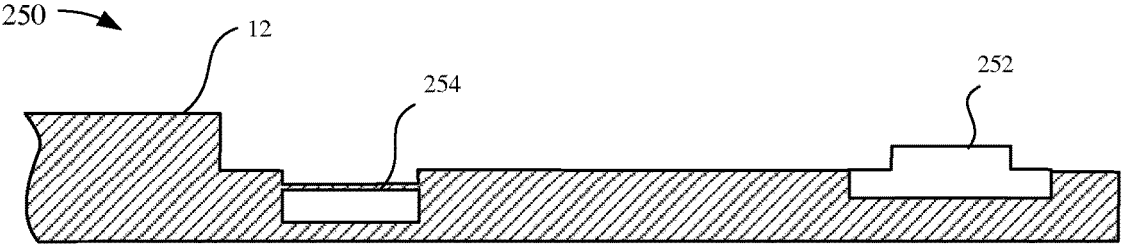
FIG. 25B shows a cross-sectional view of a strap system including a recessed area and a magnetic feature.

FIGS. 24A and 24B show strap system 240, according to another embodiment of the disclosure. Similar to strap system 230, flexible member 12 can be threaded through an opening in object 16. Furthermore, attachment features 242 and 244 can be included in flexible member 12. In some embodiments, flexible member 12 can have a varying thickness configured to allow flexible member 12 to present a uniform surface when a the free end of flexible member 12 folds back to bring attachment features 242 and 244 together. Similar to previous embodiments, attachment features 242 and 244 can couple to one another using bonding, threading, magnetic attraction, or any other feasible method of coupling attachment features 242 and 244. The varying thickness provided in flexible member 12 can create a more aesthetically pleasing appearance to strap system 240, enhancing a user's experience. In addition, when strap system 240 is worn against skin, the uniform surface presented by strap system 240 can be less irritating to the user's skin. FIGS. 25A and 25B show strap system 250, demonstrating an alternative embodiment of strap system 240. Strap system 250 includes attachment features 252 and 254. Attachment feature 252 can include a section that protrudes above the surface of flexible member 12. Furthermore, attachment feature 254 can be located in a recess in flexible member 12 configured to interlock with the protruding section of attachment feature 252. In this way, the recess can guide attachment feature 254 into attachment feature 252.

Figure 26A:
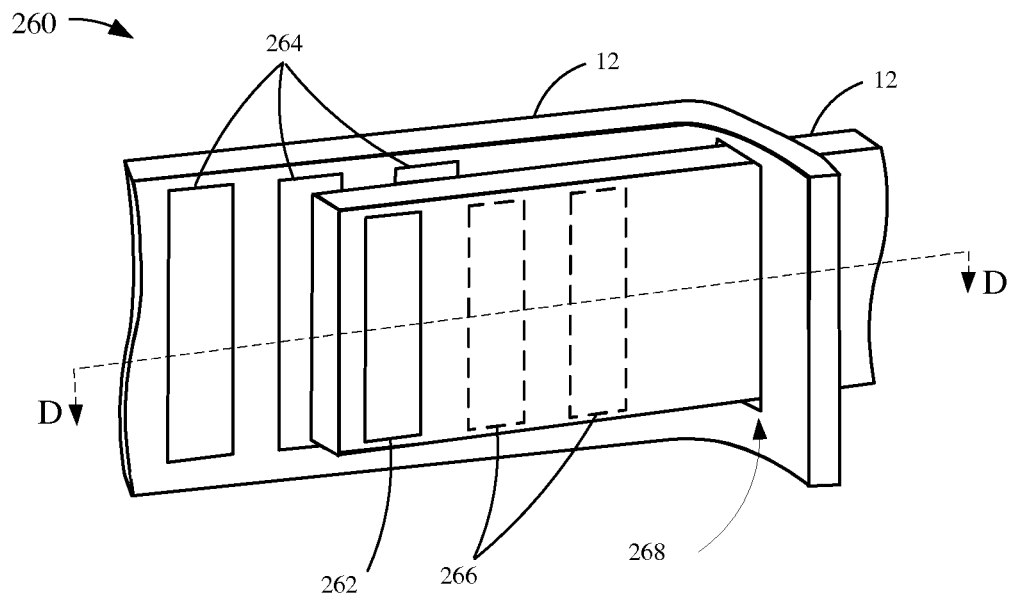
FIG. 26A shows a cross-sectional view of a strap system including a magnetic feature.
Figure 26B:
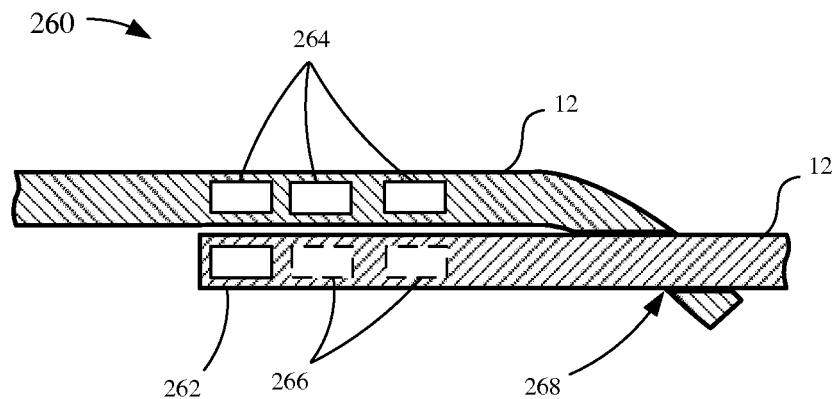
FIG. 26B shows a cross-sectional view of a strap system including a magnetic feature.

FIGS. 26A and 26B show strap system 260, according to another embodiment of the disclosure. Strap system 260 can include a first end and a second end of flexible member 12. The first end of flexible member 12 can include an opening and the second end of flexible member 12 can pass through the opening in the first end of flexible member 12. A number of attachment features 264 can be included in the first end of flexible member 12 at regular intervals. In addition attachment feature 262 can be provided near the second end of flexible member 12. As the second end of flexible member 12 slides through the opening in the first end of flexible member 12, attachment feature 262 can come into alignment with different instances of attachment feature 264. In this manner, strap system 260 can be adjusted to fit an individual user or object. In some embodiments, additional attachment features 266 can be provided at regular intervals along the second end of flexible member 12. Additional attachment features 266 can come into alignment with additional instances of attachment features 264, increasing the strength of the attachment. Attachment features 262, 264, and 266 can represent a variety of fastening means, including snaps, magnetic features, clasps, and the like. When attachment features 262, 264, and 266 represent magnetic features, magnets, ferrous materials, or a combination of magnets and ferrous materials can be used. It should be noted that in some embodiment, the magnetic features can be arranged in such a way to provide a continuous magnetic attachment. In other embodiments, the magnetic features can provide a more discrete or indexed form of magnetic attachment.

Figure 27A:
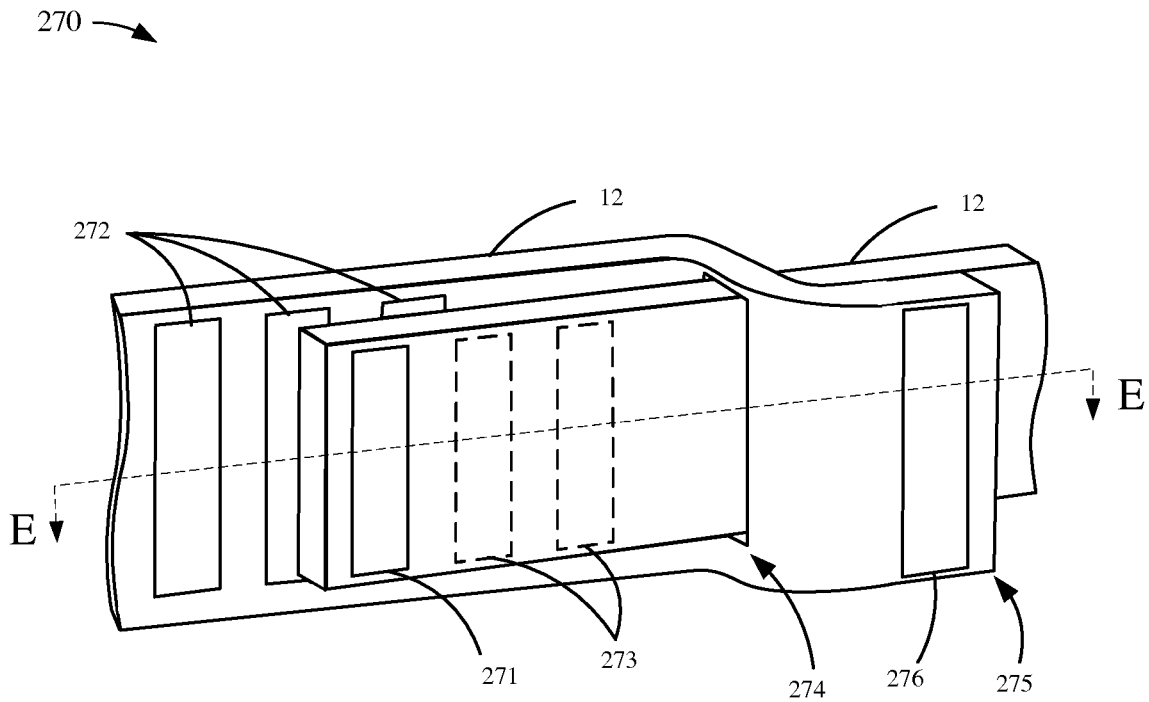
FIG. 27A shows a perspective view of a strap system including magnetic features.
Figure 27B:
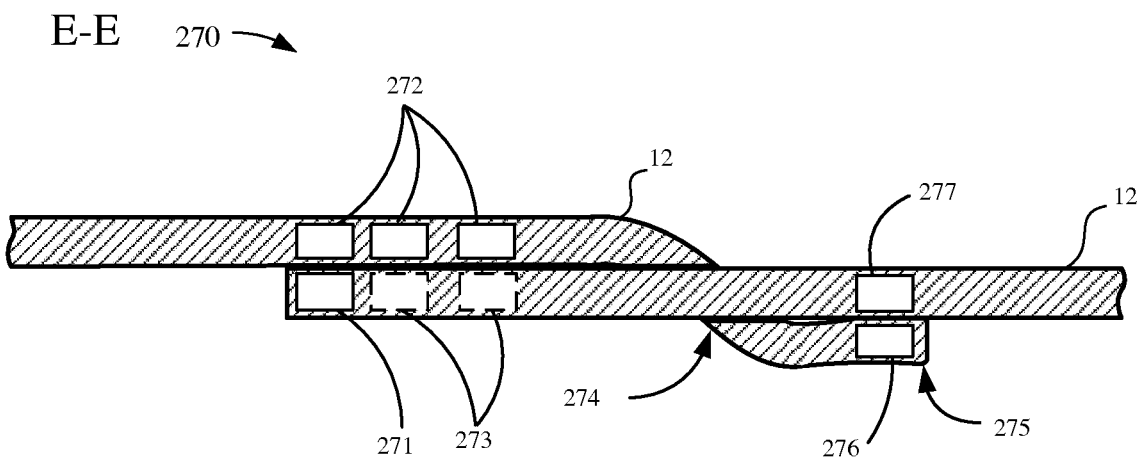
FIG. 27B shows a cross-sectional view of a strap system including magnetic features.

FIGS. 27A and 27B show strap system 270, according to another embodiment of the disclosure. Strap system 270 can include a first end and a second end of flexible member 12. The first end of flexible member 12 can include an opening and the second end of flexible member 12 can pass through the opening in the first end of flexible member 12. A number of attachment features 272 can be included in the first end of flexible member 12 spaced at regular intervals. In addition, attachment feature 271 can be provided near the second end of flexible member 12. Attachment feature 271 can attach to different instances of attachment features 272 as the size of strap system 270 is adjusted. In some embodiments, additional attachment features 273 can be provided along the second end of flexible member 12 to provide additional strength to the attachment. In addition, attachment features 276 and 277 can be provided in the first and second ends of flexible member 12 respectively to prevent the first end of flexible member 12 from protruding outwards. Attachment features 271, 272, 273, 276, and 277 can represent a variety of fastening means as was described in FIGS. 26A and 26B. It should be noted that in some embodiment, the magnetic features can be arranged in such a way to provide a continuous magnetic attachment. In other embodiments, the magnetic features can provide a more discrete or indexed form of magnetic attachment.

Figure 28A:
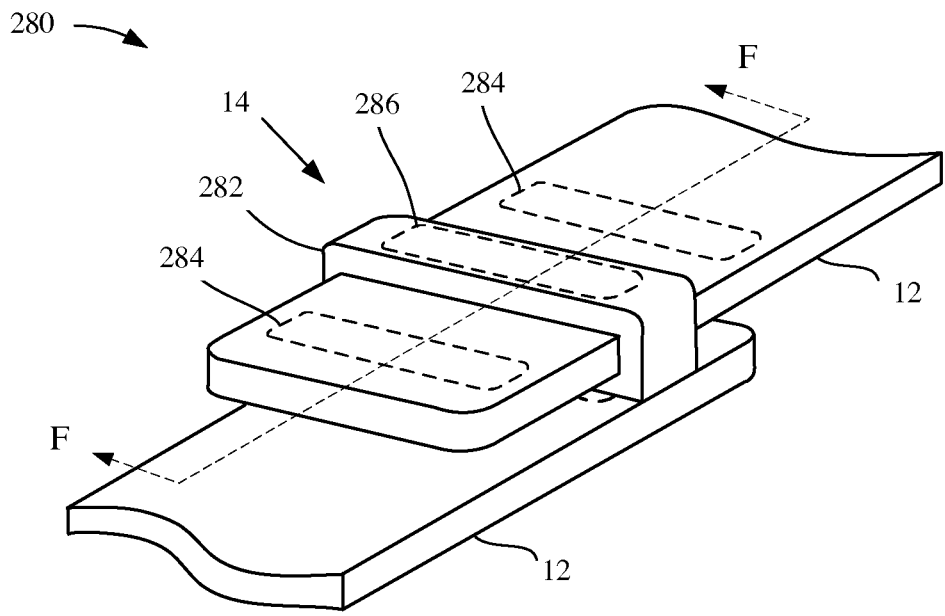
FIG. 28A shows a perspective view of a strap system including a clasp and magnetic features.
Figure 28B:
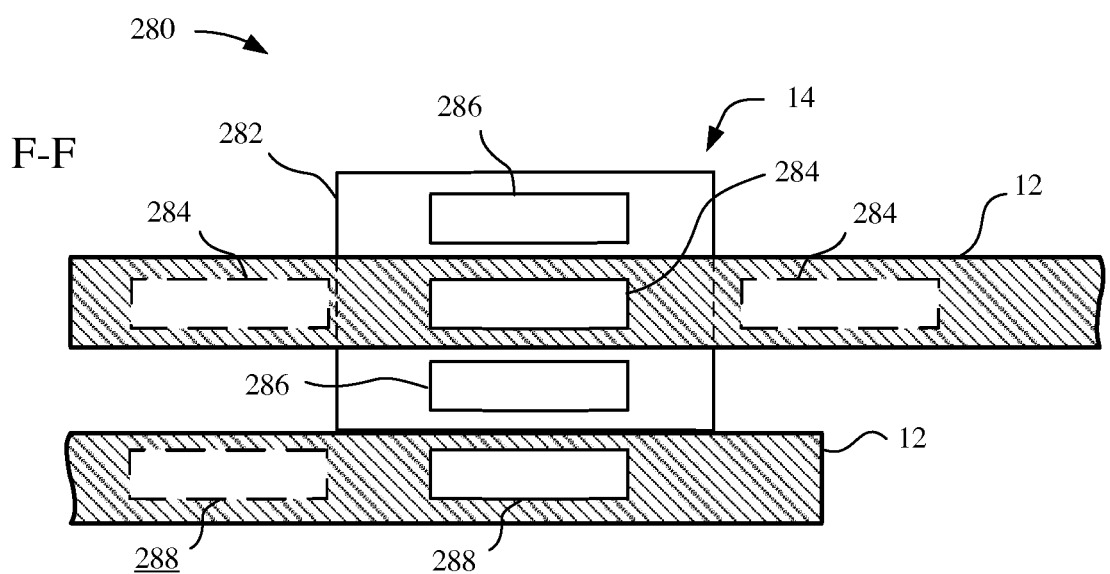
FIG. 28B shows a cross-sectional view of a strap system including a clasp and magnetic features.

FIGS. 28A and 28B show strap system 280, in accordance with one embodiment of the disclosure. FIG. 28A shows a perspective view of strap system 280. Strap system 280 can include upper flexible member 12 and lower flexible member 12. In other embodiments, either upper flexible member 12 or lower flexible member 12 can represent a portion of object 16. Strap system 280 can also include attachment system 14. Attachment system 14 can further include clasp 282. Clasp 282 can have a recess allowing upper flexible member 12 to pass through clasp 282. Furthermore, clasp 282 can include one or more magnetic features 286 embedded in clasp 282.

FIG. 28B shows a cross-sectional view F-F of strap system 280, demonstrating a possible arrangement of magnetic elements within clasp 282, upper flexible member 12, and lower flexible member 12. Upper flexible member 12 can include one or more magnetic features 284. Similarly, lower flexible member 12 can include one or more magnetic features 288. Finally, clasp 282 can include magnetic features 286 positioned above and below the recess provided in clasp 282. Magnetic features 284, 286, and 288 can represent magnets, ferrous materials that interface with a magnet, or any other magnetic material. In other embodiments, magnetic features 284, 286, and 288 can also represent mechanical mechanisms such as buttons, snap mechanisms, and hook/catch mechanisms that cooperate with a magnetic or ferrous material. Magnetic features 286 can be oriented to provide an attractive force between magnetic features 286 located within clasp 282 and magnetic features 284 located within upper flexible member 12. This attractive force can allow clasp 282 to remain in a fixed position relative to one of magnetic features 284.

Similarly, magnetic features 288 can be oriented to provide an attractive force between magnetic features 288 and lower magnetic feature 286. By adjusting the position of clasp 282 relative to upper flexible member 12, the size of strap system 280 can be easily and quickly adjusted. Moreover, the attraction between magnetic features 286 and magnetic features 288 can allow strap system 280 to be quickly fastened.

Figure 29A:
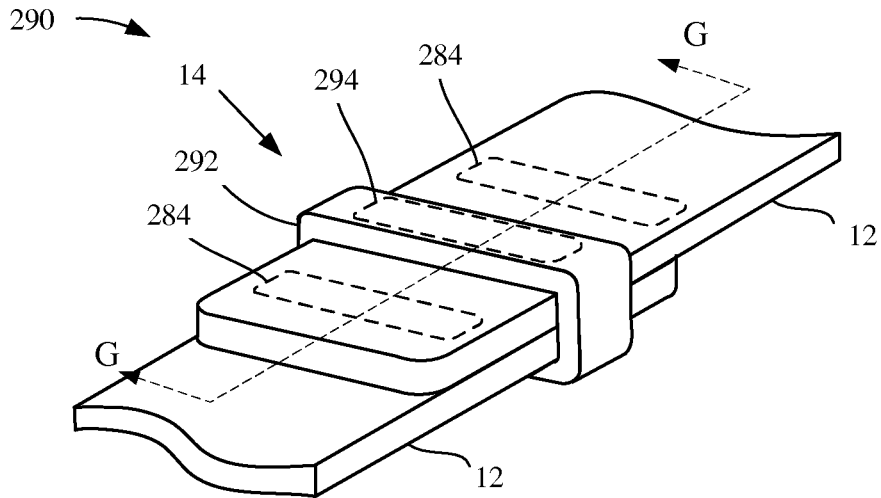
FIG. 29A shows a perspective view of a strap system including a clasp and magnetic features.
Figure 29B:
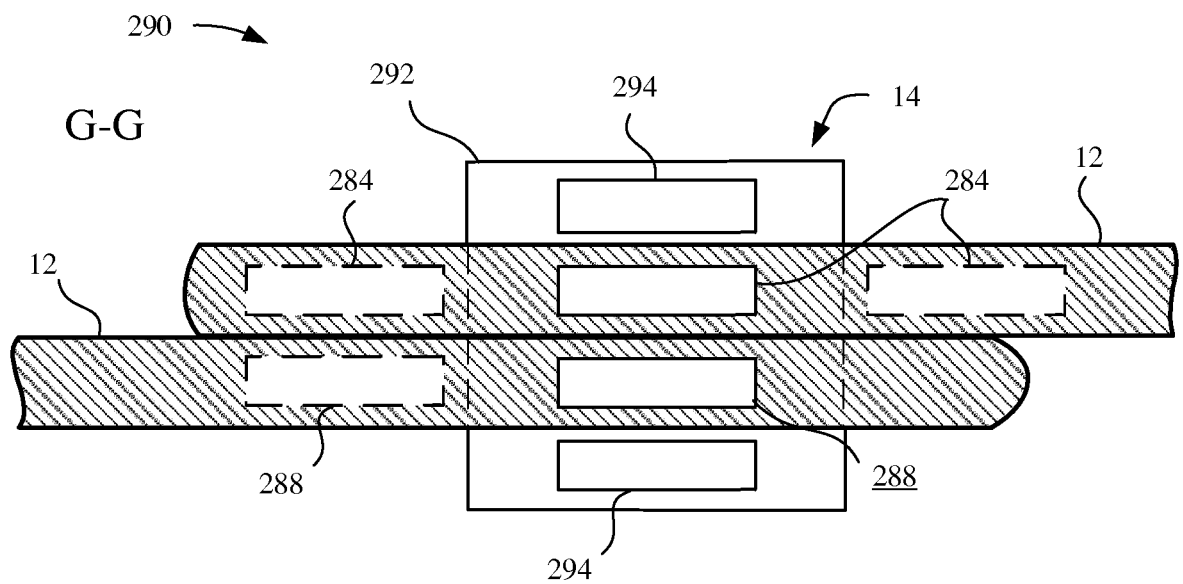
FIG. 29B shows a cross-sectional view of a strap system including a clasp and magnetic features.

FIGS. 29A and 29B show strap system 290, in accordance with one embodiment of the disclosure. FIG. 29A shows a perspective view of strap system 290. Strap system 290 can include upper flexible member 12 and lower flexible member 12. In other embodiments, either upper flexible member 12 or lower flexible member 12 can represent a portion of object 16. Strap system 290 can include attachment system 14. Attachment system 14 can further include clasp 292. Clasp 292 can have a recess allowing both upper flexible member 12 and lower flexible member 12 to pass through clasp 292. Furthermore, clasp 282 can include one or more magnetic features 286 embedded in upper and lower surfaces of clasp 292.

FIG. 29B shows a cross-sectional view G-G of strap system 290, demonstrating a possible arrangement of magnetic elements within clasp 292, upper flexible member 12, and lower flexible member 12. Similar to strap system 280, upper flexible member 12 can include one or more magnetic features 284. Similarly, lower flexible member 12 can include one or more magnetic features 288. Finally, clasp 292 can include magnetic features 294 positioned above and below the recess provided in clasp 292. Magnetic features 284, 288, and 294 can represent magnets, ferrous materials that interface with a magnet, or any other magnetic material. In other embodiments, magnetic features 284, 288, and 294 can also represent mechanical mechanisms such as buttons, snap mechanisms, and hook/catch mechanisms that cooperate with a magnetic or ferrous material. Upper magnetic feature 294 can be oriented to provide an attractive force between upper magnetic feature 294 located within clasp 282 and magnetic features 284 located within upper flexible member 12. This attractive force can allow clasp 282 to remain in a fixed position relative to one of magnetic features 284. Similarly, lower magnetic feature 294 can be oriented to provide an attractive force between lower magnetic feature 294 and magnetic features 288. By adjusting the position of clasp 292 relative to upper flexible member 12 and lower flexible member 12, the size of strap system 290 can be easily and quickly adjusted. Moreover, the attraction between magnetic features 286 and magnetic features 288 can allow strap system 280 to be quickly fastened.

Figure 30A:
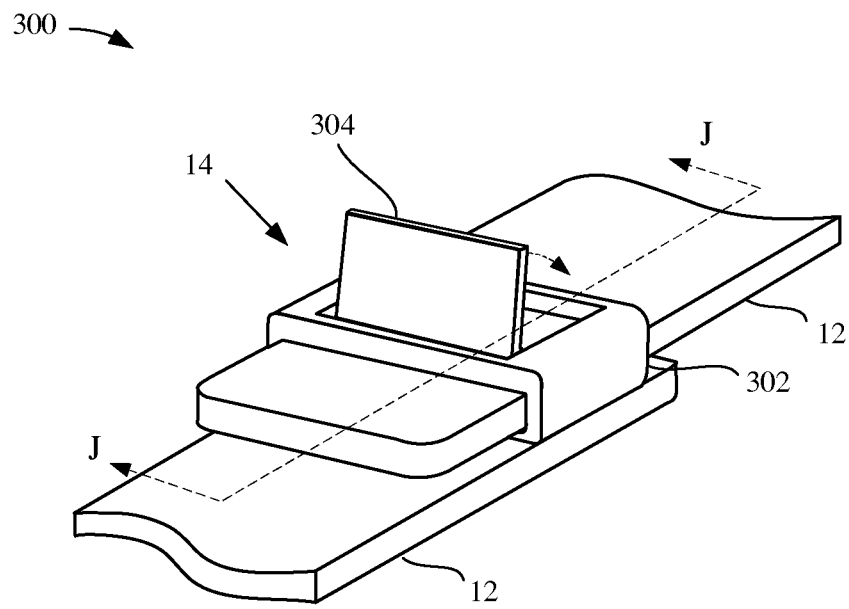
FIG. 30A shows a perspective view of a strap system including a clasp and magnetic features.
Figure 30B:
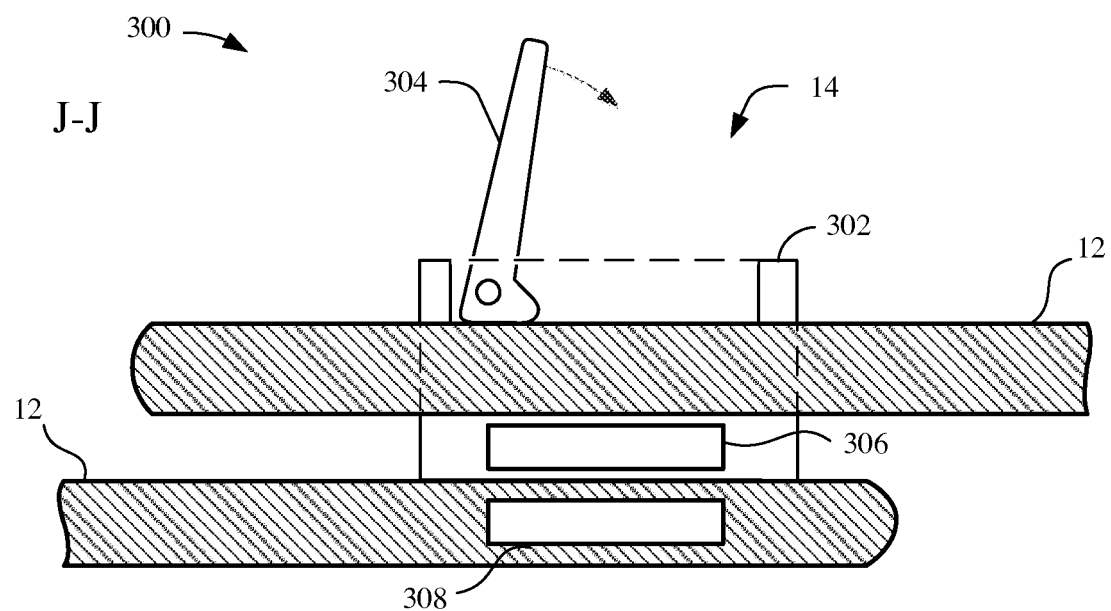
FIG. 30B shows a cross-sectional view of a strap system including a clasp and magnetic features.

FIGS. 30A and 30B show strap system 300, in accordance with one embodiment of the disclosure. FIG. 30A shows a perspective view of strap system 300. Strap system 300 can include upper flexible member 12 and lower flexible member 12. In other embodiments, either upper flexible member 12 or lower flexible member 12 can represent a portion of object 16. Strap system 300 can include attachment system 14. Attachment system 14 can further include clasp housing 302 and clasp member 304. Clasp housing 302 can include a recess allowing upper flexible member 12 to pass through clasp housing 302. Furthermore, clasp housing 302 can be rotatably connected to clasp member 304. Clasp member 304 can include a detent capable of exerting a force on upper flexible member 12 when clasp member 304 is rotated in the direction shown. The force exerted by clasp member 304 can retain clasp housing 302 in position relative to upper flexible member 12.

FIG. 30B shows a cross-sectional view J-J of strap system 300. As is shown, clasp housing 302 can also include magnetic feature 306. In addition, lower flexible member 12 can include magnetic feature 308. Magnetic features 306 and 308 can represent magnetic materials, ferrous materials, or any combination thereof. Furthermore, magnetic features 306 and 308 can be oriented such that an attractive force results between magnetic features 306 and 308. This magnetic force can couple upper flexible member 12 to lower flexible member 12 during use. In other embodiments, magnetic features 306 and 308 can be replaced with a mechanical fastening means such as a fastener, clasp, snap, clamp, buckle, or the like. The size of strap system 300 can be easily adjusted by opening clasp member 304 and sliding clasp housing 302 along upper flexible member 12 in a desired direction.

Figure 31:
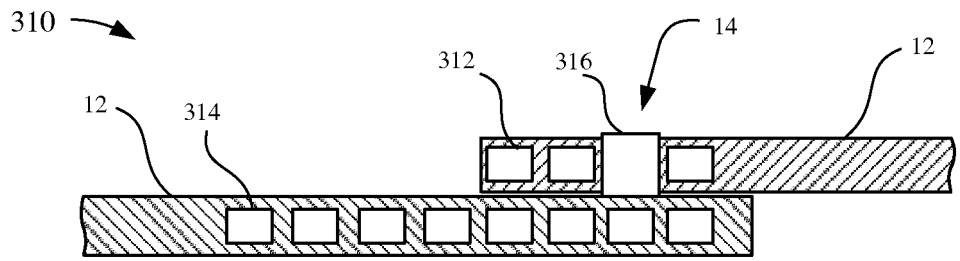
FIG. 31 shows a cross-sectional view of a strap system including a magnetic feature.

FIG. 31 shows a cross-sectional view of strap system 310, in accordance with another embodiment of the disclosure.

Strap system 310 can include upper flexible member 12 and lower flexible member 12. In other embodiments, either upper flexible member 12 or lower flexible member 12 can be replaced with a portion of object 16. Attachment system 14 can include a number of magnetic features embedded in upper and lower flexible members 12.

In particular, upper flexible member 12 can include one or more magnetic features 312 and lower flexible member 12 can include one or more magnetic features 314. Magnetic features 312 and 314 can be oriented such that an attractive force is applied between magnetic features 312 and 314. In some embodiments, both magnetic features 312 and 314 can represent magnetic materials. In other embodiments, one of magnetic features 312 and 314 can represent magnetic materials while the other represents a ferrous material attracted to the corresponding magnetic material. With magnetic features 312 and 314 correctly oriented, upper and lower flexible members 12 can slide along one another until a desired size for strap system 310 is reached. Then, magnetic forces between magnetic features 312 and 314 can hold retain upper and lower flexible members 12 in place relative to one another. In yet another embodiment, magnetic clasp 316 can be included in upper flexible member 12. Magnetic clasp 316 can include a hollow recess, allowing magnetic clasp 316 to slide along upper flexible member 12. Moreover, magnetic clasp 316 can be configured to magnetically attract both magnetic features 312 and magnetic features 314. The use of magnetic clasp 316 can allow both magnetic features 312 and 314 to be ferrous materials. Moreover, clasp 316 can allow for only one instance of magnetic features 314 to be required, as clasp 316 can slide along upper flexible member 12 in order to align with magnetic feature 314.

Figure 32A:
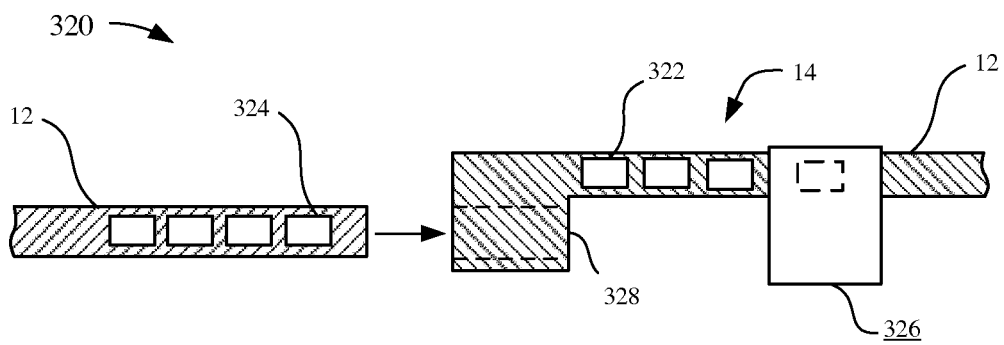
FIG. 32A shows a cross-sectional view of a strap system including a magnetic feature.
Figure 32B:
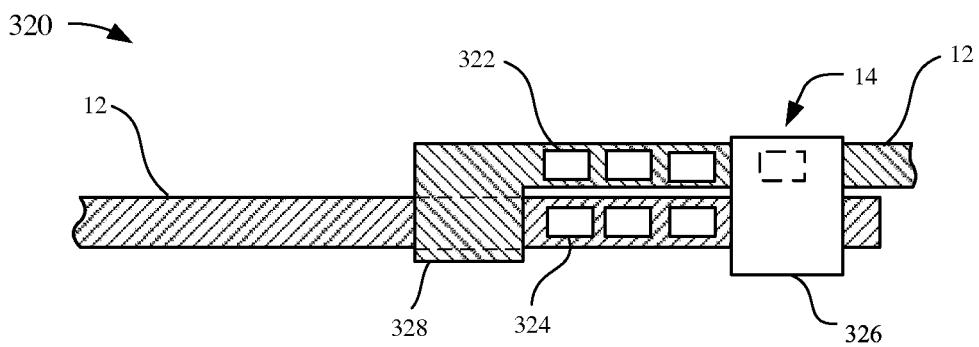
FIG. 32B shows a cross-sectional view of a strap system including a magnetic feature.

FIGS. 32A and 32B show cross-sectional views of strap system 320, in accordance with another embodiment of the disclosure. Strap system 320 can include lower flexible member 12 and upper flexible member 12 or object 16. FIG. 32A shows strap system 320 prior to insertion. One or more magnetic features 324 can be included in lower flexible member 12. Similarly, one or more magnetic features 322 can be included in upper flexible member 12 or object 16. Upper flexible member 12 can include a protruding portion along one end and a hollow recess 328 extending through the protruding portion. FIG. 32B shows strap system 320 in a fastened position. Lower flexible member 12 can be inserted through hollow recess 328 in upper flexible member 12 or object 16. Once inserted, magnetic features 322 can align with magnetic features 324. Furthermore, magnetic features 322 and 324 can be configured to provide an attracting force, allowing lower flexible member 12 to remain in place relative to upper flexible member 12 or object 16. By providing a number of magnetic features 322 and 324, lower flexible member 12 can be fastened in a variety of positions, allowing strap system 320 to accommodate multiple sizes. In some embodiments, clasp 326 can be included in upper flexible member 12 or object 16. Clasp 326 can include recesses for both upper and lower flexible members 12, helping excess length of lower flexible member 12 to remain aligned with upper flexible member 12.

Figure 33:
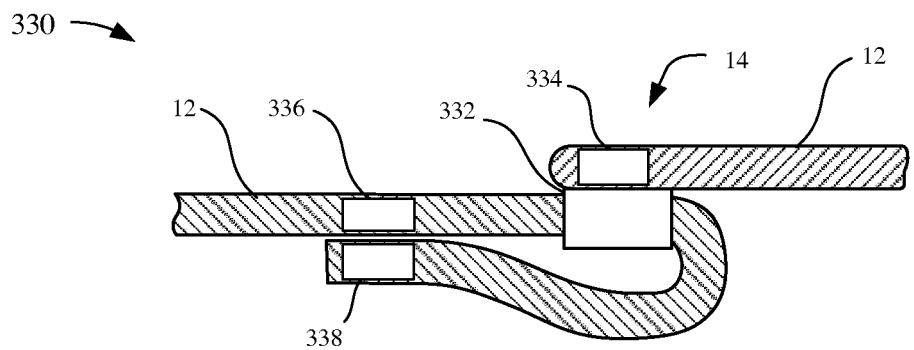
FIG. 33 shows a cross-sectional view of a strap system including a magnetic feature.

FIG. 33 shows a cross-sectional view of strap system 330, demonstrating another embodiment of the disclosure. Strap system 330 can include upper flexible member 12 and lower flexible member 12. Upper flexible member 12 can include one or more attachment elements 334. Lower flexible member 12 can include attachment elements 336 and 338 as well as clasp 332. Attachment means can be provided for attaching clasp 332 to attachment element 334 and attaching attachment element 336 to attachment element 338. In some embodiments, the attachments can be mechanical, using a fastener, clasp, snap, clamp, buckle, or the like. In other embodiments, attachment features 334, 336, and 338 as well as clasp 332 can be formed from magnetic materials and oriented to provide attractive forces between attachment system 14 and clasp 332 as well as between attachment elements 336 and 338. In some embodiments, multiple attachment elements 336 can be provided and the size of strap system 330 can be adjusted by coupling attachment element 338 to different instances of attachment element 336.

Figure 34A:
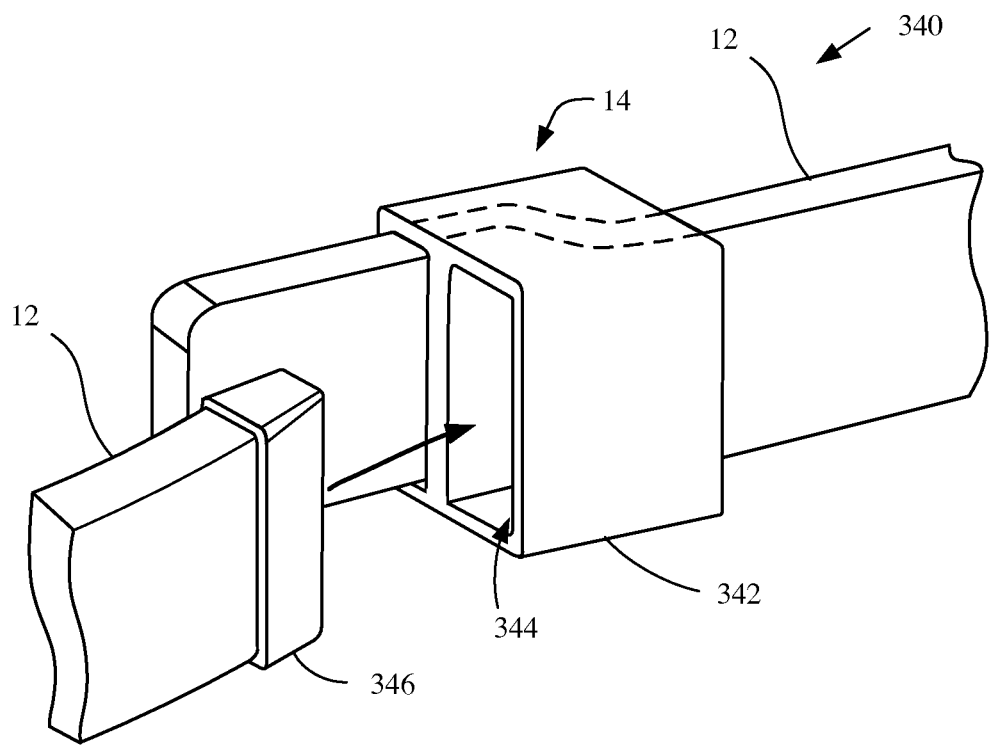
FIG. 34A shows a perspective view of a strap system including a clasp and magnetic features.
Figure 34B:
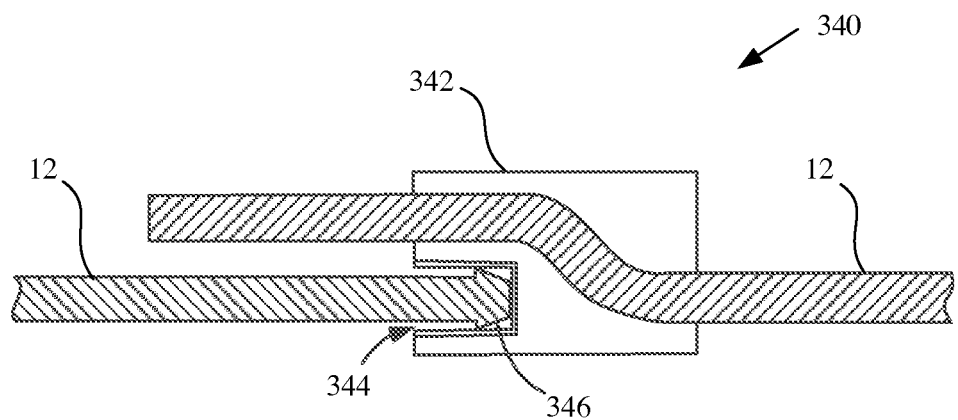
FIG. 34B shows a cross-sectional view of a strap system including a clasp and magnetic features.

FIGS. 34A and 34B illustrate isometric and cross-sectional views of strap system 340 according to an embodiment of the disclosure. As illustrated, flexible members 12, which may be similar to any flexible members described above, can both be threaded and/or engaged with clasp member 342. For example, the clasp member 342 can include a first recess 344 configured to receive and engage a free end 346 of one of flexible members 12. Furthermore, the clasp member 342 can include a second recess or slot configured to receive and engage a free end or portion of the other flexible member 12. The free end 346 can include a cap or a magnetic portion configured to magnetically couple with the recess 344 or material forming the clasp member 342. The recess 931 can mechanically restrict movement of the flexible members 12 through the serpentine shape illustrated, and/or may further include clasping mechanisms such as magnets, ferromagnetic material, and/or other features. A size of strap system 340 can be set and adjusted by controlling the travel of flexible member 12 through the serpentine recess.

Figure 35A:
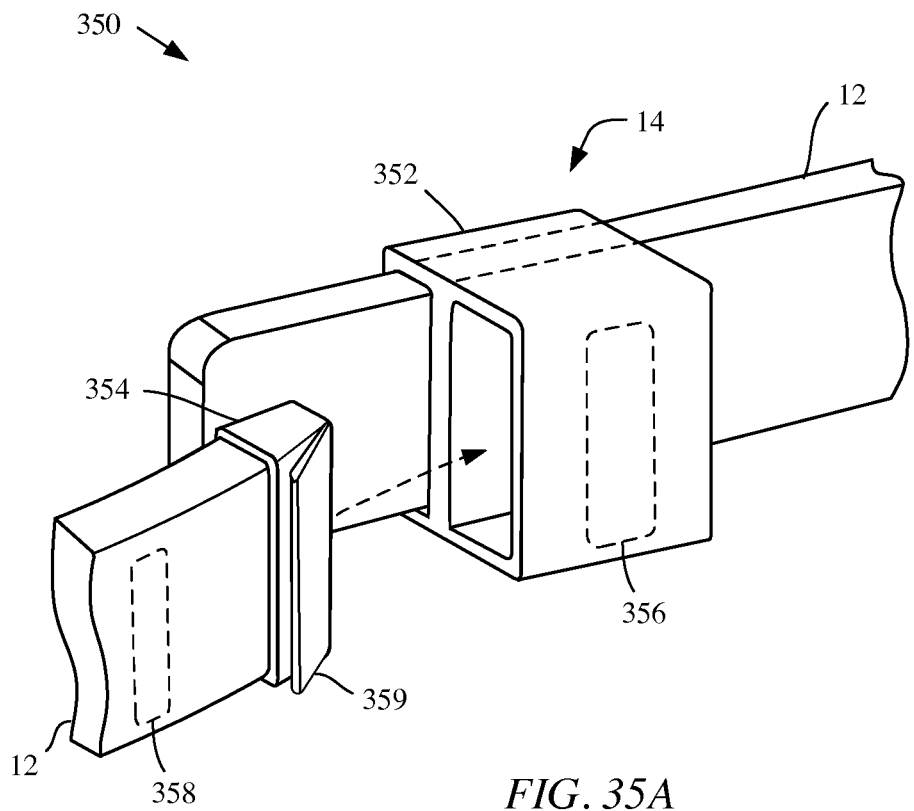
FIG. 35A shows a perspective view of a strap system including a clasp and magnetic features prior to insertion.
Figure 35B:
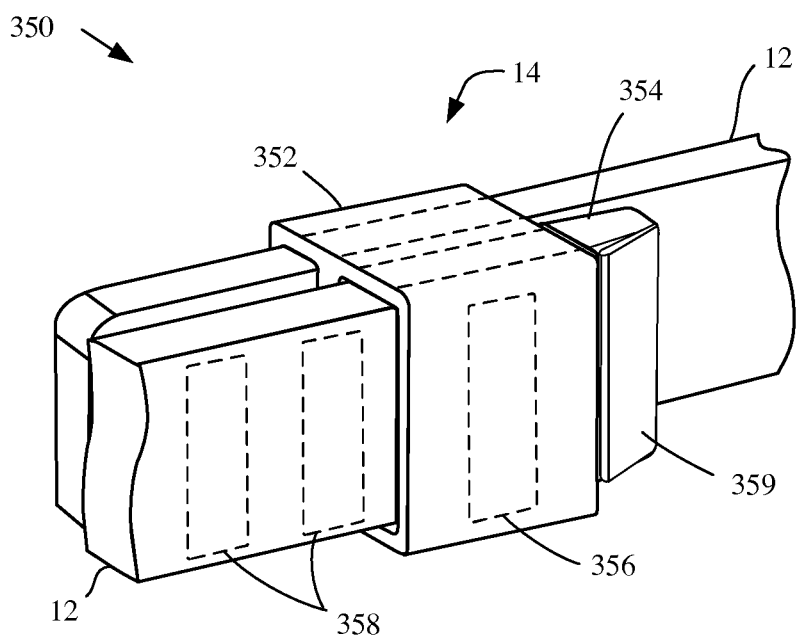
FIG. 35B shows a perspective view of a strap system including a clasp and magnetic features after insertion.

FIGS. 35A and 35B show strap system 350, according to another embodiment of the disclosure. Similar to strap system 340, flexible members 12 can be threaded through openings in clasp member 352. Free end 354 of one of flexible member 12 can include a cap configured to mechanically couple with clasp member 352. In one embodiment, free end 354 can include flap 359 configured to retain flexible member 12 once inserted through clasp member 352. A spring or other means of providing a restoring force can be included in free end 354, allowing flap 359 to rotate downwards as free end 354 is inserted through the recess in clasp member 352. Once, free end 354 is fully inserted, the restoring force can cause flap 359 to swing outwards, preventing free end 354 from traveling back through clasp member 352. Free end 354 can be released from clasp member 352 by pressuring downwards on flap 359. In some embodiments, magnetic features can be included in strap system 350 as well. Magnetic feature 356 can be included in clasp member 352 and one or more magnetic features 358 can be included in flexible member 12. The addition of magnetic features 356 and 358 can allow strap system 350 to be tightened without relying on flap 359 to prevent relative motion between flexible members 12.

Figure 36:
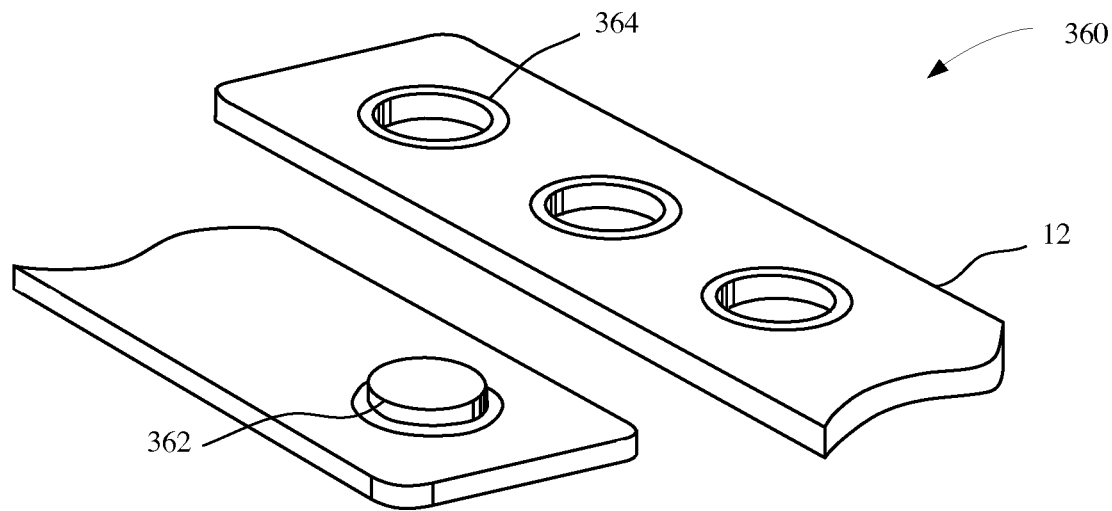
FIG. 36 shows a perspective view of a strap system having a protruding member and plurality of apertures.
Figure 37:
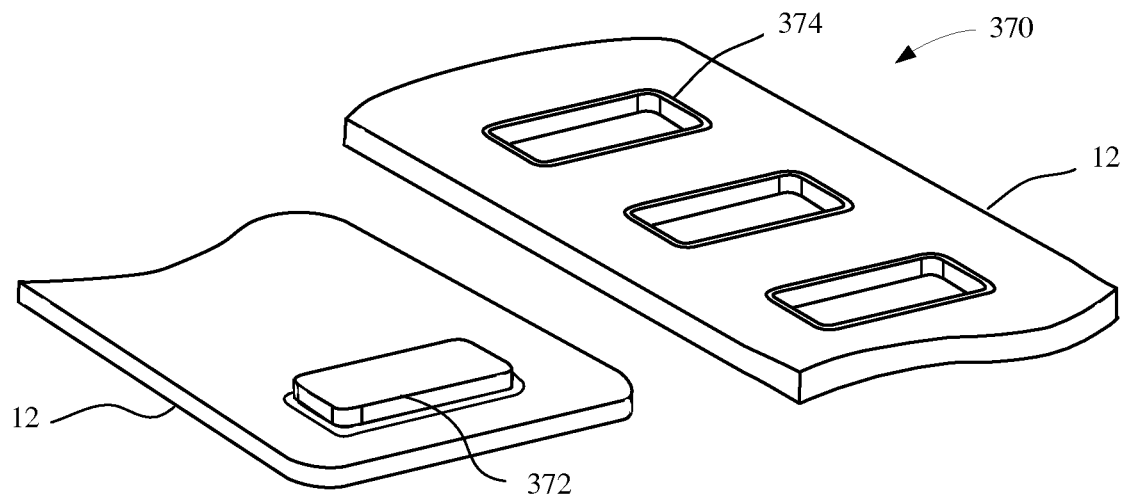
FIG. 37 shows a perspective view of a strap system having a protruding member and plurality of apertures.

FIG. 36 show strap system 360 according to another embodiment of the disclosure. Strap system 370 can include a first end and a second end of flexible member 12. In some embodiments, either the first end or the second end of flexible member 12 can be replaced with a portion of object 16. The first end of flexible member 12 can include protruding member 362. FIG. 36 shows protruding member 362 formed in a cylindrical shape. However, protruding member 362 can have any technically feasible shape. For example, FIG. 37 shows protruding member 372 in a rounded rectangular shape. In this way, member 372 does not allow rotation and thus provides a simple version of a preferred orientation or configuration. Any other arrangement is simply rejected in that member 372 would not "fit". The second end of flexible member 12 can included one or more apertures having a shape configured to accept protruding member 372. By adjusting the aperture 374 in which protruding member 372 is inserted, the size of strap system 370 can be adjusted. Protruding member 372 can be retained in aperture 374 using a variety of methods. In one embodiment, an exterior surface of protruding member 362,372 can mechanically engage with an interior surface of aperture 364, 374 using a snap, clasp, detent, or other means of mechanically forming a connection. In another embodiment, magnetic features can be placed within protruding member 362, 372 and around aperture 364, 374. The magnetic features can include magnets or ferrous materials and can be oriented to attract one another when protruding member 372 is inserted in aperture 364, 374.

Figure 38A:
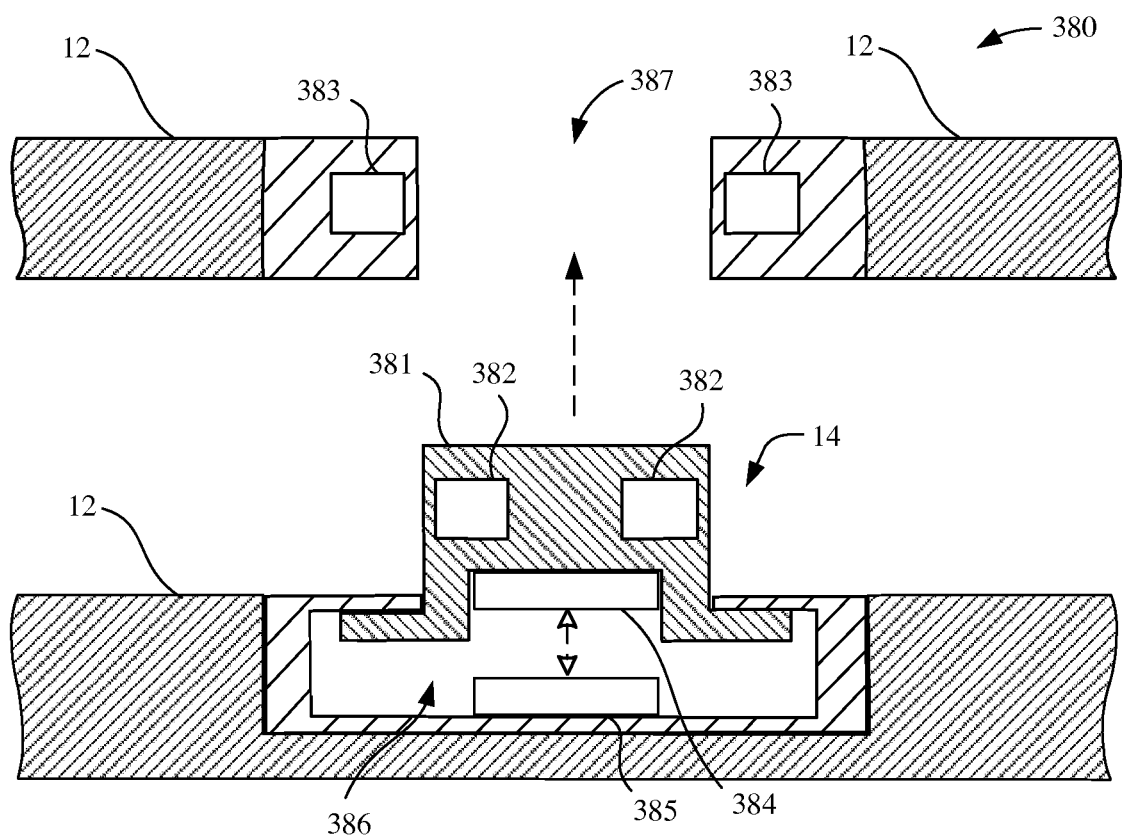
FIG. 38A shows a perspective view of a strap system in an unfastened state.
Figure 38B:
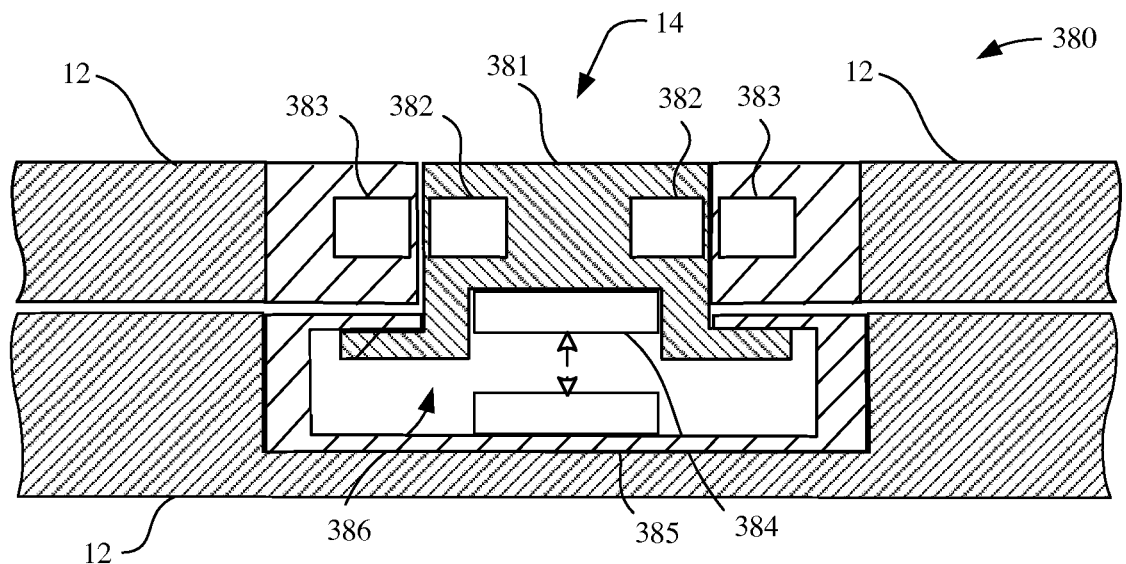
FIG. 38B shows a perspective view of a strap system in a fastened state.

FIGS. 38A and 38B show cross-sectional views of strap system 380 according to another embodiment of the disclosure. In some embodiments, strap system 380 can represent a more detailed view of strap system 370 shown in FIG. 37A. Strap system 380 can include an upper flexible member 12 and a lower flexible member 12. In some embodiments, either of upper flexible member 12 or lower flexible member 12 can be replaced by object 16. FIG. 38A shows strap system 380 in an unfastened position. Upper flexible member 12 can include aperture 387 and lower flexible member 12 can include protruding member 381 configured to fit within aperture 387. Protruding member 381 can also include one or more flanges along a lower edge and extending within cavity 386. The flanges and cavity 386 can cooperate to allow protruding member 381 to move vertically without leaving cavity 386. Magnetic features 382 can be provided along an exterior surface of protruding member 381 and magnetic features 383 can be provided along an interior surface of aperture 387. FIG. 38B shows strap system 380 in a fastened position. When protruding member 381 is inserted into aperture 387, magnetic features 382 can be aligned with magnetic features 383. Magnetic features 382 and 383 can represent magnets or ferrous materials configured to attract one another when aligned. The resulting magnetic attraction can retain protruding member 381 within aperture 387, causing strap system 380 to fasten. In some embodiments, strap system 380 can also include magnetic features 384 and 385. Magnetic feature 384 can be coupled to a lower surface of protruding member 381 and magnetic feature 385 can be coupled to a lower surface of cavity 386. Furthermore, magnetic features 384 and 385 can be oriented to repel one another. This can allow protruding member 381 to descend into lower flexible member 12 when a downward force is applied on protruding member 381 by a user or upper flexible member 12.

Figure 39A:
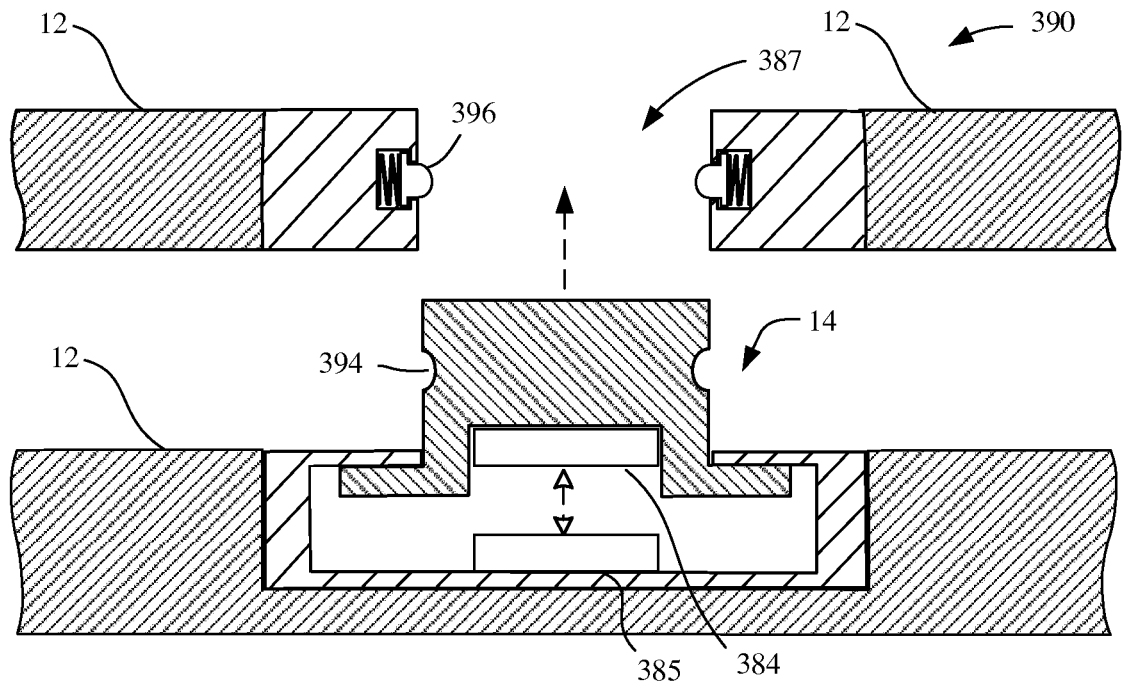
FIG. 39A shows a perspective view of a strap system in an unfastened state.
Figure 39B:
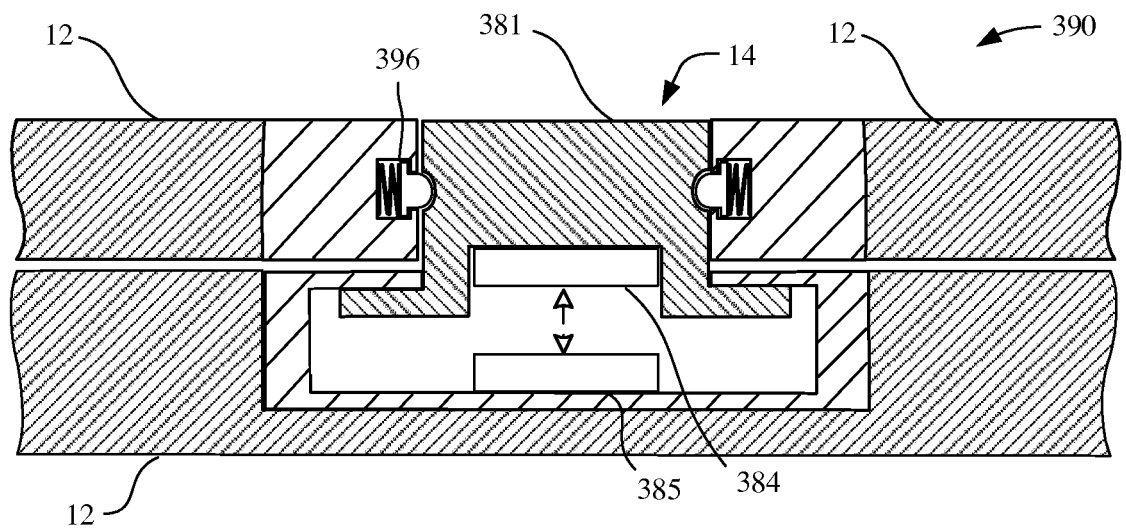
FIG. 39B shows a perspective view of a strap system in a fastened state.

FIGS. 39A and 39B show strap system 390 demonstrating a variation on strap system 380 using mechanical retention means instead of magnetic retention means. FIG. 39A shows strap system 390 in an unfastened state and FIG. 39B shows strap system 390 in a fastened state. Protruding member 381 can be included in lower flexible member 12 and aperture 387 can be included in upper flexible member 12 similar to strap system 380. However, instead of magnetic features for retaining protruding member 381, mechanical features can be provided. Pins 396 can be provided along an inner surface of aperture 387. Two pins 396 are depicted, but it should be noted that any number of pins can be used. Pins 396 can be coupled to upper flexible member 12 using a spring or any other technically feasible means of providing a restoring force. In addition, end points of pins 396 can be rounded or angled to allow protruding member 381 to push pins 396 into openings within the inner surface of cavity 387 while compressing the springs. Keyholes 394 can be included in an outer surface of protruding member 381 and can have a shape configured to mate with pins 396. When protruding member 381 is inserted into aperture 387, pins 396 can engage with keyholes 394, fastening upper flexible member 12 to lower flexible member 12. Similar to strap system 380, magnetic features 384 and 385 can be provided in some embodiments to allow protruding member 381 to descend into lower flexible member 12 when a downward force is applied on protruding member 381.

FIGS. 40A-40E show strap system 400, according to another embodiment of the disclosure. In FIG. 40A, a first end of flexible member 12 is shown. Flexible member 12 can include one or more attachment features 406 embedded in or coupled to flexible member 12. In addition, clasp 402 is shown. Clasp 402 can include a hollow recess configured to accept flexible member 12 and protruding member 404. Protruding member 404 is shown in a rounded rectangular shape. However, it should be noted that any conceivable shape for protruding member 404 can be used. FIG. 40B shows flexible member 12 inserted into clasp 402. In some embodiments, clasp 402 can be coupled to attachment feature 406 by mechanical means. In other embodiments, attachment feature 406 can include a magnetic material and can attract a corresponding magnet included in an interior portion of clasp 402. In FIG. 40C, a second end of flexible member 12 or object 16 is introduced including aperture 408. Aperture 408 can be configured to mate with protruding member 404. FIG. 40D shows the second end of flexible member 12 fastening to the first end of flexible member 12 by inserting protruding member 404 into aperture 408. FIG. 40E shows a cross-sectional view of protruding member 404 extending through aperture 408. In some embodiments, protruding member 404 can be coupled to aperture 408 using mechanical means such as those described in strap system 390 shown in FIGS. 39A-39B. In other embodiments, protruding member 404 can be magnetically coupled to aperture 408 similar to methods described in strap system 380 shown in FIGS. 38A-38B.

FIGS. 41A-41E show strap system 410 in accordance with another embodiment of the disclosure. In FIG. 41A, a first end of flexible member 12 is shown with a number of openings 414 spaced along a length of flexible member 12. In addition, plug 412 is shown. Plug 412 can have a cylindrical shape with a relatively wide disk at an upper end and a relatively small disk positioned at a lower end. The small disk can be rounded on a bottom surface and can be configured to fit through one of openings 414 when a pre-defined force is applied to plug 412. FIG. 41*b* shows plug 412 inserted into one of openings 414 in flexible member 12. Flexible member 12 can be formed from a material that allows openings 414 to deform sufficiently to allow the lower disk of plug 412 to pass through openings 414 without causing damage to flexible member 12. In FIG. 41C, the second end of flexible member 12 is introduced. The second end of flexible member 12 can have attachment feature 416 coupled to a surface facing the first end of flexible member 12. In. FIG. 41D, the first and second ends of flexible member 12 are coupled by combining attachment feature 416 with a corresponding attachment feature on an upper surface of plug 412. In some embodiments, attachment feature 416 and plug 412 can be coupled using mechanical means. In other embodiments, attachment feature 416 and plug 412 can include magnetic features such as magnets and ferrous materials configured to attract one another. FIG. 41E shows cross-sectional view L-L, showing attachment feature 416 in contact with plug 412. The size of strap system 410 can be adjusted by moving 412 into different instances of openings 414 and reengaging attachment feature 416.

Figure 42A:
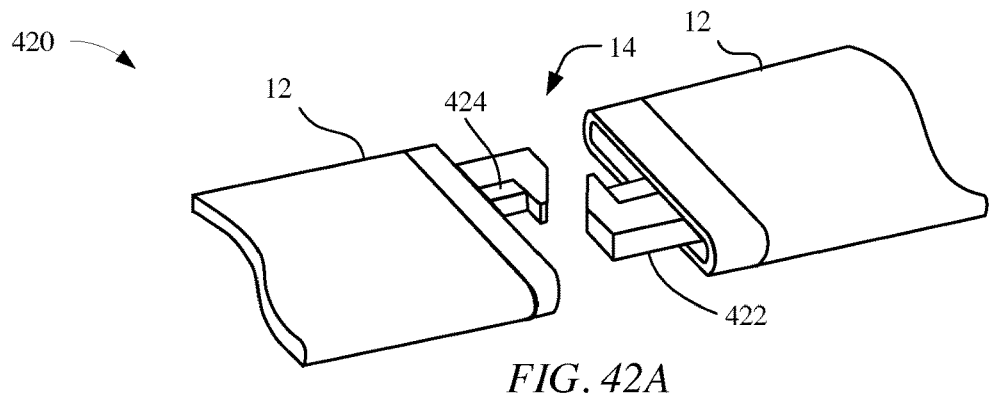
FIG. 42A shows a perspective view of a strap system utilizing a hook clamp.
Figure 42B:
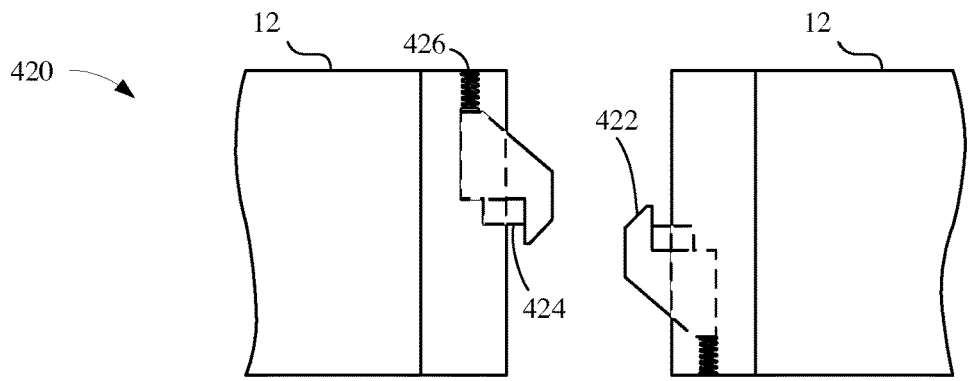
FIG. 42B shows a plan view of a strap system utilizing a hook clamp.
Figure 42C:
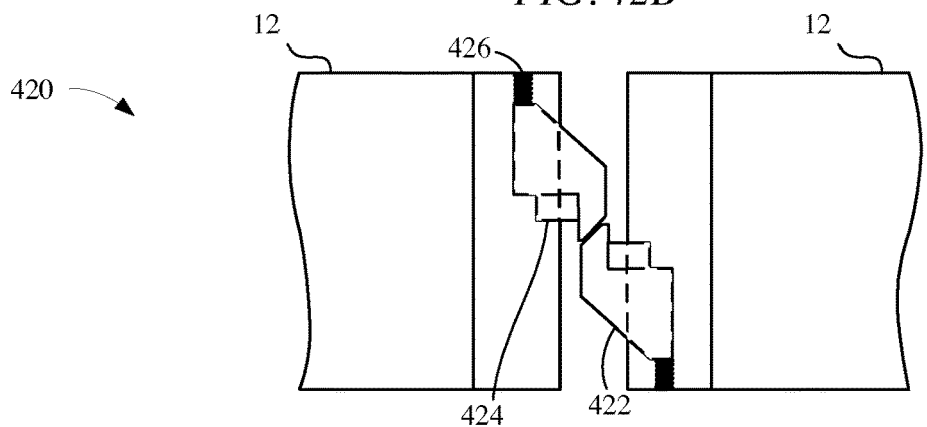
FIG. 42C shows a plan view of a strap system utilizing a hook clamp.
Figure 42D:
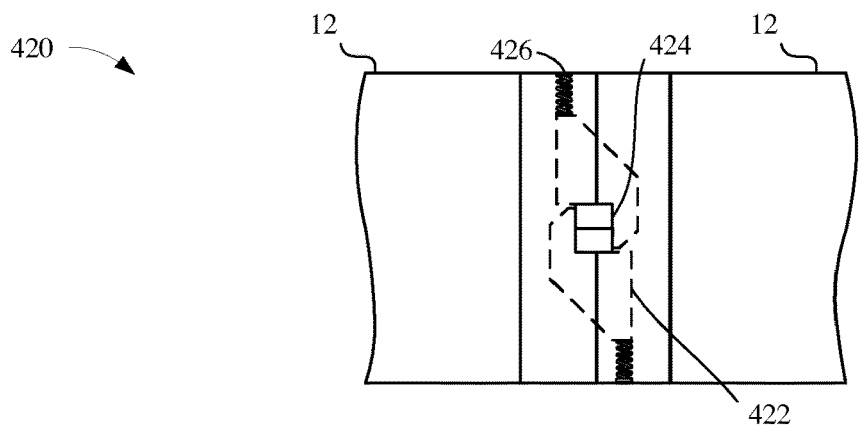
FIG. 42D shows a plan view of a strap system utilizing a hook clamp.

FIGS. 42A-42D show strap system 420 in accordance with another embodiment of the disclosure. In FIG. 42A, a perspective view of strap system 420 is shown. Corresponding hook clasps 422 are provided on both a first and second end of flexible member 12. Hook clasps 422 can also include magnetic features 424 along an interior surface as shown. FIG. 42B shows a plan view of strap system 420. Internal to the end portions of flexible member 12, springs 426 can be included to provide a restoring force to hook clasps 422. FIG. 42C shows strap system 420 as hook clasps 422 come into contact with one another. The surfaces of hook clasps 422 that first come into contact can be angled as shown to provide a lateral force capable of compressing springs 426. Finally, FIG. 42D shows strap system 420 in a latched position. Once the hook portions of hook clasps 422 clear one another, force built up by compressing springs 426 can be released, bringing magnetic features 424 into contact with one another. The combination of spring force and magnetic force can keep strap system 420 securely clasped. Disengagement or unlocking can be facilitated through of twist of each end of flexible member 12 combined with lateral movement of one end relative to another.

In some embodiments, a magnetic attachment system can take the form of a magnetic material having properties that permit the magnetic material to take on an interleaved or woven pattern. The magnetic material can, for example, take the form of strands of magnetic material or material capable of having a magnetic field induced. The strands can be fitted together in a mesh or woven pattern forming in the process a weave, or mesh, not unlike a fabric, the strands being analogous to yarn or thread. It should be noted that the strands can be ferromagnetic in nature in which certain materials, such as iron, that are attracted to magnetic fields generated by, for example, a magnet. Ferromagnetic materials can also have a magnetic field induced therein using an external magnetic field to create and align magnetic domains within the ferromagnetic material. In this way, a woven substrate formed of ferromagnetic strands can exhibit a small or no intrinsic magnetic field but selected portions can be magnetized by a focused magnetic field having the effect of magnetizing selected strands or groups of stands of woven material. Likewise, magnetic properties of selected strands or groups of strands can be altered by the application of an external magnetic field. For example, the magnetic field strength of a strand or group of strands can be altered (increased or decreased) by the application of an appropriately configured external magnetic field. Moreover, an external energy source (such as a laser) can demagnetize selected strands or groups of strands by heating which can randomize the orientation of magnetic domains within a strand or group of strands. It should also be noted that some strands may exhibit diamagnetic behavior that causes the strand to repel an external magnetic field. In this way, a woven substrate can include strands some of which are ferromagnetic, some of which are diamagnetic and others of which exhibit no magnetic properties or ability to become magnetized.

The strands can possess an intrinsic magnetism or a magnetic field can be induced in a selected strand or strands. The resulting magnetic field can take many forms capable of providing a number of useful services. For example, the strands can be arranged in a linear pattern. In one embodiment, selected ones of the strands can possess an intrinsic polarity in which case, magnetic regions can be interleaved with non-magnetic regions. In some cases, selected strands can have their magnetic fields dampened using, for example, a laser that reduces or eliminates the alignment of magnetic domains within the strands. In this way, selected portions (or even individual strands) can be de-magnetized to form a distribution of magnetic regions and non-magnetic regions.

Figure 43:
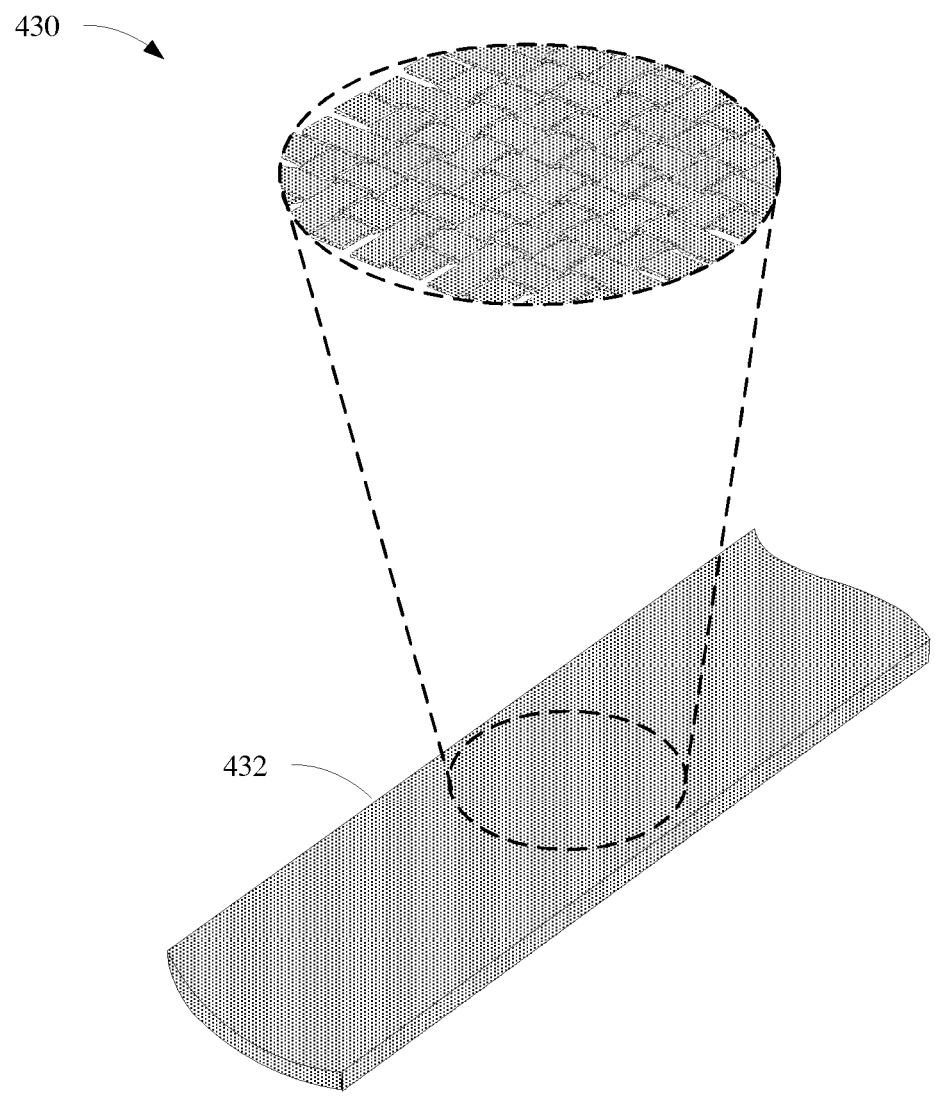
FIGS. 43-51 shows a perspective view of a woven magnetic strap in accordance with various embodiments.

Accordingly, FIGS. 43-51 illustrate various embodiments of a substrate formed of a plurality of strands of various forms some of which can exhibit ferromagnetic properties, some of which can exhibit diamagnetic properties, some of which can be non-magnetic and some of which can be induced to become magnetic (or become non-magnetic) using an external agent. FIG. 43 shows magnetic strap 430 formed of woven magnetic material. The magnetic material can take many forms that includes ferrous metal such as iron. In addition, the magnetic material can include a magnetic substrate populated by magnetic particles, or a plurality of magnetic elements which taken together form a substantially continuous magnetic substrate formed of discrete magnetic components. The magnetic components can include strands interleaved or woven into a fabric like structure that is flexible, strong, and provides a magnetic medium for magnetic attachment for a device.

Figure 44:
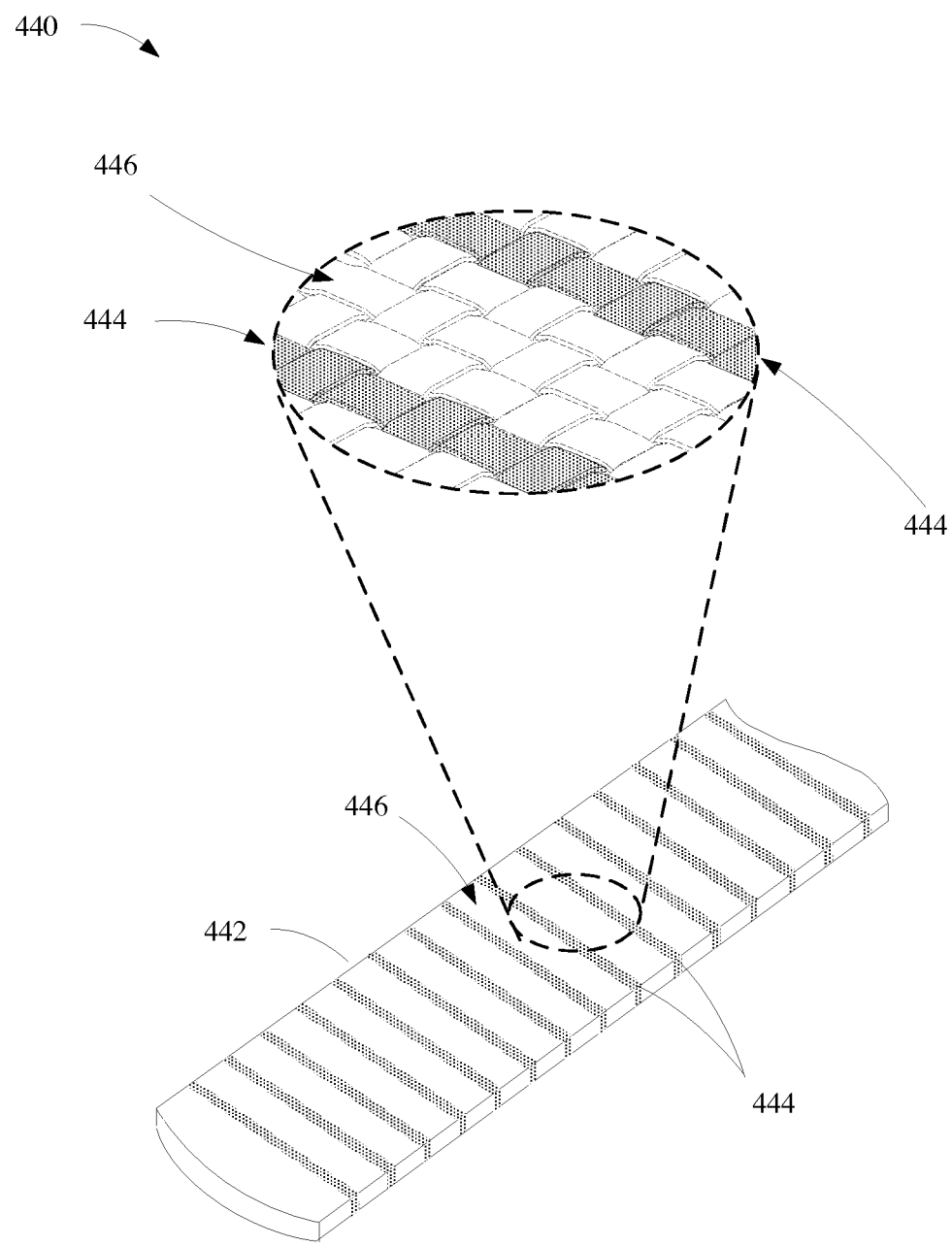

FIG. 44 shows magnetic attachment system 440 in the form of magnetic strap 442 in accordance with the described embodiments. Magnetic strap 442 can include a plurality of strands 444 some of which can exhibit magnetic behavior. For example, strands 444 can be magnetic and exhibit a magnetic field whereas adjacent strand 446 can exhibit no or only a negligible magnetic field. In this way, magnetic strap 442 can exhibit a magnetic pattern that takes the form of a number of parallel magnetic regions 446 separated from each other by non-magnetic regions 448. In this way, magnetic strap 442 can form an attachment with itself or another magnetically active strap or object. In some cases, an interaction with the linear magnetic pattern can be used for preferential attachment. Accordingly, by judiciously arranging magnetically active strands and non-magnetically active strands, magnetic strap 442 can be used to repeatedly attach in a preferred configuration. For example, magnetic strap 442 can be used as a armband than can be magnetically fixed in such a way that magnetic strap 442 will always form the armband having a specific size.

Figure 45:
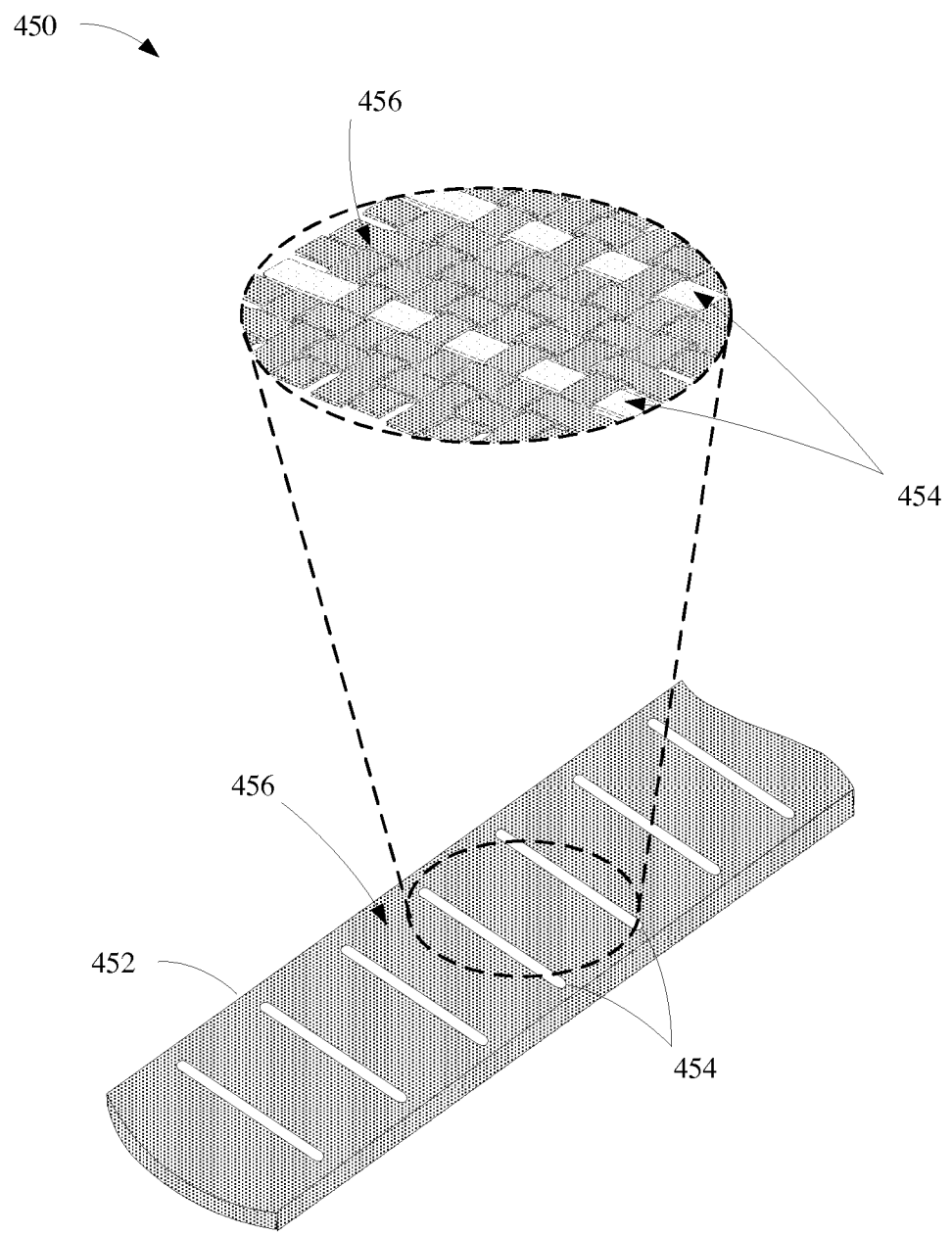
Figure 46:
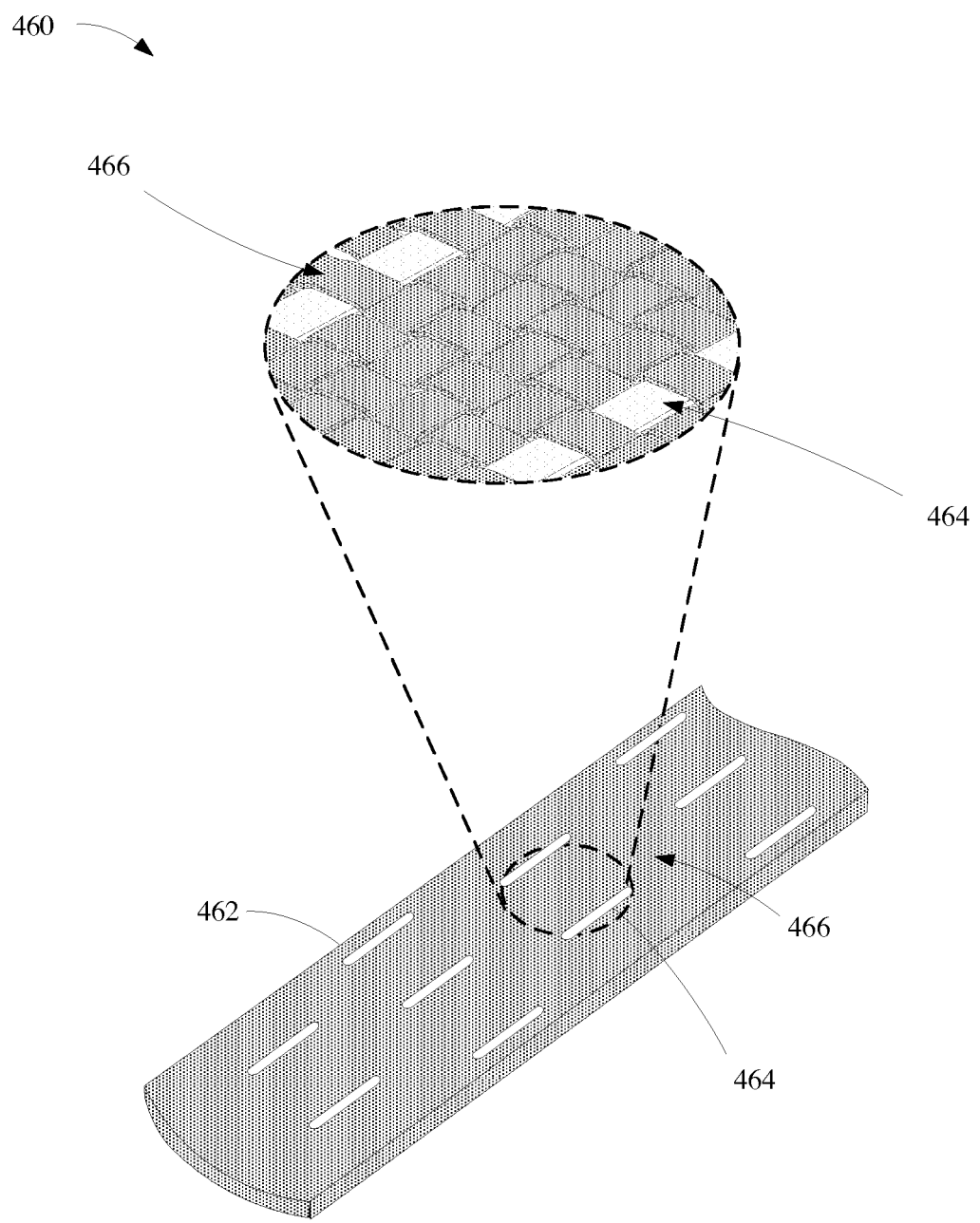

FIG. 45 shows another embodiment of magnetic strap in the form of magnetic strap 450. Magnetic strap 450 can include substrate 452. Substrate 452 can be magnetic or non-magnetic. In the embodiment shown, however, substrate 452 is non-magnetic in nature and is formed of a number of interwoven (or interleaved) strands of non-magnetic material. Magnetic material in the form of magnetic bands 454 can be secured to selected ones of substrate 452. Magnetic bands 454 can be secured to selected ones of the strands that form substrate 452. In this way, a magnetic pattern can be formed in substrate 452. In this example, the magnetic pattern can be linear in nature. In this case, the magnetic pattern can include magnetic bands 454 separated by non-magnetic regions 456. However, it should be noted that this example is but one of many. In some cases, substrate 452 can be magnetic and bands 454 can be non-magnetic in which case an inverse magnetic pattern can be formed. For example, FIG. 46 shows magnetic pattern 460 in which substrate 462 is formed of a number of bands 464 interleaved with selected strands 466. In this way, a magnetic pattern that is orthogonal to the magnetic pattern shown in FIG. 45 can be formed. It should be noted that magnetic patterns can be combined. For example, the magnetic pattern shown in FIG. 45 can be combined with that shown in FIG. 46 to form a two dimensional rectangular pattern of magnetic elements. It should also be noted that any magnetic pattern can be altered. For example, an external energy source can be used to de-magnetize selected magnetic elements. In this way, the magnetic pattern can be altered in a manner that can be used to customize an application for which magnetic strap is used.

Figure 47:
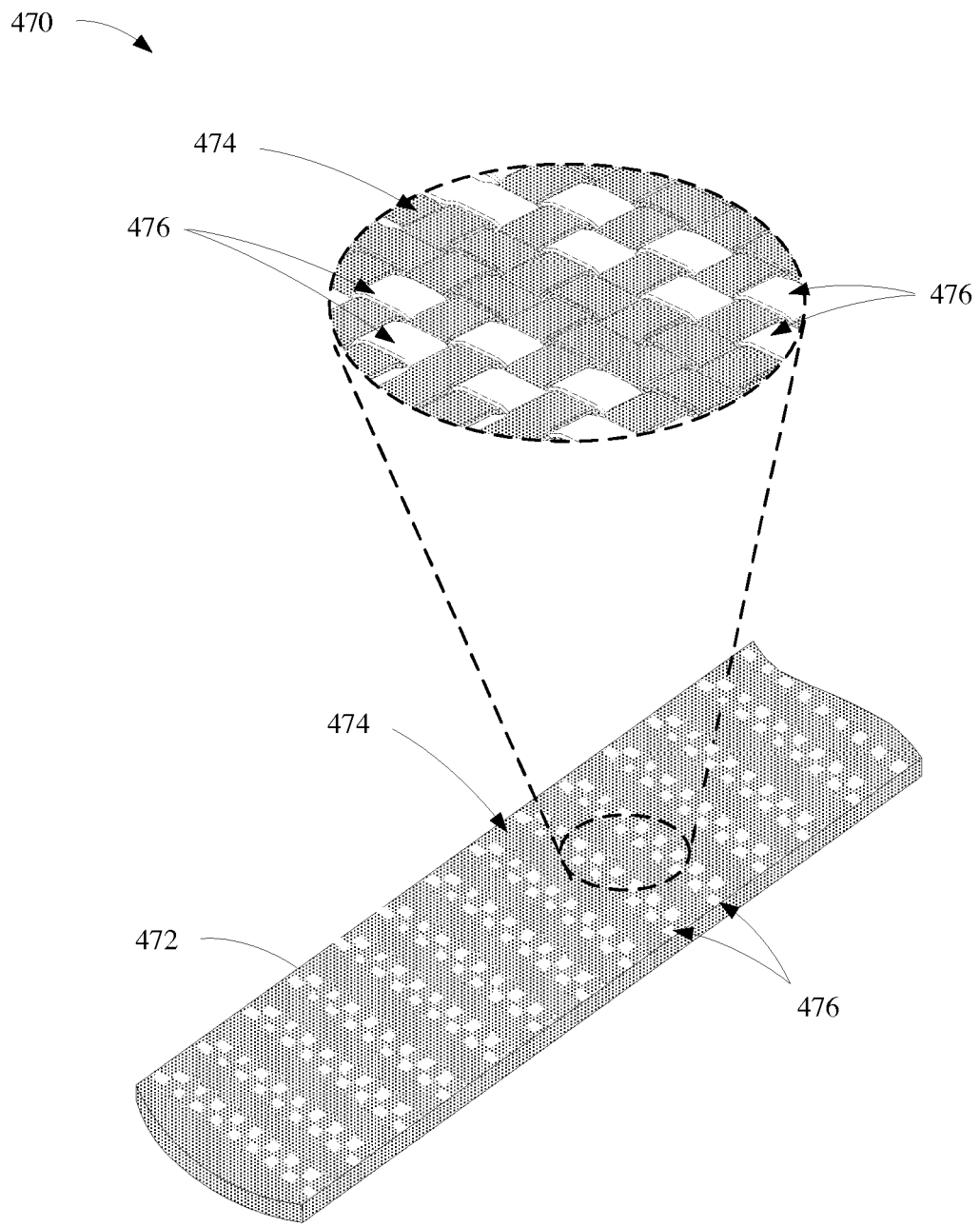

FIG. 47 shows yet magnetic strap 470 in accordance with the described embodiments. Magnetic strap 470 can include substrate 472 and (non-magnetic) strands 474 interleaved with (magnetic strands) 476 forming a pattern of doubled magnetic bands. Again it should be noted that the various magnetic patterns can be widely varied. For example, the magnetic patterns can be combined to form linear patterns, two dimensional patterns and in some cases three dimensional patterns. For example, a three dimensional pattern can be formed by incorporating magnetic elements within substrate 472 or on a bottom surface of substrate 472. In some cases, substrate 472 can be formed of a number of layers of strands in which some of the layers can be associated with magnetic elements to form the three dimensional magnetic pattern.

Figure 48:
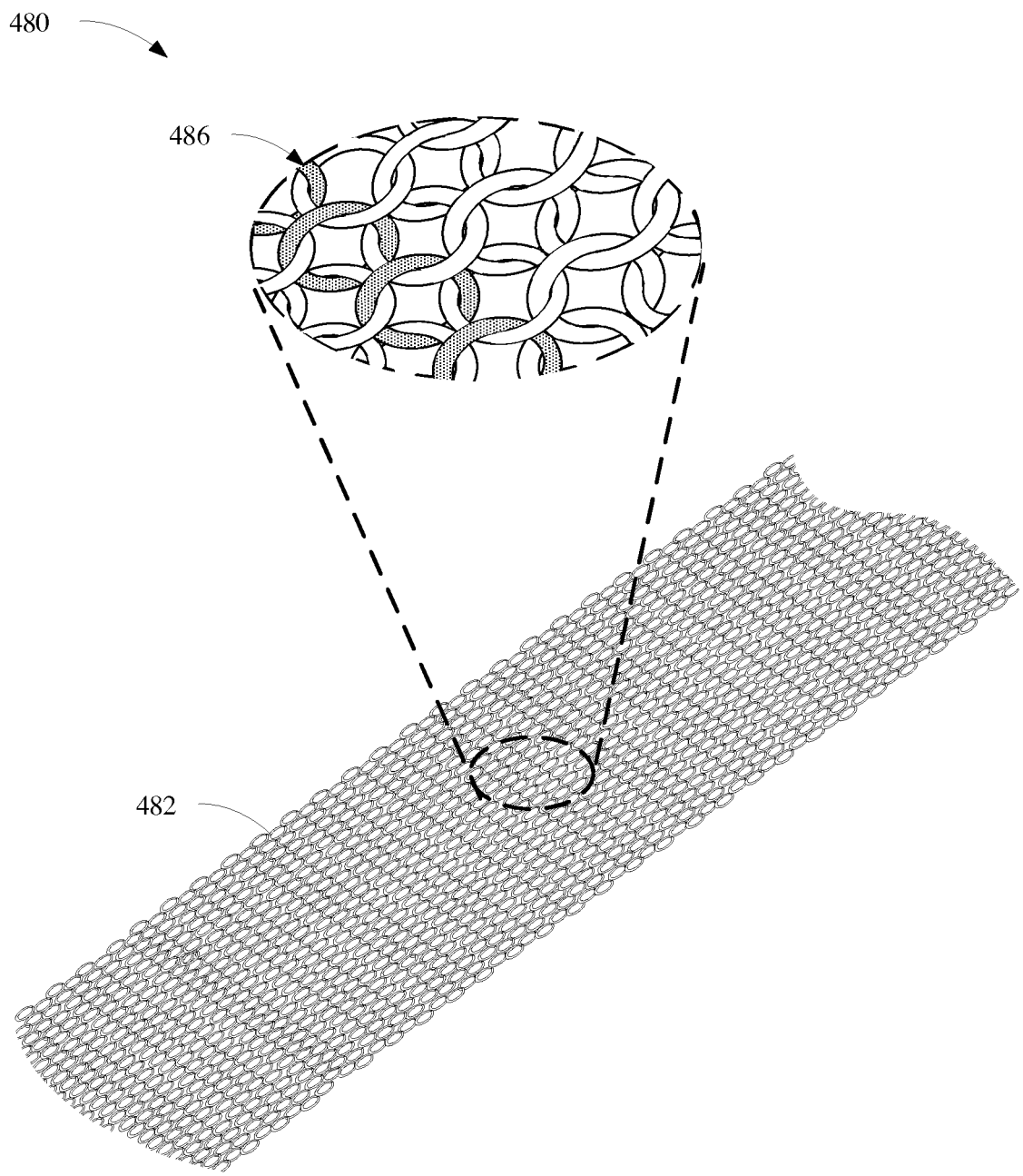
Figure 49:
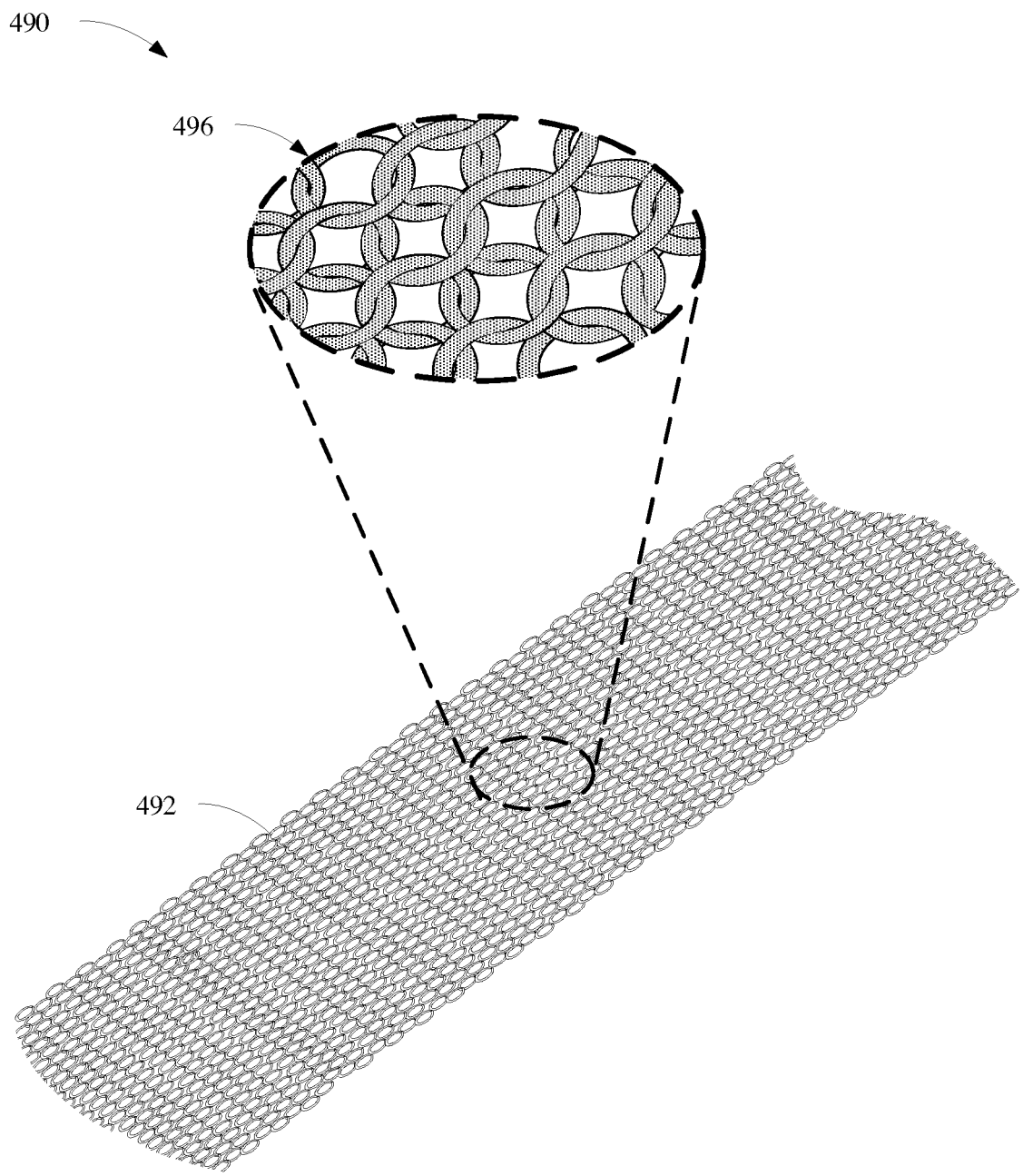
Figure 50:
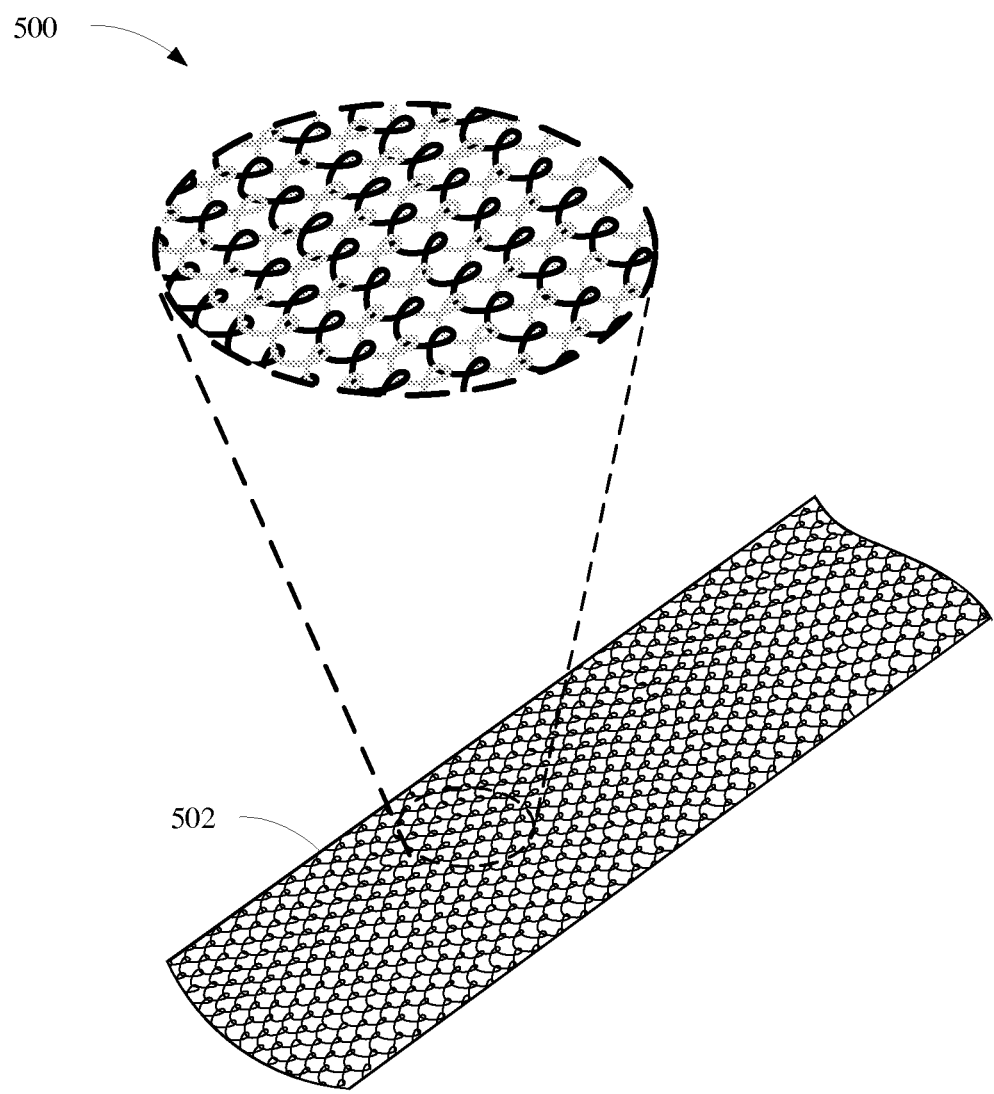
Figure 51:
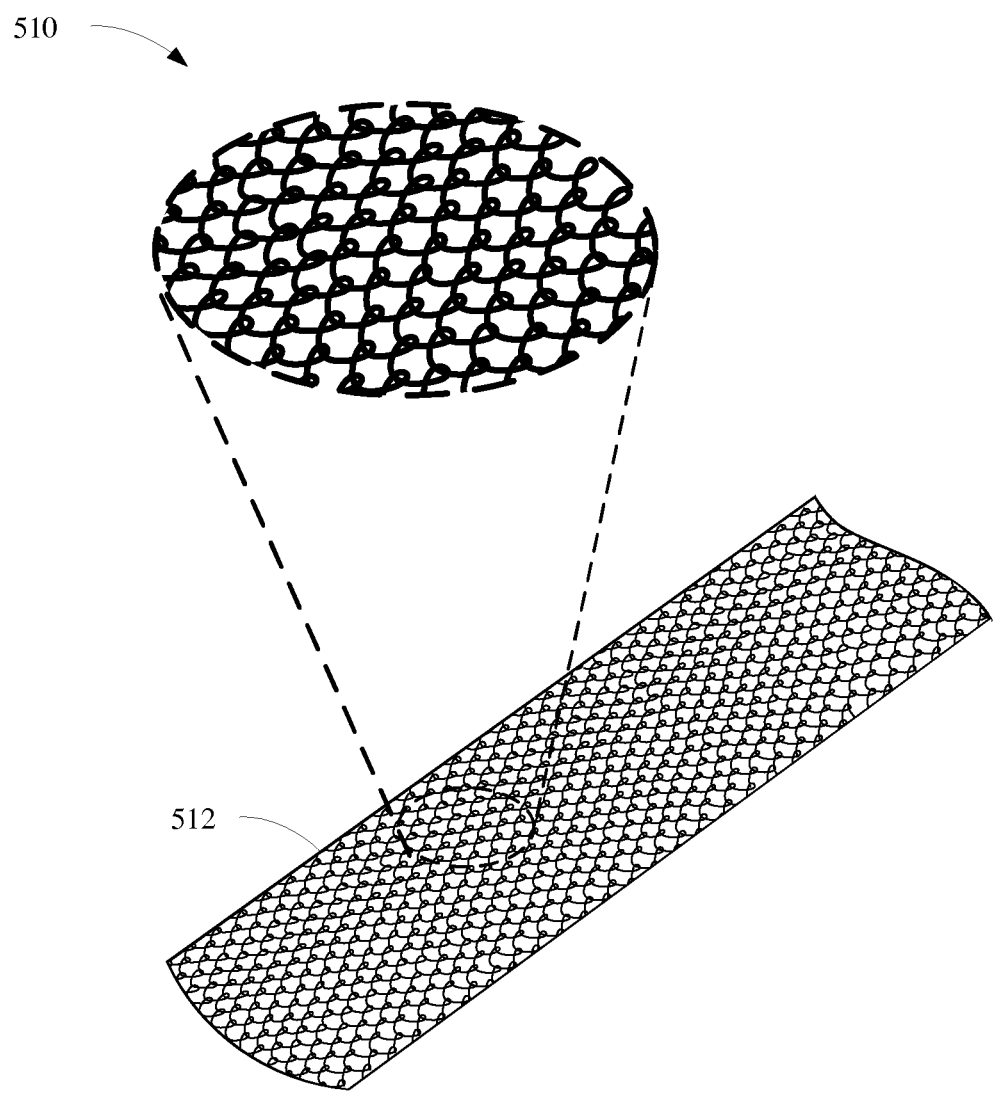

FIGS. 48 thru 51 show other examples of magnetic straps. For example, FIG. 48 shows magnetic strap 480 includes substrate 482 formed of a number of interlinking circular elements 484 some of which are magnetic (and some of which can be induced to be magnetic). FIG. 49 shows strap 490 where substantially all the interlinking circular elements are magnetic. FIG. 49 shows magnetic strap 490 includes substrate 492 of interlinked loops 494 of material (similar to a chain link fence) and FIG. 50 shows an embodiment where substantially all of the interlinked loops are magnetic.

It should be noted that magnetic patterns can be used to control the strength and/or direction of the magnetic fields thereby providing the desired attraction and break forces. In fact, it may be that the straps are designed to have different magnetic strengths depending upon the user or the environment. For the active environment then the force can be higher while in a non-active environment, the force can be lower.

A modular strap family includes one or more base units and one or more strap sets. It should be appreciated however that any number of base units and straps sets may be provided (n+1). Each of base units may be configured differently. For example, although they all include functional elements, the function elements may be configured differently. For example base unit may have functional unit. Functional units may for example include one or more functional elements such as displays, buttons, controllers, and the like. Furthermore, each of the base units may have a different enclosure. By different enclosure, it may be a different color, different material, different shape, different accoutrements, different patterns, etc. Essentially the enclosures are configured to provide a different aesthetic or different look and feel than the other enclosures in the family. As such, the purchaser or user can select the base unit with the desired look and feel and the desired functionality. This may be at the time of purchase thus allowing differentiation from other purchasers or it may be that all or some portion of the base units come in a set such that the user can select the right base unit for the right moment. In one example, one base unit may be configured for exercise while another may be configured for a business setting. Any combination of enclosure and functional features may be provided to create a different base unit (N+1).

Referring to the strap sets, like the base units, each of the straps may be configured differently. For example, the functional aspects and the aesthetic aspects may be configured differently. The first strap may have a first characteristic, the second strap may have a second characteristic, the third strap may have a third characteristic, the fourth strap may have a fourth characteristic with each characteristic being different, the characteristic may be in mechanical configuration such as material properties, structural features each of which can help define flexibility or rigidity, tactile feel, and the like or aesthetic properties such as color, patterns, materials, etc. each of which can provide a different look and feel. Furthermore, each of the strap sets may have a different attachment mechanism, one for each strap in the set. The attachment mechanisms can be widely varied and generally selected from any of these mentioned previously in FIGS. 1-49. Generally, they are configured to engage one another such that they are locked into place relative to one another thereby securing each of the straps in the strap set to one another, making them a single cooperating system. For example, they may be attached into a loop. The attachment mechanisms can include multiple locking nodes in order to change the size of the loop, i.e., adjustable. Of course, the attachment mechanisms may also be configured to disengage from one another such that they are released relative to one another thereby un-securing each of the straps from one another. In one embodiment, the attachment mechanisms include a magnetic feature such that they snap and hold into place with magnetic force and release when a force is applied greater than the magnetic force (breaking force).

Like the base units, the straps are configured to provide a different function and/or aesthetic or different look and feel than the other straps in the family. As such, the purchaser or user can select the strap set with the desired look and feel and the desired functionality. This may be at the time of purchase thus allowing differentiation from other purchasers or it may be that all or some portion of the straps come in a set such that the user can select the right base unit for the right moment. In one example, one strap may be configured for exercise while another may be configured for a business setting. Any combination of aesthetic and functional features may be provided to create a different strap (N+1). When combined with the different base units, the family becomes extremely customizable. The user can create a different article by selecting one base unit to go along with one strap set. If multiple sets are provided, any number of different article configurations can be made.

In accordance with this application, the family may include a standardized attachment mechanism at the interface or engagement between the strap sets and the base units. That is, each set or each base unit has the same attachment mechanism such that they can be interchanged with one another. Unlike the straps and base units themselves which can be different, the attachment mechanisms provided on each set of straps are the same and the attachment mechanisms provided on each of the base units are the same. The attachment mechanisms can be widely varied and generally selected from any of these mentioned previously in FIGS. 1-51. Generally, they are configured to engage one another such that they are locked into place relative to one another thereby securing the strap set to the base unit, making them a single cooperating system. Of course, the attachment mechanisms may also be configured to disengage from one another such that they are released relative to one another thereby un-securing the strap set from the base unit. In one embodiment, the attachment mechanisms include a magnetic feature such that they snap and hold into place with magnetic force and release when a force is applied greater than the magnetic force (breaking force).

The electronic device can take many forms such as a portable media player according to one embodiment of the disclosure. The media player is, for example, suitable for use as the battery powered portable media player. The media player includes a processor that pertains to a microprocessor or controller for controlling the overall operation of the media player. The media player stores media data pertaining to media assets in a file system and a cache. The file system is, typically, a storage disk or a plurality of disks. The file system typically provides high capacity storage capability for the media player. However, since the access time to the file system is relatively slow, the media player can also include a cache. The cache is, for example, Random-Access Memory (RAM) provided by semiconductor memory. The relative access time to the cache is substantially shorter than for the file system. However, the cache does not have the large storage capacity of the file system. Further, the file system, when active, consumes more power than does the cache. The power consumption is particularly important when the media player is a portable media player that is powered by a battery (not shown). The media player also includes a RAM and a Read-Only Memory (ROM). The ROM can store programs, utilities or processes to be executed in a non-volatile manner. The RAM provides volatile data storage, such as for the cache.

The media player also includes a user input device that allows a user of the media player to interact with the media player. For example, the user input device can take a variety of forms, such as a button, keypad, dial, etc. Still further, the media player includes a display (screen display) that can be controlled by the processor to display information to the user. A data bus can facilitate data transfer between at least the file system, the cache, and the processor. The media player also includes a bus interface that couples to a data link. The data link allows the media player to couple to a host computer over a wired connection.

In one embodiment, the media player serves to store a plurality of media assets (e.g., songs) in the file system. When a user desires to have the media player play a particular media item, a list of available media assets is displayed on the display. Then, using the user input device, a user can select one of the available media assets. The processor, upon receiving a selection of a particular media item, supplies the media data (e.g., audio file) for the particular media item to a coder/decoder (CODEC). The CODEC then produces analog output signals for a speaker. The speaker can be a speaker internal to the media player or external to the media player. For example, headphones or earphones that connect to the media player would be considered an external speaker.

Additional alterations from those particularly described and illustrated herein are apparent from the teachings presented herein. Therefore, the particular forms illustrated should not be construed as limiting and any and all equivalent acts, structures, and forms should be interpreted to fall within the scope of embodiments of the disclosure. Additionally, the various aspects, embodiments, implementations or features of the described embodiments can be used separately or in any combination. Furthermore, a plurality of different materials may be used singularly or in combination to form the various embodiments and implementations described above.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A system, comprising:
a personal electronic device;
an attachment element comprising a closed loop of continuous material defining an opening of the attachment element; and
an attachment apparatus comprising:
a length of material; and
a first magnetic feature, wherein the length of material is configured to couple the attachment apparatus to the attachment element by feeding through the opening, looping around the attachment element, and magnetically coupling the first magnetic feature to one of multiple second magnetic features in an engaged position, the first magnetic feature and each of the multiple second magnetic features being fixed to a corresponding position along the length of material in the engaged position and being fixed to the corresponding position along the length of material in an unengaged position in which the first magnetic feature is not magnetically coupled to the multiple second magnetic features.

2. The system as recited in claim 1, wherein the attachment apparatus is adjustable to accommodate a user preference.

3. The system as recited in claim 2, wherein a size of the length of material is adjustable.

4. The system as recited in claim 1, wherein an additional magnetic feature is included in the length of material.

5. The system as recited in claim 1, wherein the attachment apparatus further includes a mechanical feature that is configured to attach and detach the personal electronic device and the length of material.

6. The system as recited in claim 5, wherein the mechanical feature comprises at least one of a loop, a buckle, a snap, a clasp, a protruding member, an aperture, a hook, a hook clamp, or a plug.

7. The system as recited in claim 1, wherein the length of material includes woven magnetic material.

8. The system as recited in claim 7, wherein the length of material comprises woven ferromagnetic strands.

9. The system as recited in claim 1, wherein the personal electronic device and the length of material are attachable in multiple alignments, orientations, or positions.

10. The system as recited in claim 1, wherein:
the first magnetic feature includes a first magnet or ferrous material; and
the second magnetic features each includes a second magnet or ferrous material.

11. The system as recited in claim 10, wherein the first magnet or ferrous material is attachable to the second magnet or ferrous material in multiple positions.

12. The system as recited in claim 10, wherein the first magnet or ferrous material repels the second magnet or ferrous material in at least one position.

13. The system as recited in claim 12, wherein the second magnet or ferrous material is larger than the first magnet or ferrous material and the first magnet or ferrous material is attachable to the second magnet or ferrous material in multiple positions.

14. The system as recited in claim 1, wherein the first magnetic feature is embedded.

15. The system as recited in claim 1, wherein the attachment apparatus includes an attachment portion that is attachable to the personal electronic device.

16. The system as recited in claim 1, wherein the personal electronic device further includes an additional attachment element that is attachable to an additional attachment apparatus.

17. A method of securing a personal electronic device to a user, comprising:
feeding an attachment apparatus connected to the personal electronic device through an opening of an attachment element connected to the personal electronic device, the attachment element comprising a closed loop of continuously connected material defining the opening, the attachment apparatus comprising:
a length of material; and
a first magnetic feature;
positioning the attachment apparatus around a portion of the attachment element; and
magnetically coupling the first magnetic feature to one of multiple second magnetic features in an engaged position, that are the first magnetic feature and each of the multiple second magnetic features being immovably fixed to a corresponding position along the length of material in the engaged position and being immovably fixed to the corresponding position along the length of material in an unengaged position in which the first magnetic feature is not magnetically coupled to the multiple second magnetic features.

18. The method of claim 17, wherein the length of material comprises an arm band that releasably secures the personal electronic device to a user's arm by encircling the user's arm.

19. The method of claim 17, wherein the personal electronic device comprises a media player.

20. The method of claim 17, wherein the personal electronic device comprises a communication device.

21. A strap system to releasably secure a personal electronic device to a user, the strap system comprising:
an attachment element comprising a closed loop of continuous material defining an opening of the attachment element; and
an attachment apparatus comprising:
a length of material; and
a first magnet fixed to a first position along the length of material, wherein the length of material is configured to couple the attachment apparatus to the attachment element by feeding through the opening, looping around a portion of the attachment element, and magnetically coupling the first magnet to one of multiple magnetic features in an engaged position, the first magnet and each of the multiple magnetic features being fixed to a corresponding second position along the length of material in the engaged position and being fixed to the corresponding second position along the length of material in an unengaged position in which the first magnet is not magnetically coupled to the multiple magnetic features.

22. The strap system of claim 21, wherein the attachment apparatus further includes a mechanical feature that is configured to attach and detach the personal electronic device and the length of material.

23. The strap system of claim 21, wherein each of the magnetic features comprises woven strands of magnetic material capable of having an induced magnetic field.

* * * * *